US 7,786,444 B2

(12) United States Patent
Wagenaar et al.

(10) Patent No.: US 7,786,444 B2
(45) Date of Patent: Aug. 31, 2010

(54) MULTI-APERTURE SINGLE PHOTON EMISSION COMPUTED TOMOGRAPHY (SPECT) IMAGING APPARATUS

(75) Inventors: Douglas J. Wagenaar, Westlake Village, CA (US); Bradley E. Patt, Sherman Oaks, CA (US); Benjamin M. W. Tsui, Baltimore, MD (US)

(73) Assignee: Gamma Medica-Ideas, Inc., Northridge, CA (US)

( * ) Notice: Subject to any disclaimer, the term of this patent is extended or adjusted under 35 U.S.C. 154(b) by 0 days.

(21) Appl. No.: 11/985,820

(22) Filed: Nov. 16, 2007

(65) Prior Publication Data

US 2008/0116386 A1 May 22, 2008

Related U.S. Application Data

(60) Provisional application No. 60/859,585, filed on Nov. 17, 2006.

(51) Int. Cl.
*G01T 1/166* (2006.01)
(52) U.S. Cl. .................................. 250/363.04
(58) Field of Classification Search .. 250/363.01–363.1
See application file for complete search history.

(56) References Cited

U.S. PATENT DOCUMENTS

| 7,199,371 | B2 | 4/2007 | Schramm et al. | |
| 7,498,580 | B2* | 3/2009 | Lackas et al. | 250/363.04 |
| 2003/0111610 | A1* | 6/2003 | Wagenaar et al. | 250/363.04 |
| 2006/0182217 | A1* | 8/2006 | Harding et al. | 378/44 |
| 2008/0001088 | A1* | 1/2008 | Joung | 250/363.1 |

OTHER PUBLICATIONS

Smith et al., Design of high sensitivity, high resolution compact single photon imaging devices for small animal and dedicated breast imaging, 2002, IEEE Nuclear Science Symposium Conference Record, vol. 3, pp. 1592-1596.*

Smith et al., Design of multipinhole collimators for small animal SPECT, 2004, IEEE, Nuclear Science Symposium Conference Record, vol. 4, pp. 2291-2295.*

Lackas et al, T-SPECT: a novel imaging technique for small animal research, 2005 IEEE Transaction on Nuclear Science, vol. 52, pp. 181-187.*

Schramm et al., High-resolution SPECT using multi-pinhole collimation, 2003 IEEE Transaction on Nuclear Science, Vo. 50, No. 3, pp. 315-320.*

(Continued)

*Primary Examiner*—David P Porta
*Assistant Examiner*—Kiho Kim
(74) *Attorney, Agent, or Firm*—Christie, Parker & Hale, LLP

(57) ABSTRACT

Methods and systems for improving image quality of single photon nuclear imaging systems, such as single photon emission computed tomography (SPECT) systems for imaging of an object under study, such as small objects including small animals of different sizes using synthetic apertures. The methods and systems include processes and instrumentations for high-resolution, high detection efficiency leading to lower image noise and artifact-free synthetic aperture single photon nuclear images, such as SPECT images. Also, the method and systems provide design parameters, hardware settings, and data acquisition processes for optimal imaging of objects having different sizes.

53 Claims, 35 Drawing Sheets
(24 of 35 Drawing Sheet(s) Filed in Color)

OTHER PUBLICATIONS

Lackas et al., On the development of a high-resolution multi-pinhole SPECT/CT, 2004, IEEE Nuclear Science Symposium Conference Record, vol. 6, pp. 3893-3895.*

DiFilippo, A sensitivity model for multi-pinhole SPECT, 2006, IEEE, Nuclear Science Symposium Conference Record, vol. 3, pp. 1842-1847.*

Zeniya et al., 3D image reconstruction using complete data in Pinhole SPECT, 2004 IEEE, Nuclear Science Symposium Conference Record, vol. 3, pp. 2100-2102.*

Mok et al., Development and validation of a Monte Carlo simulation tool for multi-pinhole MicroSPECT, 2004, IEEE, Nuclear Science Symposium Conference Record, vol. 6, pp. 3440-3444.*

Cao et al., Optimization of multipinhole arrangements for quantitative mouse brain SPECT by Monte Carlo simulation, 2004, IEEE, Nuclear Science Symposium Conference Record, vol. 4, pp. 2470-2474.*

Izaguirre et al., Evaluation of a large pixellated CZT detector for small animal radionuclide imaging, 2006 IEEE, Nuclear Science Symposium Conference Record, vol. 6. pp. 3817-3820.*

Ivanovic et al., Multi-pinhole collimator optimization for high resolution SPECT imaging, 1998, IEEE, Nuclear Science Symposium, vol. 2, pp. 1097-1101.*

Mok et al., Design of a novel pinhole collimator system for SPECT imaging of small animals with different size, 2005, IEEE, Nuclear Science Symposium Conference Record, vol. 5, pp. 2649-2652.*

* cited by examiner

C – Center of a pinhole aperture.
Multiple pinhole apertures can be defined.

MULTI-APERTURE SINGLE PHOTON EMISSION COMPUTED TOMOGRAPHY (SPECT) IMAGING APPARATUS

CROSS-REFERENCE TO RELATED APPLICATION

This application claims priority to and the benefit of U.S. Provisional Application No. 60/859,585, filed Nov. 17, 2006, the entire content of which is incorporated herein by reference.

FIELD OF THE INVENTION

The invention relates generally to medical imaging. More particularly, the invention relates to methods and systems for improving image quality of single photon nuclear imaging systems, such as single photon emission computed tomography (SPECT) systems.

BACKGROUND OF THE INVENTION

Single photon emission computed tomography (SPECT) is a nuclear medicine tomographic imaging technique that has traditionally used homogeneous area radiation detectors to detect gamma ray emissions. Conventionally, this imaging technique accumulates counts of gamma photons that are absorbed by a scintillation crystal. The crystal scintillates in response to interaction with gamma radiation to produce a flash of light. Photomultiplier tubes (PMTs) behind the scintillation crystal detect the flashes of light and a computer sums the fluorescent counts. The sum of fluorescent counts is a measure of the energy of the detected gamma photon. The computer in turn constructs and displays an image of the relative spatial count density of detected gamma photons on a monitor. Images can be formed by detected gamma photons within user-specified energy limits. These images then reflect the distributions and relative concentrations of multiple radioactive tracer elements or multiple gamma photons with differing energies emitted from the same radioactive tracer element that is present in the organs and tissues imaged.

In more detail, U.S. Pat. No. 3,011,057 for RADIATION IMAGE DEVICE, by Hal O. Anger, which is incorporated by reference herein in its entirety, describes a nuclear medicine imaging device that uses a single sodium iodide (NaI) scintillation crystal to detect the gamma ray emissions. Here, the radiation imaging device generally includes a detector, such as a scintillation crystal, for transforming gamma ray emissions to light photons in response to incident gamma ray events, and a photodetector to detect the light photons emitted from the scintillation crystal. The photodetector, typically a photomultiplier tube that is optically coupled to the scintillation crystal, detects a fraction of the scintillation photons produced from absorption of a gamma ray into the scintillation crystal and produces an electronic current that is proportional to the number of detected scintillation photons.

In a technique used with a NaI detector, a nuclear medicine imaging device forms a high-resolution image through the use of a single-aperture collimator that provides collimated gamma ray paths to the detector. In this technique, the position of the gamma ray emission at the point of absorption in the scintillation crystal is determined by an algorithm based on the magnitude of electric signals from each of a plurality of photomultiplier tubes positioned over the crystal. This algorithm can be implemented by use of a resistor matrix connecting the outputs of the photomultiplier tubes. For close proximity images, a single long-bore, small-aperture collimator hole can be used, with the collimator being scanned over the radiation field of interest in a two-dimensional scanning manner, to thereby sample radiation distribution over each of the image points in the radiation field.

In addition to the above-described NaI detectors, nuclear medicine imaging devices with pixellated radiation detector elements, typically cadmium zinc telluride ("CZT") crystals, have recently been developed. In more detail, U.S. Pat. No. 6,838,672 for HIGH RESOLUTION, MULTIPLE DETECTOR TOMOGRAPHIC RADIONUCLIDE IMAGING BASED UPON SEPARATED RADIATION DETECTION ELEMENTS, by Douglas J. Wagenaar et al., which is incorporated by reference herein in its entirety, describes a pixellated radiation detector. Here, the pixellated detector is generally characterized by multiple detector elements.

In the above described nuclear medicine imaging devices, the performance of the imaging devices can be improved through the use of multiple radiation detectors. Also, multiple holes can be used with a collimator to form a multi-hole collimator to further increase the number of counts obtained at each point, provided they are sufficiently separated from each other such that detected counts can be associated with a particular collimator hole. The use of multiple detectors and/or a multi-hole collimator is advantageous because the nuclear medicine imaging device may collect samples from a target in less time. An imager having two detectors and/or a two-hole collimator, for instance, may scan a target twice as fast as an imager having a single detector. Furthermore, the use of multiple detectors to scan a target may improve the resolution of the scanning by reducing the variance and resulting statistical error produced by a single detector. However, configuring the multiple detectors and/or multi-hole collimator for precisely scanning throughout a sampling area adds still greater complexity to the design for the nuclear medicine imaging device. As a result, there exists a need for a nuclear medicine imaging device having multiple detectors and/or a multi-hole collimator to have a relatively simple design.

Also, relatively more complicated iterative 3D image reconstruction techniques need to be used with nonstandard pinhole data acquisition geometries versus a standard pinhole SPECT imaging geometries involving the use of a pinhole collimator with a single pinhole aperture, while tomographic projection data are acquired on a planar circular orbit with a flat 2D detector. Examples of the nonstandard pinhole data acquisition geometries include the use of double or triple detectors, multi-pinhole collimator, helical scanning orbits, etc. That is, to implement image reconstruction techniques, there should be accurate geometric descriptions of the projection operators for these nonstandard pinhole data acquisition geometries, which can be very complex when considering geometric misalignments caused by mechanical imperfections. It is also crucial to estimate and then correct for geometric misalignments (a.k.a. geometric calibrations) in pinhole or cone-beam tomographic imaging geometries in order to minimize degradations and/or artifacts in the reconstructed images. Therefore, geometric calibrations and image reconstructions are closely knitted topics in pinhole SPECT imaging, and a reconstruction method implemented without the capability of correcting for geometric misalignments may be of little use in practical molecular imaging studies.

As such, to facilitate the translation of geometric calibration methods and improve the efficiency of implementing image reconstruction algorithms capable of correcting for geometric misalignments, there is a need to unify the geometric descriptions of projection operators for standard and nonstandard pinhole SPECT imaging geometries. Doing so may potentially speed up the implementation of effective reconstruction algorithms and the investigation of accurate geometric calibration methods for a nonstandard geometry.

The above information disclosed in this Background section is only for enhancement of understanding of the background of the invention and therefore it may contain information that does not form the prior art that is already known in this country to a person of ordinary skill in the art.

SUMMARY OF THE INVENTION

An aspect of the invention provides a SPECT imaging technique for imaging objects including small animals of different sizes using multi-pinhole (or synthetic) apertures. The imaging technique includes methods, instrumentations, and associated algorithms and software for both high-resolution and high detection efficiency imaging that leads to lower image noise and artifact-free synthetic aperture SPECT images. Also, the technique provides design parameters, hardware settings, and data acquisition methods for optimal imaging of objects with different sizes.

A single photon nuclear imaging system according to an embodiment of the present invention includes a detector and a multi-pinhole collimator. The detector is for detecting gamma photons, and the multi-pinhole collimator has a plurality of patterned pinholes for single photon nuclear imaging an object under study with the detector. Here, the plurality of patterned pinholes are displaced from each other by a substantially equal distance along a first direction perpendicular to an axis-of-rotation of the object under study.

In one embodiment, the plurality of patterned pinholes are focused to a volume-of-interest of the object under study.

In one embodiment, the multi-pinhole collimator and the detector are configured to have a plurality of collimator lengths, the plurality of collimator lengths including a first pinhole collimator length for single photon nuclear imaging a first object of a first size with the detector and a second pinhole collimator length for single photon nuclear imaging a second object of a second size with the detector.

In one embodiment, the detector includes a plurality of pixellated detectors, wherein the multi-pinhole collimator includes a plurality of multi-pinhole collimators respectively corresponding to the plurality of pixellated detectors, wherein, for a particular target projection sampling of the object under study, each of the plurality of pixellated detectors with its corresponding one of the plurality of multi-pinhole collimators provides a different sampling contribution, and wherein the different sampling contributions of the plurality of pixellated detectors are summed to provide a substantially complete sampling of the object under study at the particular target projection.

In one embodiment, the detector includes a plurality of homogenous area detectors, wherein the multi-pinhole collimator includes a plurality of multi-pinhole collimators respectively corresponding to the plurality of homogenous area detectors, wherein, for a particular target projection sampling of the object under study, each of the plurality of homogenous area detectors with its corresponding one of the plurality of multi-pinhole collimators provides a different sampling contribution, and wherein the different sampling contributions of the plurality of homogenous area detectors are summed to provide a substantially complete sampling of the object under study at the particular target projection.

In one embodiment, the multi-pinhole collimator and the detector are configured to have a plurality of collimator lengths, the plurality of collimator lengths including a first pinhole collimator length for single photon nuclear imaging a first object of a first size with the detector and a second pinhole collimator length for single photon nuclear imaging a second object of a second size with the detector, wherein the detector includes a plurality of pixellated detectors, wherein the multi-pinhole collimator includes a plurality of multi-pinhole collimators respectively corresponding to the plurality of pixellated detectors, wherein, for a particular target projection sampling of the object under study, each of the plurality of pixellated detectors with its corresponding one of the plurality of multi-pinhole collimators provides a different sampling contribution, and wherein the different sampling contributions of the plurality of pixellated detectors are summed to provide a substantially complete sampling of the object under study at the particular target projection.

In one embodiment, the multi-pinhole collimator and the detector are configured to have a plurality of collimator lengths, the plurality of collimator lengths including a first pinhole collimator length for single photon nuclear imaging a first object of a first size with the detector and a second pinhole collimator length for single photon nuclear imaging a second object of a second size with the detector, and wherein the plurality of patterned pinholes are focused to a volume-of-interest of the object under study.

In one embodiment, the detector includes a plurality of pixellated detectors, wherein the multi-pinhole collimator includes a plurality of multi-pinhole collimators respectively corresponding to the plurality of pixellated detectors, wherein, for a particular target projection sampling of the object under study, each of the plurality of pixellated detectors with its corresponding one of the plurality of multi-pinhole collimators provides a different sampling contribution, and wherein the different sampling contributions of the plurality of pixellated detectors are summed to provide a substantially complete sampling of the object under study at the particular target projection, and wherein the plurality of patterned pinholes are focused to a volume-of-interest of the object under study.

In one embodiment, the multi-pinhole collimator and the detector are configured to have a plurality of collimator lengths, the plurality of collimator lengths including a first pinhole collimator length for single photon nuclear imaging a first object of a first size with the detector and a second pinhole collimator length for single photon nuclear imaging a second object of a second size with the detector, wherein the detector includes a plurality of pixellated detectors, wherein the multi-pinhole collimator includes a plurality of multi-pinhole collimators respectively corresponding to the plurality of pixellated detectors, wherein, for a particular target projection sampling of the object under study, each of the plurality of pixellated detectors with its corresponding one of the plurality of multi-pinhole collimators provides a different sampling contribution, wherein the different sampling contributions of the plurality of pixellated detectors are summed to provide a substantially complete sampling of the object under study at the particular target projection, and wherein the plurality of patterned pinholes are focused to a volume-of-interest of the object under study.

In one embodiment, the multi-pinhole collimator and the detector are configured to have a plurality of collimator lengths, the plurality of collimator lengths including a first pinhole collimator length for single photon nuclear imaging a first object of a first size with the detector and a second pinhole collimator length for single photon nuclear imaging a second object of a second size with the detector, wherein the detector comprises a plurality of homogenous area detectors, wherein the multi-pinhole collimator comprises a plurality of multi-pinhole collimators respectively corresponding to the plurality of homogenous area detectors, wherein, for a particular target projection sampling of the object under study, each of the plurality of homogenous area detectors with its corresponding one of the plurality of multi-pinhole collimators provides a different sampling contribution, and wherein the different sampling contributions of the plurality of homogenous area detectors are summed to provide a substantially complete sampling of the object under study at the particular target projection.

In one embodiment, the detector includes a plurality of homogenous area detectors, wherein the multi-pinhole collimator includes a plurality of multi-pinhole collimators respectively corresponding to the plurality of homogenous area detectors, wherein, for a particular target projection sampling of the object under study, each of the plurality of homogenous area detectors with its corresponding one of the plurality of multi-pinhole collimators provides a different sampling contribution, and wherein the different sampling contributions of the plurality of homogenous area detectors are summed to provide a substantially complete sampling of the object under study at the particular target projection, and wherein the plurality of patterned pinholes are focused to a volume-of-interest of the object under study.

In one embodiment, the multi-pinhole collimator and the detector are configured to have a plurality of collimator lengths, the plurality of collimator lengths including a first pinhole collimator length for single photon nuclear imaging a first object of a first size with the detector and a second pinhole collimator length for single photon nuclear imaging a second object of a second size with the detector, wherein the detector includes a plurality of homogenous area detectors, wherein the multi-pinhole collimator includes a plurality of multi-pinhole collimators respectively corresponding to the plurality of homogenous area detectors, wherein, for a particular target projection sampling of the object under study, each of the plurality of homogenous area detectors with its corresponding one of the plurality of multi-pinhole collimators provides a different sampling contribution, and wherein the different sampling contributions of the plurality of homogenous area detectors are summed to provide a substantially complete sampling of the object under study at the particular target projection, and wherein the plurality of patterned pinholes are focused to a volume-of-interest of the object under study.

BRIEF DESCRIPTION OF THE DRAWINGS

The accompanying drawings, together with the specification, illustrate exemplary embodiments of the present invention, and, together with the description, serve to explain the principles of the present invention.

The patent or application file contains at least one drawing/picture executed in color. Copies of this patent or patent application publication with color drawing/picture(s) will be provided by the Office upon request and payment of the necessary fee.

DETAILED DESCRIPTION

Figure 1:
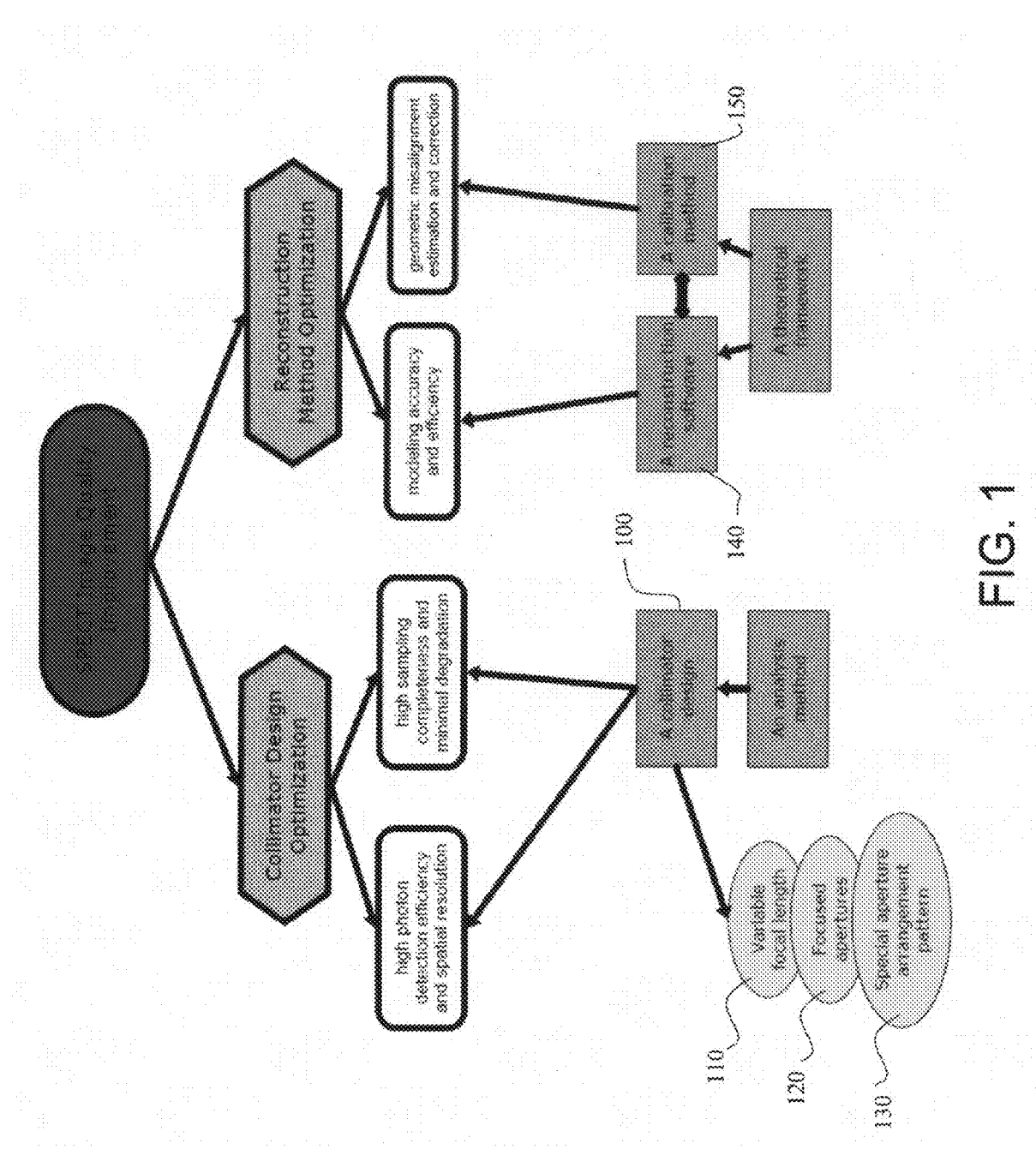
FIG. 1 illustrates a system and method for SPECT image quality improvement pursuant to aspects of the present invention.

In the following detailed description, only certain exemplary embodiments of the present invention are shown and described, by way of illustration. As those skilled in the art would recognize, the described exemplary embodiments may be modified in various ways, all without departing from the spirit or scope of the present invention. Accordingly, the drawings and description are to be regarded as illustrative in nature, and not restrictive.

An embodiment of the invention provides methods, instrumentations, and associated algorithms and software for both high-resolution and high detection efficiency that lead to lower image noise and artifact-free synthetic aperture SPECT images for objects including small animals of different sizes.

Also, an embodiment of the present invention provides design parameters, hardware settings, and data acquisition methods for optimal imaging of objects with different sizes.

In one embodiment, a SPECT imaging technique for imaging objects including small animals of different sizes using a multi-pinhole collimator is provided. The embodiment provides both high-resolution and high detection efficiency leading to lower image noise, and artifact-free, synthesis aperture SPECT images. Prior systems can only achieve either high-resolution or high detection efficiency. For example, systems that do not involve overlapping synthetic apertures result in detection efficiency that is inferior than the embodiment of the present invention can provide. Other systems that involve too many synthetic apertures result in lower resolution and potentially severe reconstructed image artifacts.

That is, embodiments of the present invention provide trade-off between high-resolution and high detection efficiency and minimal image artifacts using extensive optimizing methods including theoretical derivation, image reconstruction algorithms, simulation studies, and experimental studies.

Embodiments of the present invention also include a system design and data acquisition techniques that account for imaging objects of different sizes. The result is an instrumentation with an optimal number of synthetic apertures, optimal degree of overlapping synthetic aperture projections, mathematical algorithms and associated software to reconstruct the overlapping projections to provide almost artifact-free images with high-resolution and low image noise.

Embodiments of the present invention provide a multi-pinhole collimator and detector system that is optimized for each task (i.e., a mouse-sized object or a rat-sized object) for both photo detection efficiency and spatial resolution, and minimizes image artifacts. The embodiments include a technique of calibrating and correcting for both misalignments and geometry of the pinholes, a technique of placing the pinholes in a geometrical configuration such that artifacts are minimized. In addition, embodiments of the present invention provide flexibility in magnification geometries, and optimized sampling using pixel size and location. The sampling can be enhanced through the use of additional detectors, i.e. multiple detectors with different sampling geometries.

One embodiment of the present invention provides an analysis method to determine the optimum number of pinholes, configuration of pinholes, and angular sampling approaches to give a desired efficiency/resolution/artifact combination in tomographic imaging.

In more detail, embodiments of the present invention account for certain important concepts not accounted for by prior systems. The first of these concepts is that the goal of SPECT (e.g., small animal SPECT) is to maximize the photo detection efficiency for the same spatial resolution. The second concept is that the smaller the pinhole aperture size, the higher the geometric resolution, but the smaller pinhole aperture size decreases detection efficiency. The third concept is that the final spatial resolution of a multi-pinhole system depends on both the geometric resolution of the pinhole aperture and the intrinsic resolution of the camera projected onto the object plane. For the modular camera, the intrinsic resolution is roughly equal to the pixel size and the projected intrinsic resolution depends on the magnification; i.e., the smaller the magnification, the worse the projected intrinsic resolution at the object plane will become. The approximate relationship is "sum of squares" relationship. The fourth concept is that the degree of overlaps of the projections of the multi-pinholes will affect the reconstructed image quality. That is, higher degree of overlaps give rise to more reconstructed image artifacts. The increased reconstructed image artifacts can be "perceived" as increased noise.

As such, an embodiment of the present invention provides a multi-pinhole collimator that gives a relatively high detection efficiency for the same spatial resolution as compared to single pinhole, and at the same time, provides an optimal number of pinholes.

In more detail, an embodiment of the present invention provides a detection system development technique that first sets the final spatial resolution with a fixed value, e.g., at 1 mm. One embodiment of this technique assumes that there is no overlap of the projections from the multi-pinholes. Thus, as the technique increases the number of pinholes, the magnification and, as a result, the size of the projections have to be smaller to avoid overlap. Referring to the third concept above, the projected intrinsic resolution will be greater, so that to maintain the same final resolution, the technique decreases the size of the pinhole aperture to give better geometric resolution so that the final resolution will remain the same. As a result, the technique has to reduce detection efficiency.

Also, the technique is used to derive the optimal number of pinholes to give the maximum detection efficiency for the same final spatial resolution of 1 mm. In one embodiment, by assuming the use of a GM-I modular camera with about 85 pixels, a multi-pinhole collimator should have from about 4 to 5 pinholes. The no-overlap assumption indicates there are no reconstructed image artifacts. The technique can further improve the trade-off by allowing for 'some' overlap but keeps the number of pinholes at about 4 to 5. That is, the small degree of overlap can be 'resolved' by an iterative multi-pinhole image reconstruction method described in more detail below.

Referring to FIG. 1, an embodiment of the invention provides a system and method for SPECT image quality improvement. The embodiment includes methods, instrumentations, and associated algorithms and software for both high-resolution and high detection efficiency imaging that lead to lower image noise and artifact-free synthetic aperture SPECT images. Also, the embodiment provides design parameters, hardware settings, and data acquisition methods for optimal imaging of objects with different sizes.

As shown, the embodiment of FIG. 1 improves SPECT image quality by providing a collimator design optimization and a reconstruction method optimization. In one embodiment, the design of the collimator is optimized by providing for high photo detection efficiency and spatial resolution and for high sampling completeness and minimal degradation. That is, the present embodiment uses an analysis method to provide a collimator design 100 that has a variable collimator (or focal) length 110, focused apertures 120, and/or a aperture arrangement pattern 130 so that high photo detection efficiency and spatial resolution and/or high sampling completeness and minimal degradation can result.

Figure 2:
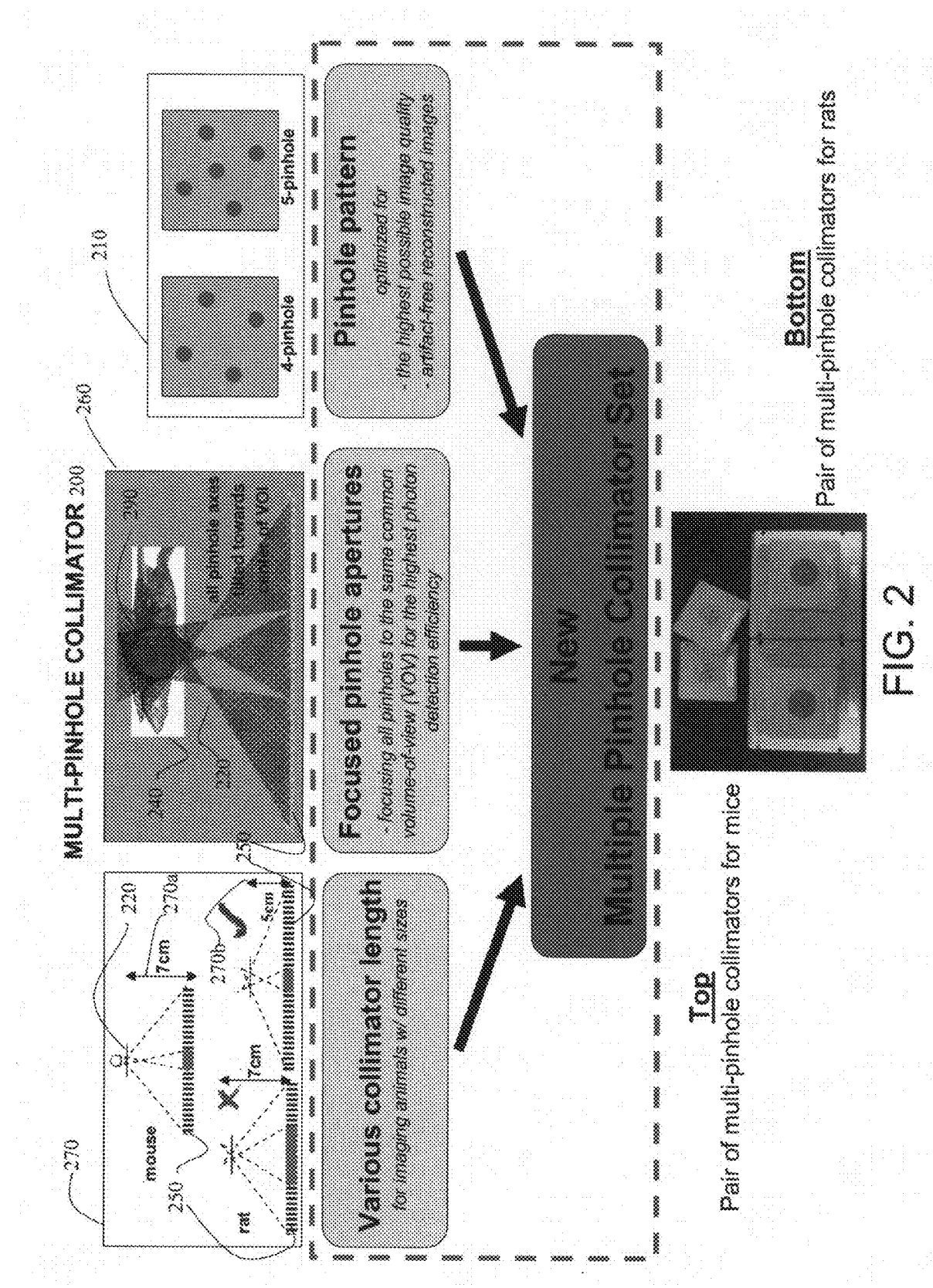
FIG. 2 illustrates a single photo nuclear imaging system that includes a detector for detecting gamma photons and a multi-pinhole collimator having a plurality of patterned pinholes pursuant to aspects of the present invention.

Referring to FIG. 2, a single photon nuclear imaging system of the present invention includes a detector for detecting gamma photons and a multi-pinhole collimator 200 having a plurality of patterned pinholes. As shown, in an pinhole pattern embodiment of the present invention, the patterned pinholes are for single photon nuclear imaging an object under study 240 with the detector 250.

Figure 3:
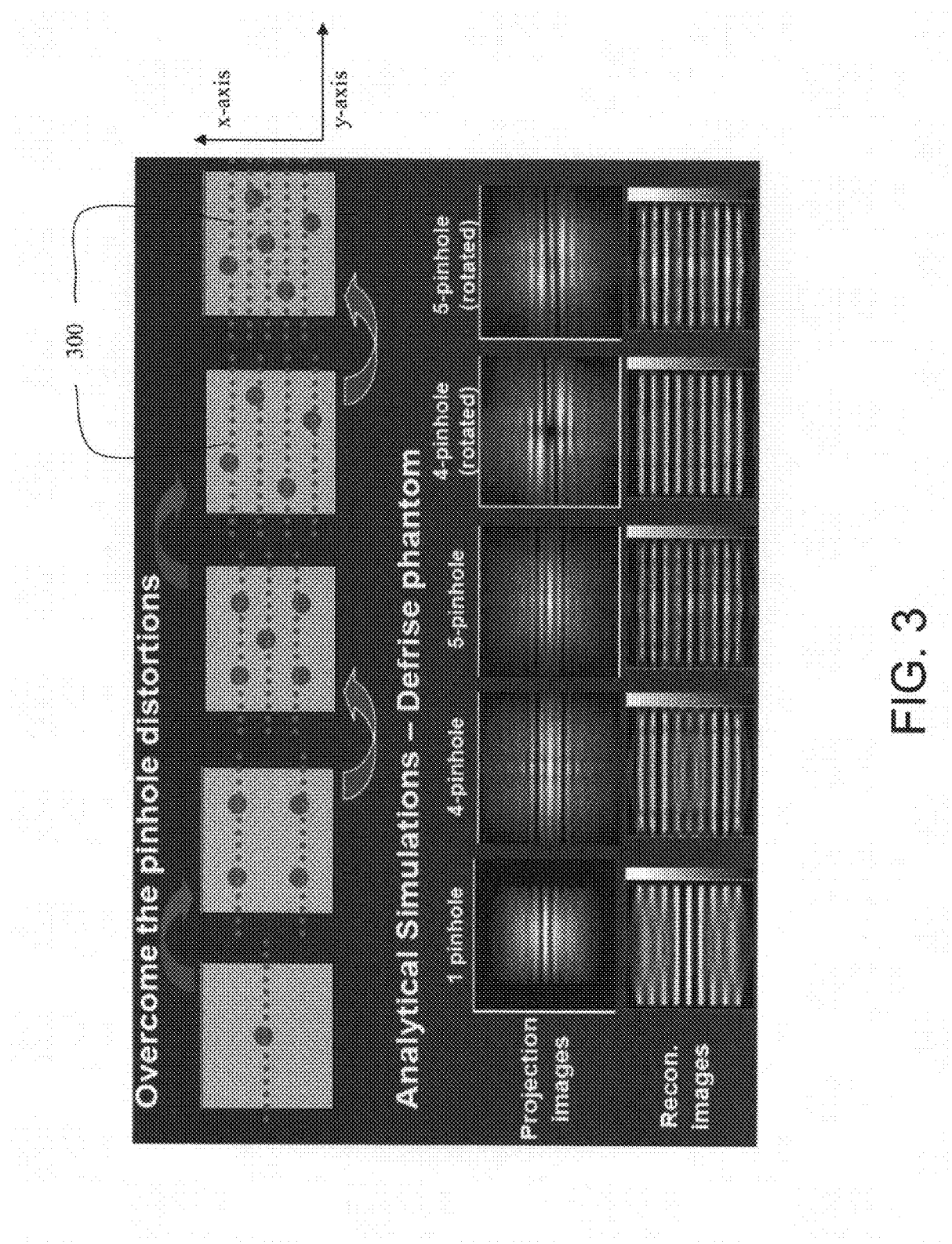
FIGS. 3 and 4 illustrate that the patterned pinholes are displaced from each other by a substantially equal distance along a first direction that is perpendicular to an axis-of-rotation of an object under study pursuant to aspects of the present invention.
Figure 4:
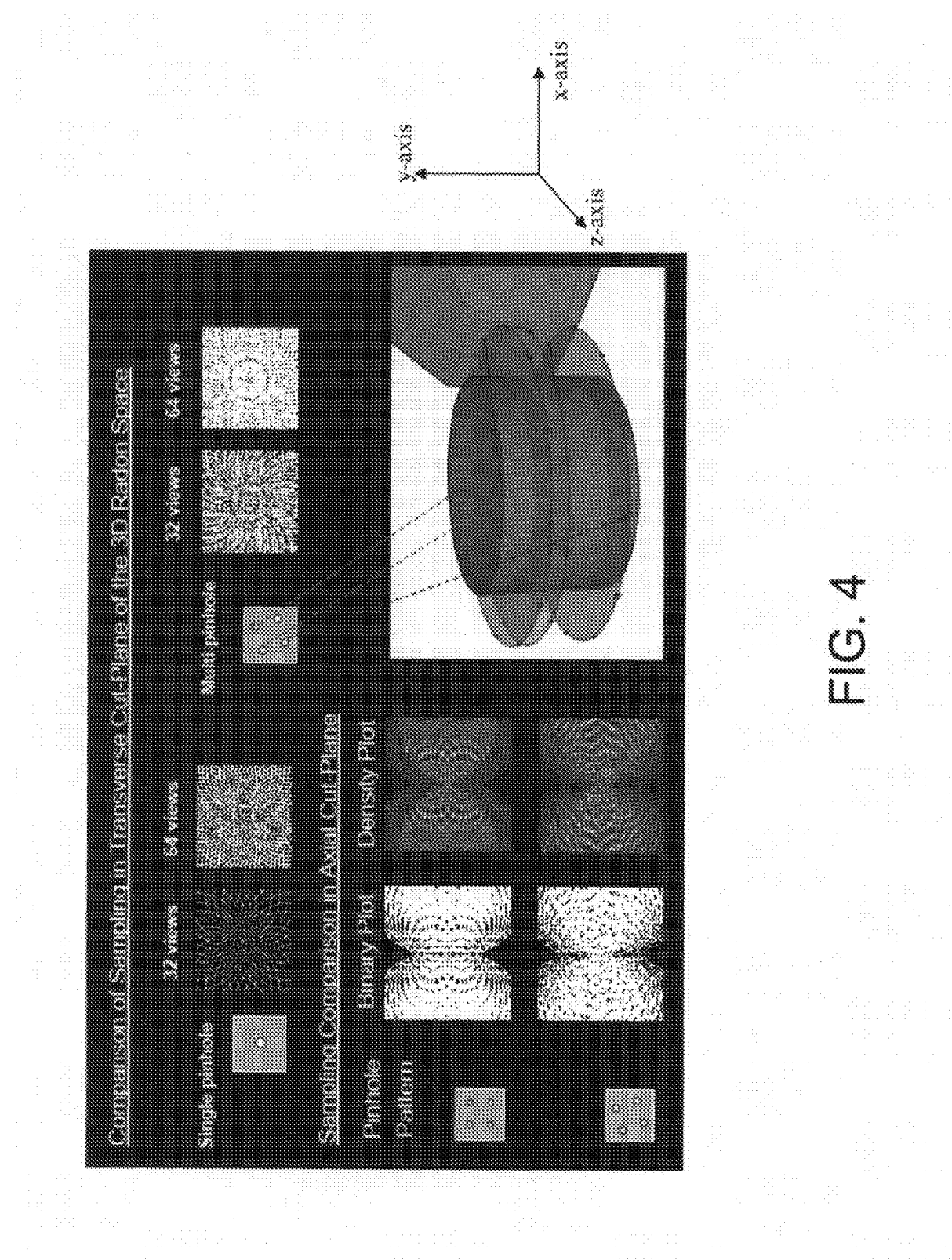

Referring also to FIGS. 3 and 4, in the present embodiment 210, the patterned pinholes are displaced (as shown by the dotted lines 300 of FIG. 3) from each other by a substantially equal distance along a first direction (e.g., an x-axis direction of FIGS. 3 and 4) that is perpendicular to an axis-of-rotation of the object under study 240. Here, the patterned pinholes are not displaced from each other by a substantially equal distance along a second direction (e.g., a y-axis direction of FIGS. 3 and 4) parallel to the axis-of-rotation of the object under study 240.

Figure 8B:
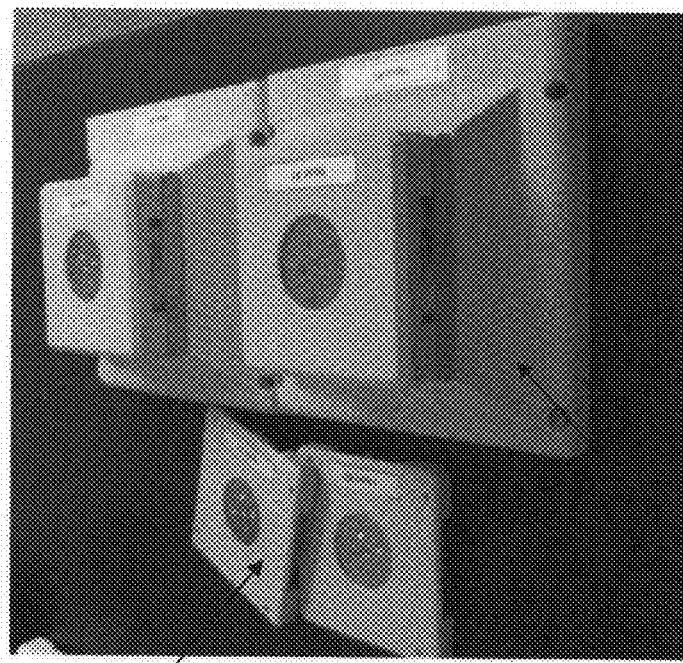
FIGS. 8A and 8B depict a multi-pinhole collimator including a collimator plate having the patterned pinholes and a support base pursuant to aspects of the present invention.
Figure 8A:
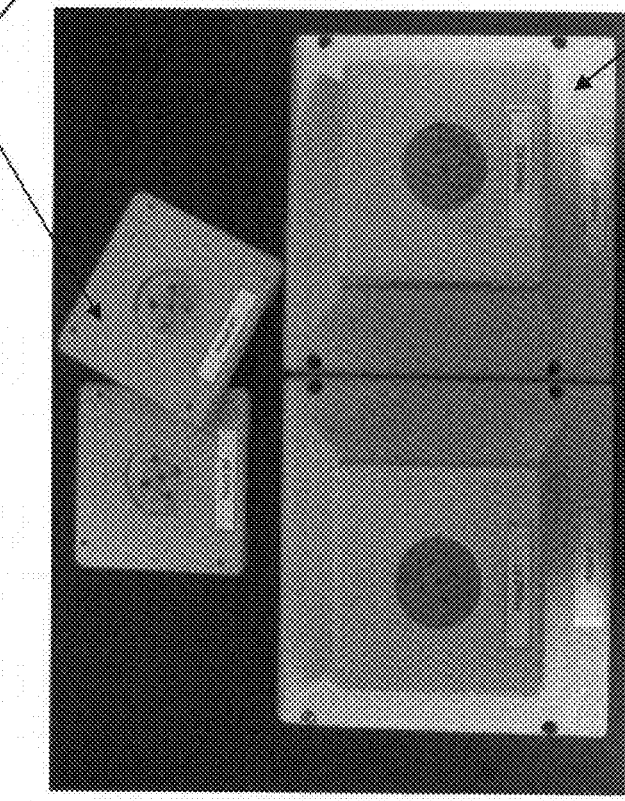

Referring to FIGS. 8A and 8B, the multi-pinhole collimator 200 includes a collimator plate 220 having the patterned pinholes and a support base 230 for suspending the patterned pinholes of the collimator plate 220 between the object under study 240 and the detector 250.

Figure 5:
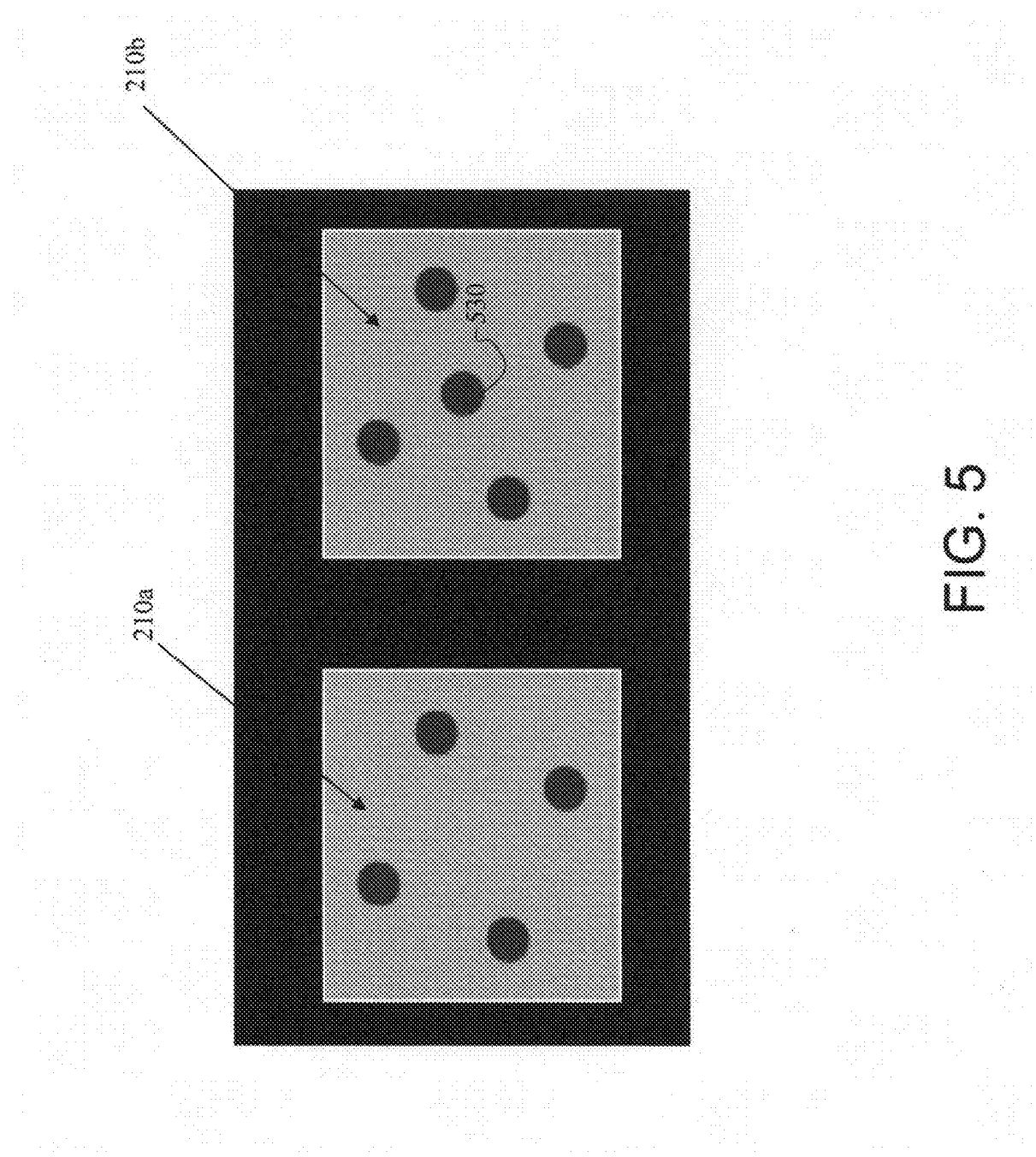
FIG. 5 illustrates patterned pinholes of a multi-pinhole collimator pursuant to aspects of the present invention.
Figures 6A, 6B:
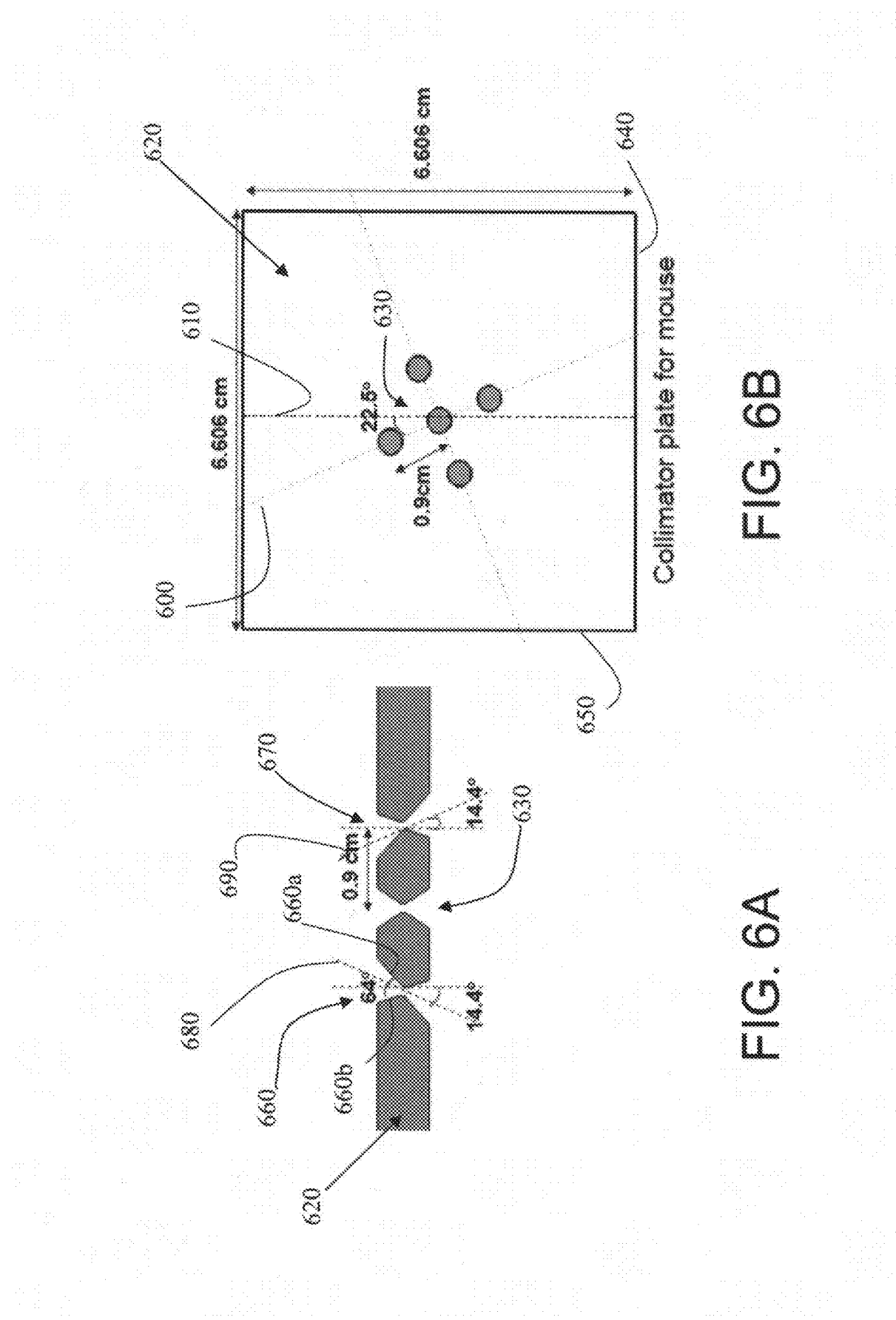
FIGS. 6A and 6B are cross-sectional and plan views of a multi-pinhole collimator in accordance with an embodiment of the present invention.
Figures 7A, 7B:
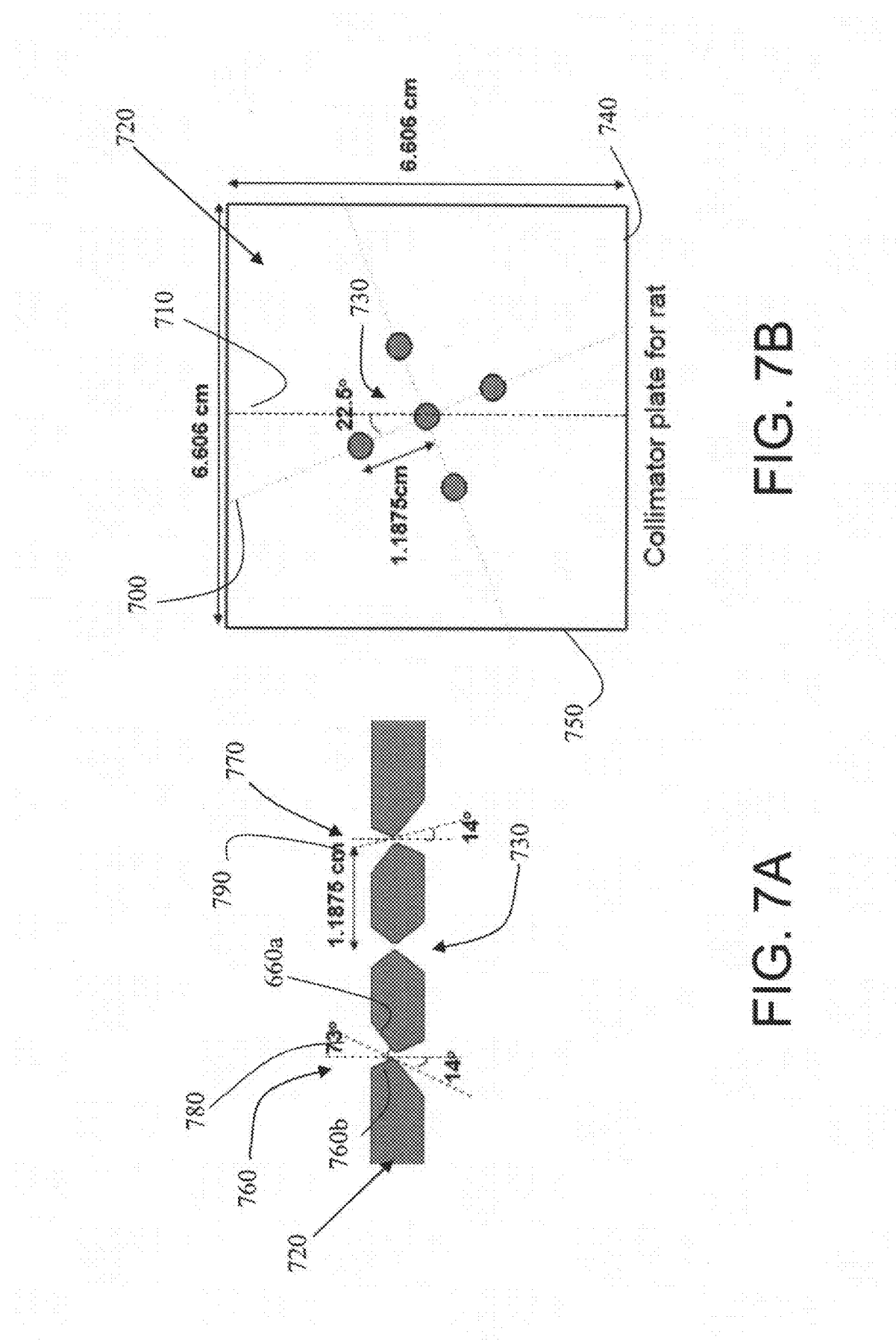
FIGS. 7A and 7B are cross-sectional and plan views of a multi-pinhole collimator in accordance with another embodiment of the present invention.

In one embodiment as shown in FIG. 5, the patterned pinholes include four symmetrical pinholes 210a. As shown in FIGS. 6B and 7B, the four symmetrical pinholes 210a are patterned such that an angle in a range from about 15° to about 30° is formed between a first reference line 600, 700 and a second reference line 610, 710, the first and second reference lines 600 and 610, 700 and 710 diverging from a center point (or pinhole) 630, 730 of a collimator plate 620, 720 having the four symmetrical pinholes 210a. In FIGS. 6B and 7B, the first reference line 600, 700 intersects the center point 630, 730 and two of the four symmetrical pinholes 210a. The second reference line 610, 710 intersects the center point (or pinhole) 630, 730 and does not intersect the four symmetrical pinholes 210a, and the second reference line 610, 710 is perpendicular to a first edge 640, 740 of the collimator plate 620, 720 and parallel to a second edge 650, 750 of the collimator plate 620, 720.

In another embodiment as also shown in FIG. 5, the patterned pinholes include five symmetrical pinholes 210b or the patterned pinholes further include a fifth pinhole 530 at the center of the collimator plate.

In one embodiment, referring to FIGS. 6B and 7B, the angle formed between the first reference line 600, 700 and the second reference line 610, 710 has a range from 20° to 25°. In one embodiment, the angle formed between the first reference line 600, 700 and the second reference line 610, 710 is 22.5°.

Figure 9:
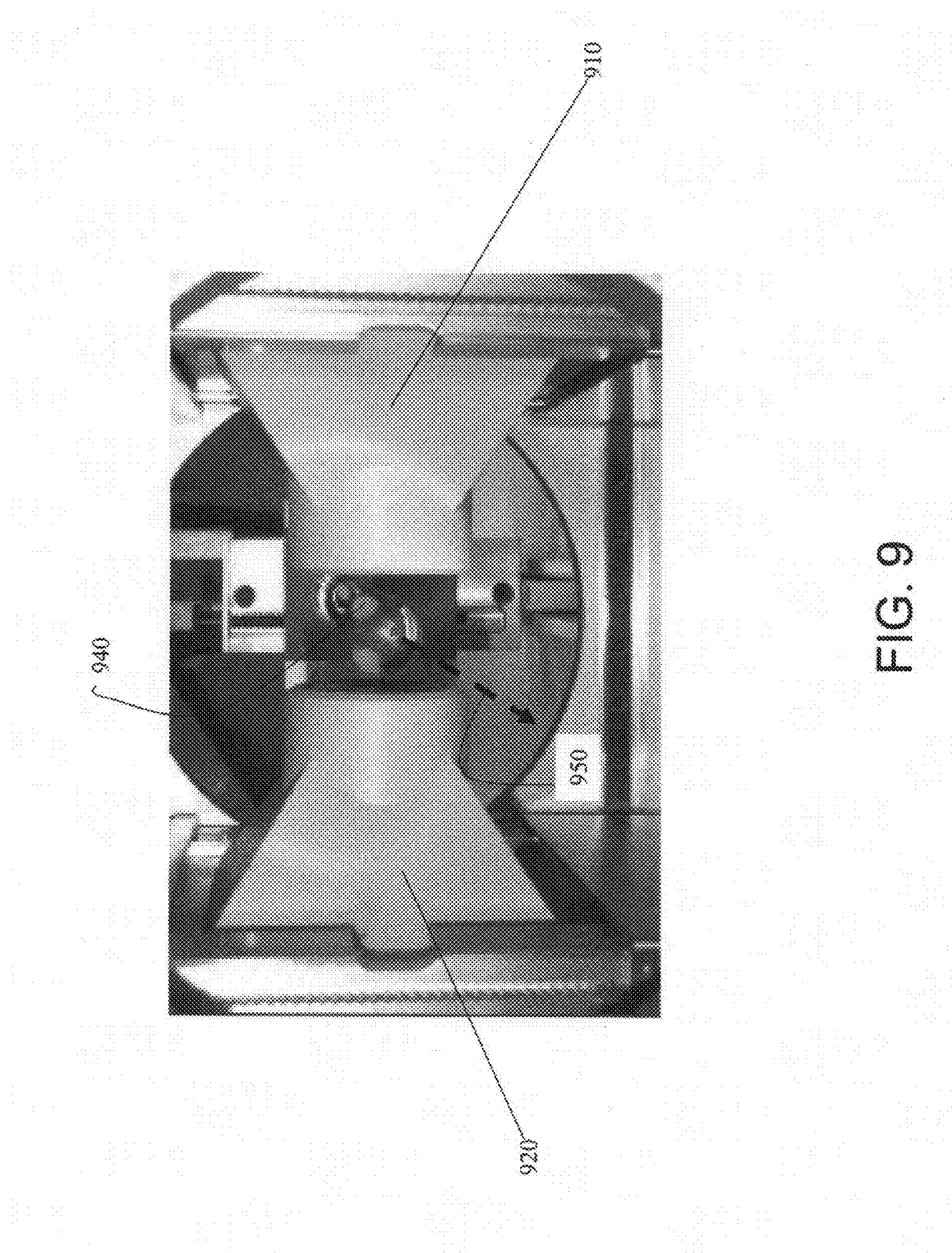
FIG. 9 depicts a multi-pinhole collimator having a first collimator on a first detector head and a second collimator on a second detector head pursuant to aspects of the present invention.

In one embodiment as shown in FIG. 9, the multi-pinhole collimator has a first collimator on a first detector head 910 and a second collimator on a second detector head 920. Here, depending on the frame of reference, the first collimator and the second collimator (or the multi-pinhole collimator) can be movable around an axis of rotation 950 of an object under study 940, and/or the object under study 940 can be rotated with respect to the first collimator and the second collimator (or the multi-pinhole collimator) along the axis of rotation 950.

Referring back to FIG. 2, in a focused pinhole aperture embodiment 260 of the present invention, the single photon nuclear imaging system includes the detector 250 for detecting gamma photons and the multi-pinhole collimator 200 having a plurality of patterned pinholes. In the present embodiment 260, the patterned pinholes are designed to be focused to a volume-of-interest (VOI) 290 of an object under study 240. That is, in this focused pinhole aperture embodiment 260, the patterned pinhole are tilted toward a center of the VOI 290.

Referring to FIGS. 8A and 8B, the multi-pinhole collimator 200 includes the collimator plate 220 having the patterned pinholes and the support base 230 for suspending the patterned pinholes of the collimator plate 220 between the object under study 240 and the detector 250.

In one embodiment as shown in FIGS. 6A and 7A, the plurality of patterned pinholes include a first pinhole 660, 760 corresponding to a position spaced away from a first side of a center of the volume-of-interest and a second pinhole 670, 770 corresponding to a position spaced away from a second side of the center of the volume-of-interest. In one embodiment, the plurality of patterned pinholes further include a third pinhole 630, 730 between the first pinhole 660, 760 and the second pinhole 670, 770 and corresponding to the center of the volume-of-interest.

Referring still to FIGS. 6A and 7A, in one embodiment, an angle less than 90° is formed between an axis 680, 780 of the first pinhole 660, 760 and the collimator plate 620, 720; an angle greater than 90° is formed between an axis 690, 790 of the second pinhole 670, 770 and the collimator plate 620, 720; and/or an angle at about 90° is formed between an axis of the third pinhole 630, 730 and the collimator plate 620, 720.

In more detail, for imaging an object under study that is a mouse and referring to FIG. 6A, an angle at 75.6° is formed between the axis 680 of the first pinhole 660 and the collimator plate 620, and an angle at 104.4° is formed between the axis 690 of the second pinhole 670 and the collimator plate 620.

For imaging an object under study that is a rat and referring to FIG. 7A, an angle at 76° is formed between the axis 780 of the first pinhole 760 and the collimator plate 720, and an angle at 104° is formed between the axis 790 of the second pinhole 770 and the collimator plate 720.

Referring back to both FIGS. 6A and 7A, the first pinhole 660, 760 has a region facing the object under study and defined by a first cut 660a, 760a into the collimator plate 620, 720 and a second cut 660b, 760b into the collimator plate 620, 720. In one embodiment, the region facing the object under study and defined by the first cut 660a, 760a into the collimator plate 620, 720 and the second cut 660b, 760b into the collimator plate 620, 720 is formed to have a funnel shape that is opened toward the object under study.

In more detail, for imaging an object under study that is a mouse and referring to FIG. 6A, an angle at 64° is formed between the first cut 660a and the second cut 660b.

For imaging an object under study that is a rat and referring to FIG. 7A, an angle at about 73° is formed between the first cut 760a and the second cut 760b.

In addition, as shown in FIGS. 6A and 7A, the first pinhole 660, 760 has another region opposite to the region facing the object under study and defined by a third cut into the collimator plate 620, 720 and a fourth cut into the collimator plate 620, 720. In one embodiment, this other region that is opposite to the region facing the object under study is formed to be substantially similar to the region facing the object under study and has a funnel shape that is opened toward the detector in an orientation opposite to the funnel shape of the region facing the object under study.

Referring back to FIG. 2, in a various collimator length embodiment 270 of the present invention, the single photon nuclear imaging system includes the detector 250 for detecting gamma photons and the multi-pinhole collimator 200 that are configured to have a plurality of collimator lengths. In the context of the present invention, a collimator length is referred to as a distance (or a direct distance) between one or more pinholes (or the collimator plate 220) and a surface of the detector 250 facing an object under study. Here, as shown in FIG. 2, the plurality of collimator lengths including a first pinhole collimator length 270a (e.g., 7 cm) for single photon nuclear imaging a first object of a first size (e.g., a mouse) with the detector 250 and a second pinhole collimator length 270b for single photon nuclear imaging a second object of a second size (e.g., a rat) with the detector 250.

In one embodiment, the second size is larger than the first size, and the first collimator length 270a is longer than the second collimator length 270b.

Figure 10:
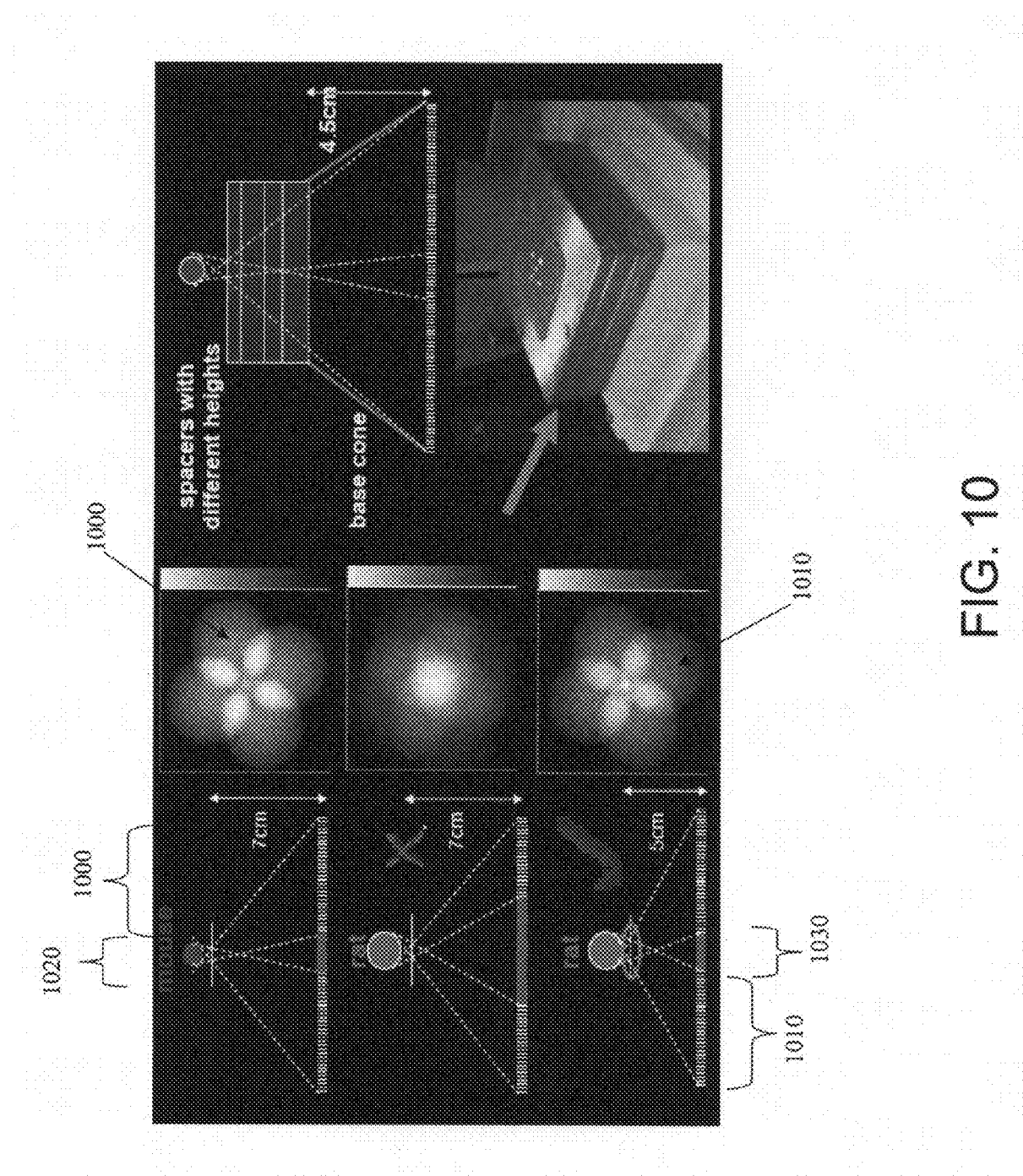
FIG. 10 depicts a multi-pinhole collimator, a first pinhole collimator length, and a second pinhole collimator length pursuant to aspects of the present invention.

Referring now also to FIG. 10, the multi-pinhole collimator 200 and the first pinhole collimator length 270a (e.g., 7 cm) are configured to guide a portion of the gamma photons passing through the multi-pinhole collimator 200 onto a surface of the detector 250 to form a plurality of first imaging areas 1000 on the surface of the detector 250, and the multi-pinhole collimator 200 and the second pinhole collimator length 270b (e.g., 5 cm) are configured to guide a portion of the gamma photons onto the surface of the detector 250 to form a plurality of second imaging areas 1010 on the surface of the detector 250.

As shown in FIG. 10, the plurality of second imaging areas 1010 on the surface of the detector 250 are substantially equal in size with the plurality of first imaging areas 1000 on the surface of the detector 250.

In one embodiment, the plurality of first imaging areas 1000 on the surface of the detector 250 are guided by the first pinhole collimator length 270a to have a first overlap 1020 with each other, and the plurality of second imaging areas 1010 on the surface of the detector 250 are guided by the second pinhole collimator length 270b to have a second overlap 1030 with each other. In one embodiment, the first overlap 1020 has a size substantially equal to that of the second overlap 1030.

Referring to FIGS. 8A and 8B, the multi-pinhole collimator 200 includes the collimator plate 220 and the support base 230 for suspending the collimator plate 220 between the object under study 240 and the detector 250.

Figure 17:
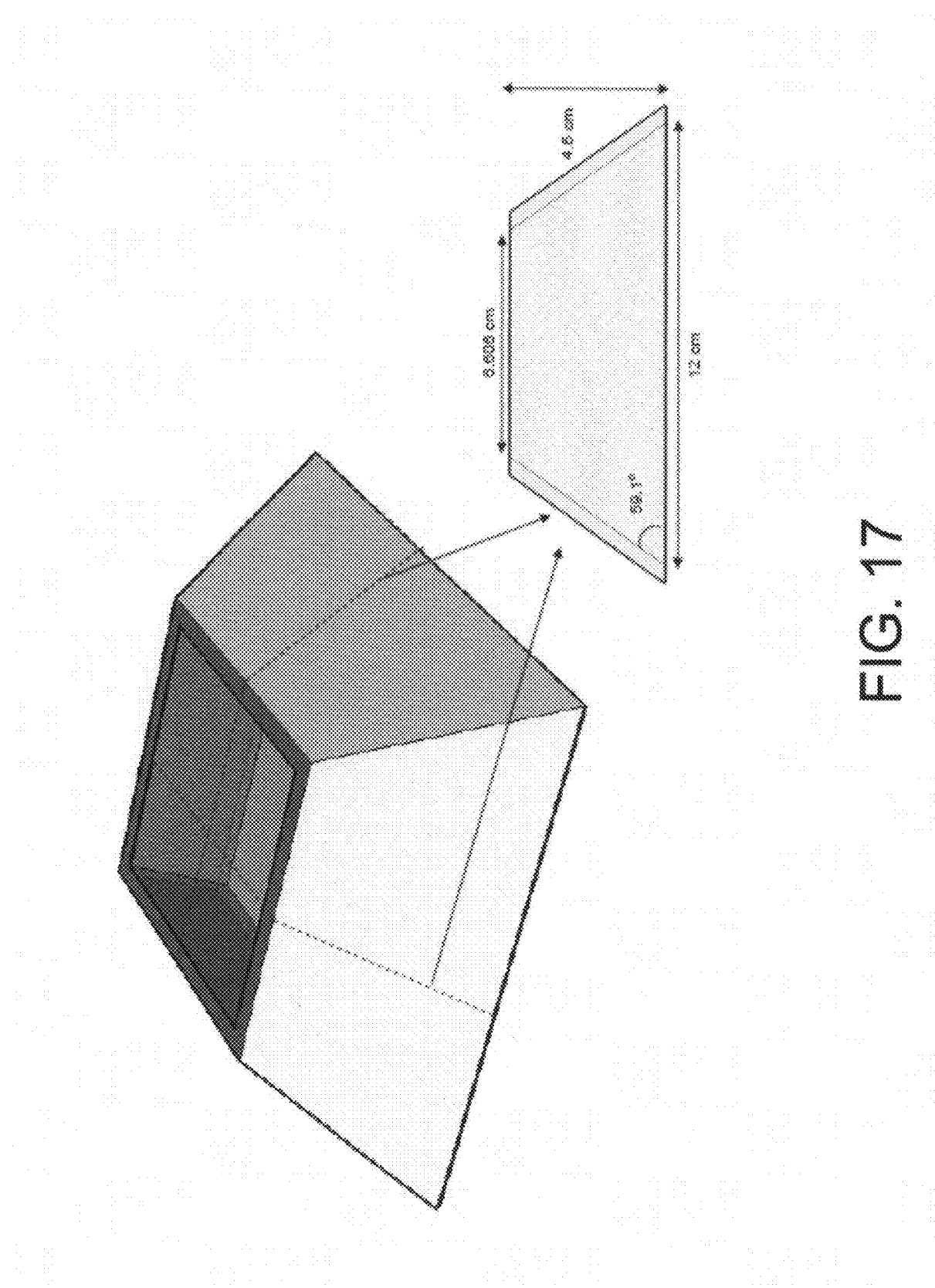
FIG. 17 illustrates a support base in accordance with an embodiment of the present invention.

Referring to FIG. 17, the support base 230 in one embodiment of the present invention has a pyramid-shaped body made of lead that suspends the collimator plate 220 near the object under study 240.

Figure 18:
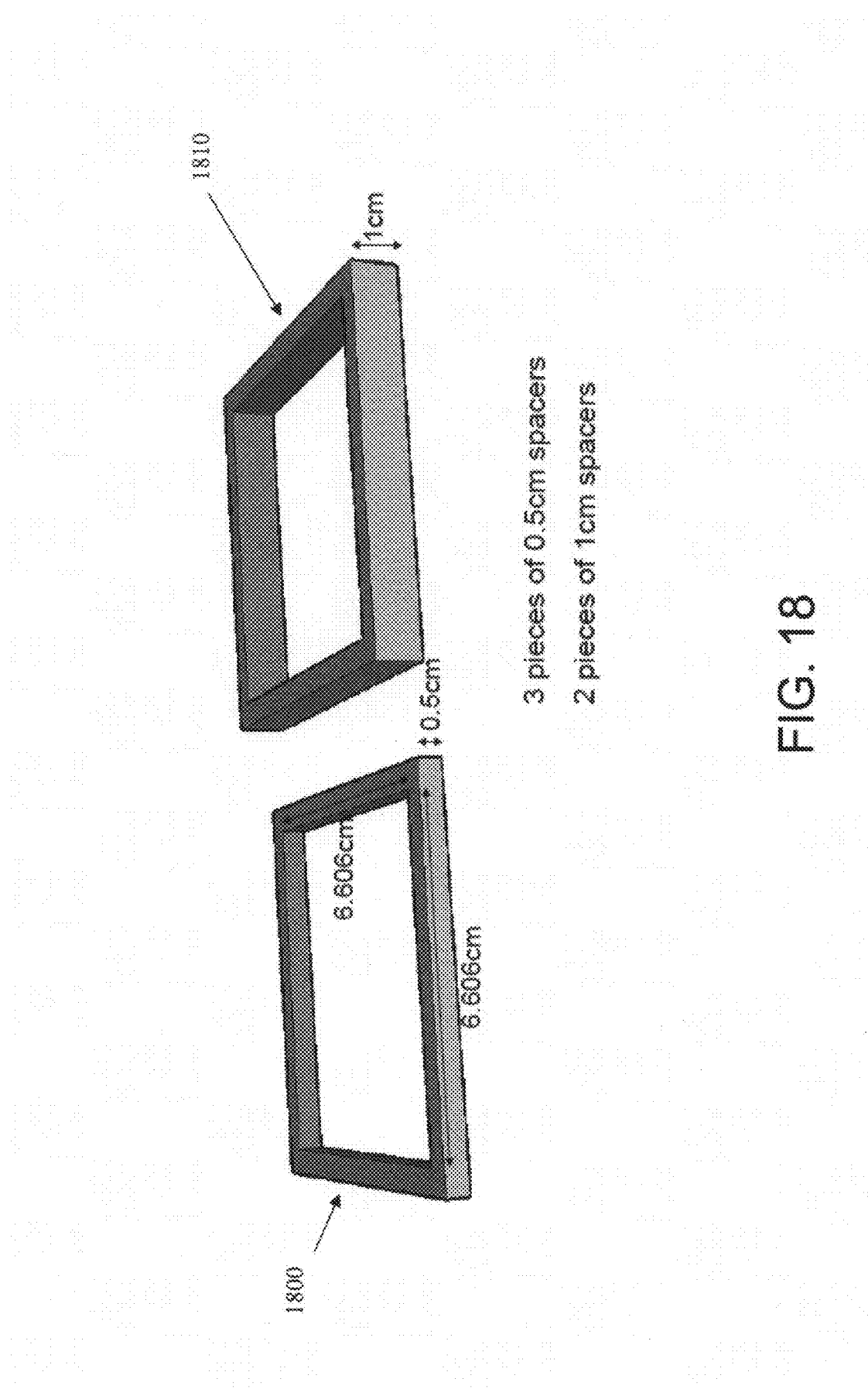
FIG. 18 illustrates spacers in accordance with embodiments of the present invention.

In addition, as shown in FIG. 18, at least one spacer can be formed between the collimator plate 220 and the support base 230. That is, the at least one spacer can include one or more first spacers 1800 and one or more second spacers 1810. The one or more first spacers 1800 and the one or more second spacers 1810 can be adapted to provide the first collimator length 270a and the second collimator length 270b such that the first collimator length 270a is longer than the second collimator length 270b. That is, in one embodiment, the second spacer 1810 has a height that is longer than that of the first spacer 1800. In one embodiment, the height of the second spacer 1810 is 1 cm, and the height of the first spacer 1800 is 0.5 cm. In one embodiment, the first spacer 1800 and the second spacer 1810 are respectively adapted to provide the second collimator length 270b and the first collimator length 270a such that the first collimator length 270a is longer than the second collimator length 270b.

Figure 11:
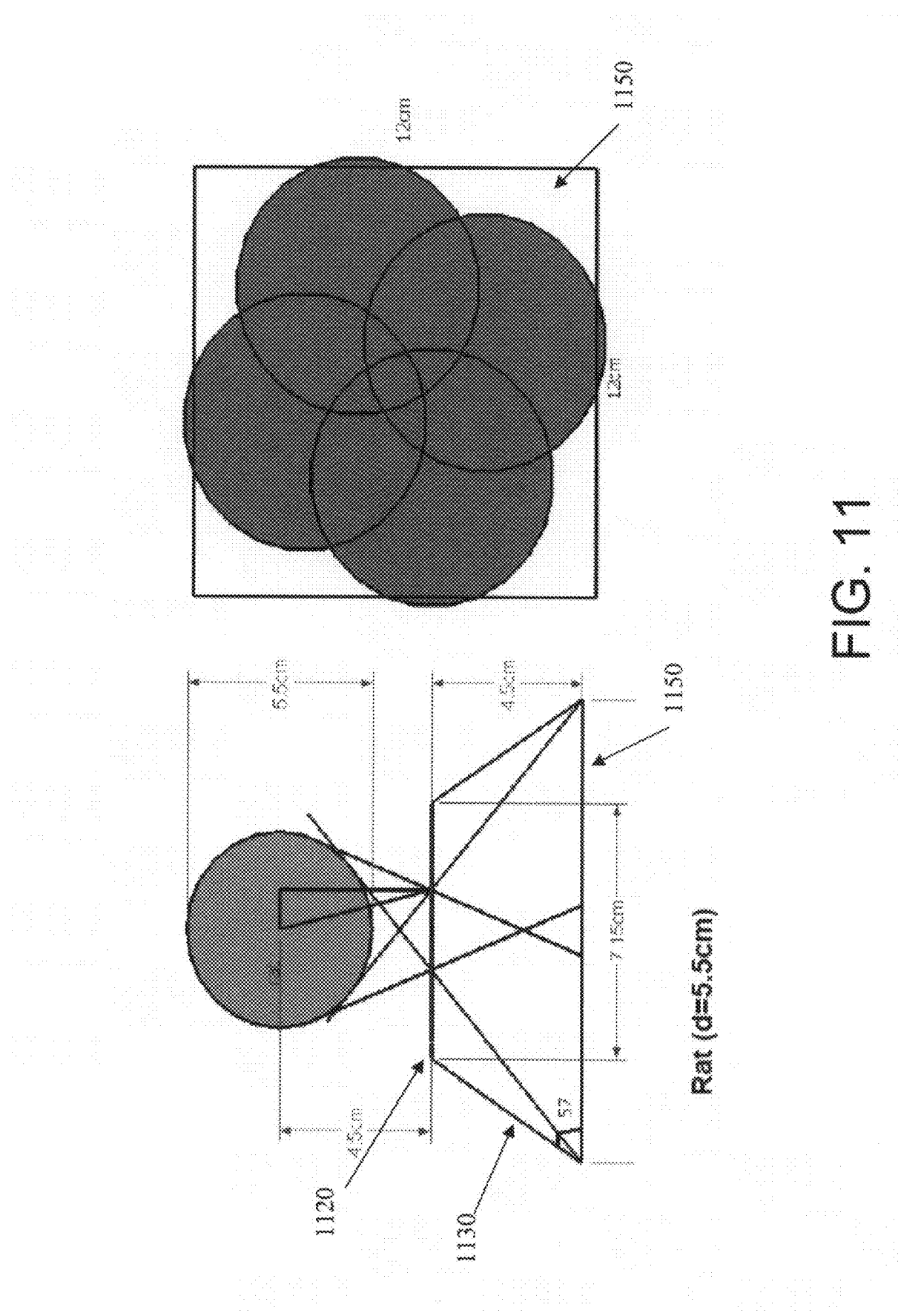
FIGS. 11, 12, and 13 are schematic representations, in side and plan views, of multi-pinhole collimators for single photon nuclear imaging rats of different sizes in accordance with embodiments of the present invention.
Figure 12:
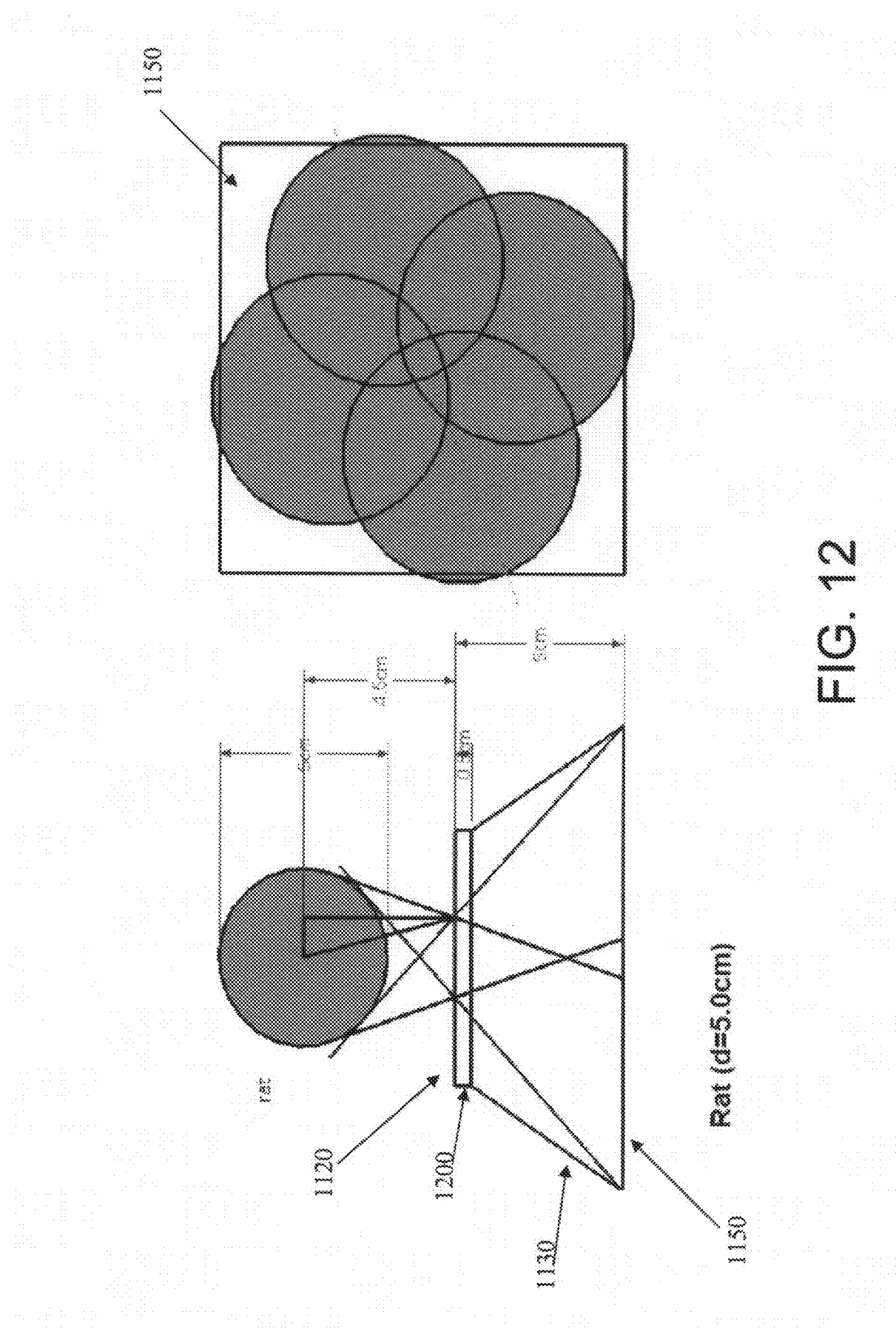
Figure 13:
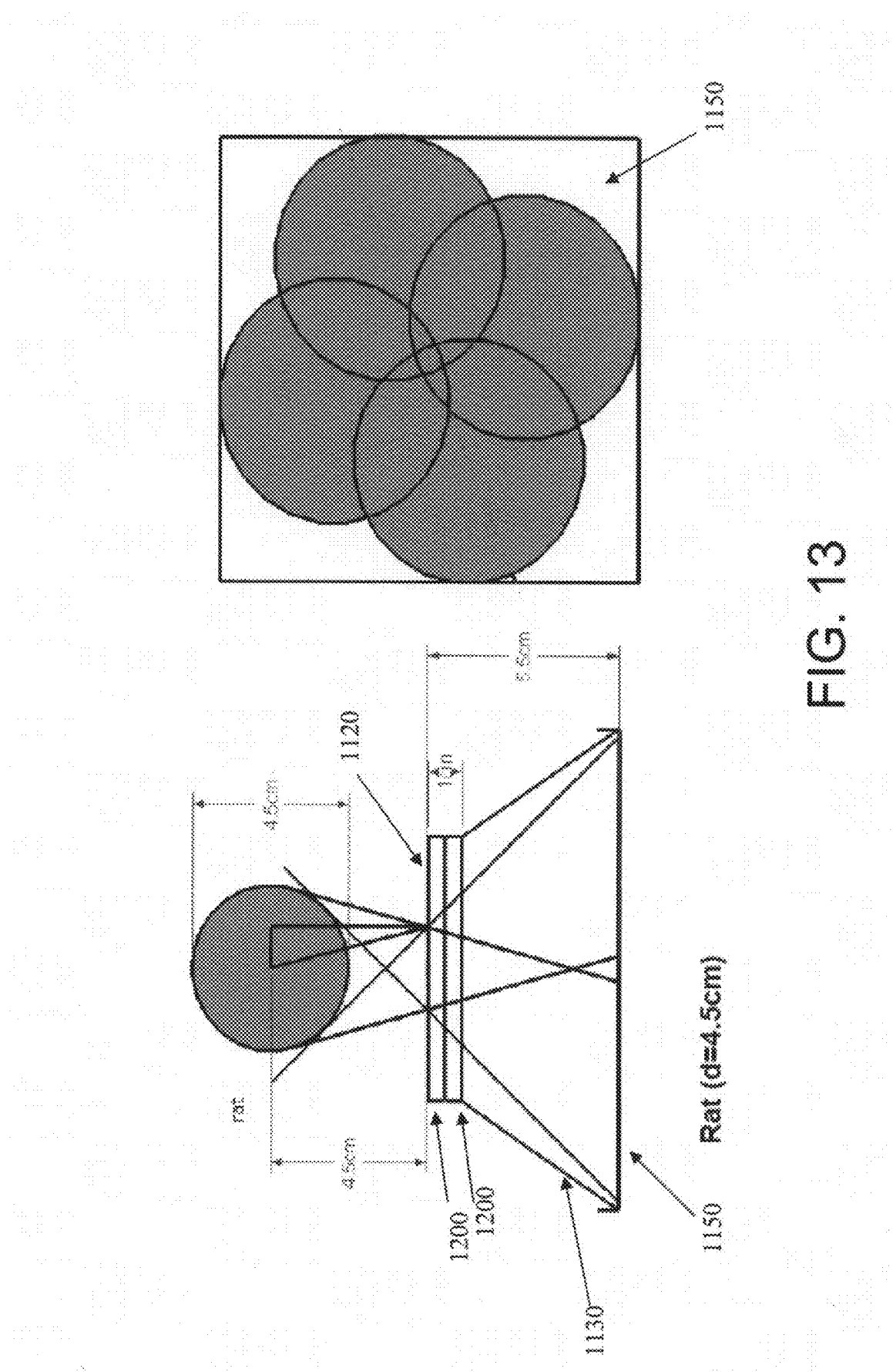

In more detail and referring now to FIGS. 11, 12, and 13, for single photon nuclear imaging a rat, a multi-pinhole collimator according to one embodiment of the present invention includes a collimator plate 1120 and a support base 1130 for suspending the collimator plate 1120 between the rat and a detector 1150. Here, the detector 1150 has a 12 cm by 12 cm detector plane (or surface). In FIG. 11, for single photon nuclear imaging a rat having a diameter of 5.5 cm, the support base 1130 has a height of 4.5 cm to provide a collimator length of about 4.5 cm so that a plurality of imaging areas as shown in FIG. 11 are projected on the detector plane of the detector 1150. In FIG. 12, for single photon nuclear imaging a rat having a diameter of 5 cm, a spacer 1200 having a height of 0.5 cm is provided between the collimator plate 1120 and the support base 1130 to provide a collimator length of about 5 cm so that a plurality of imaging areas as shown in FIG. 12 are projected on the detector plane of the detector 1150. In FIG. 13, for single photon nuclear imaging a rat having a diameter of 4.5 cm, two spacers 1200, each having a height of 0.5 cm, are provided between the collimator plate 1120 and the support base 1130 to provide a collimator length of about 5.5 cm so that a plurality of imaging areas as shown in FIG. 13 are projected on the detector plane of the detector 1150.

Figure 14:
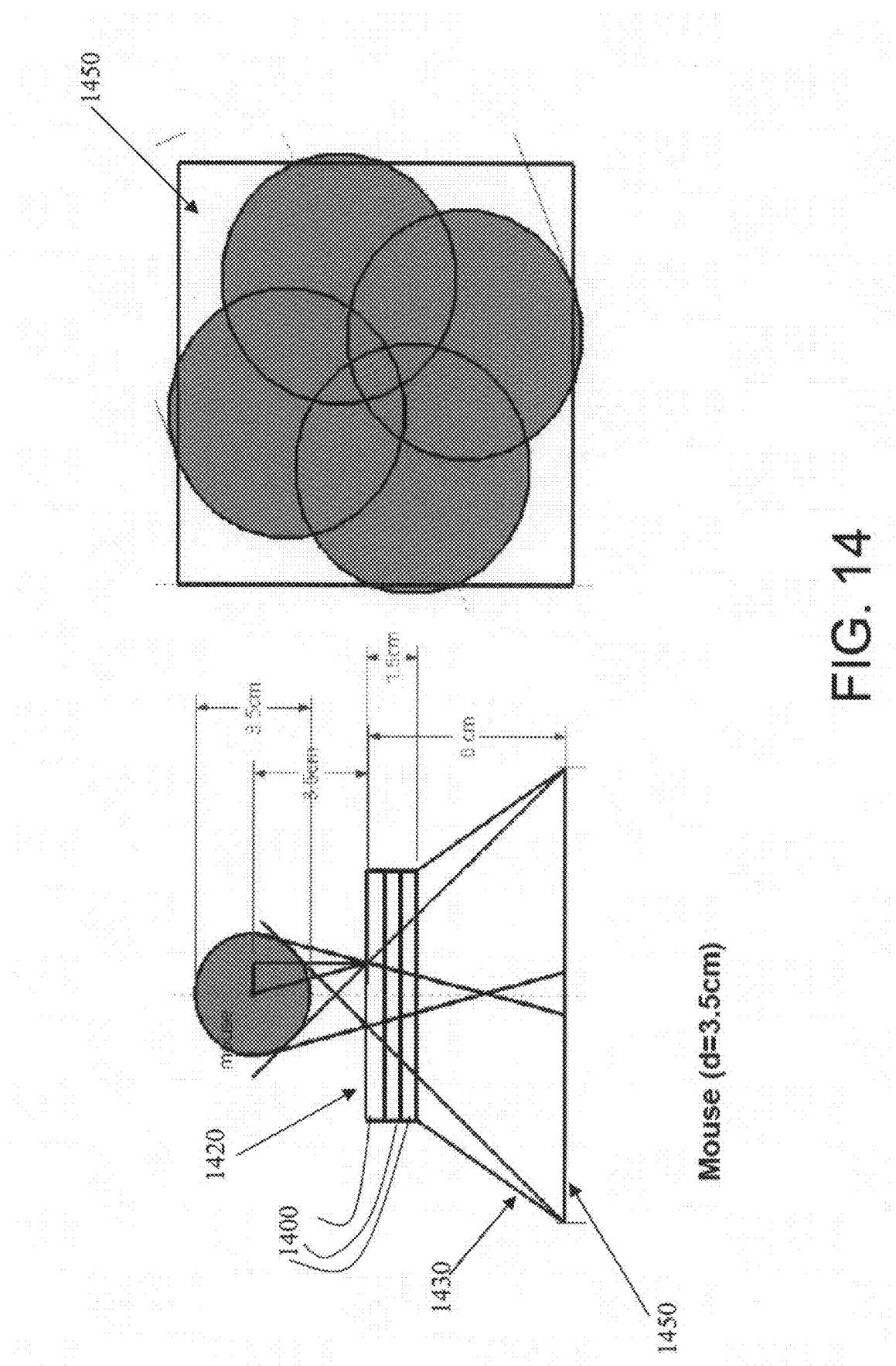
FIGS. 14, 15, and 16 are schematic representations, in side and plan views, of multi-pinhole collimators for single photon nuclear imaging mice of different sizes in accordance with embodiments of the present invention.
Figure 15:
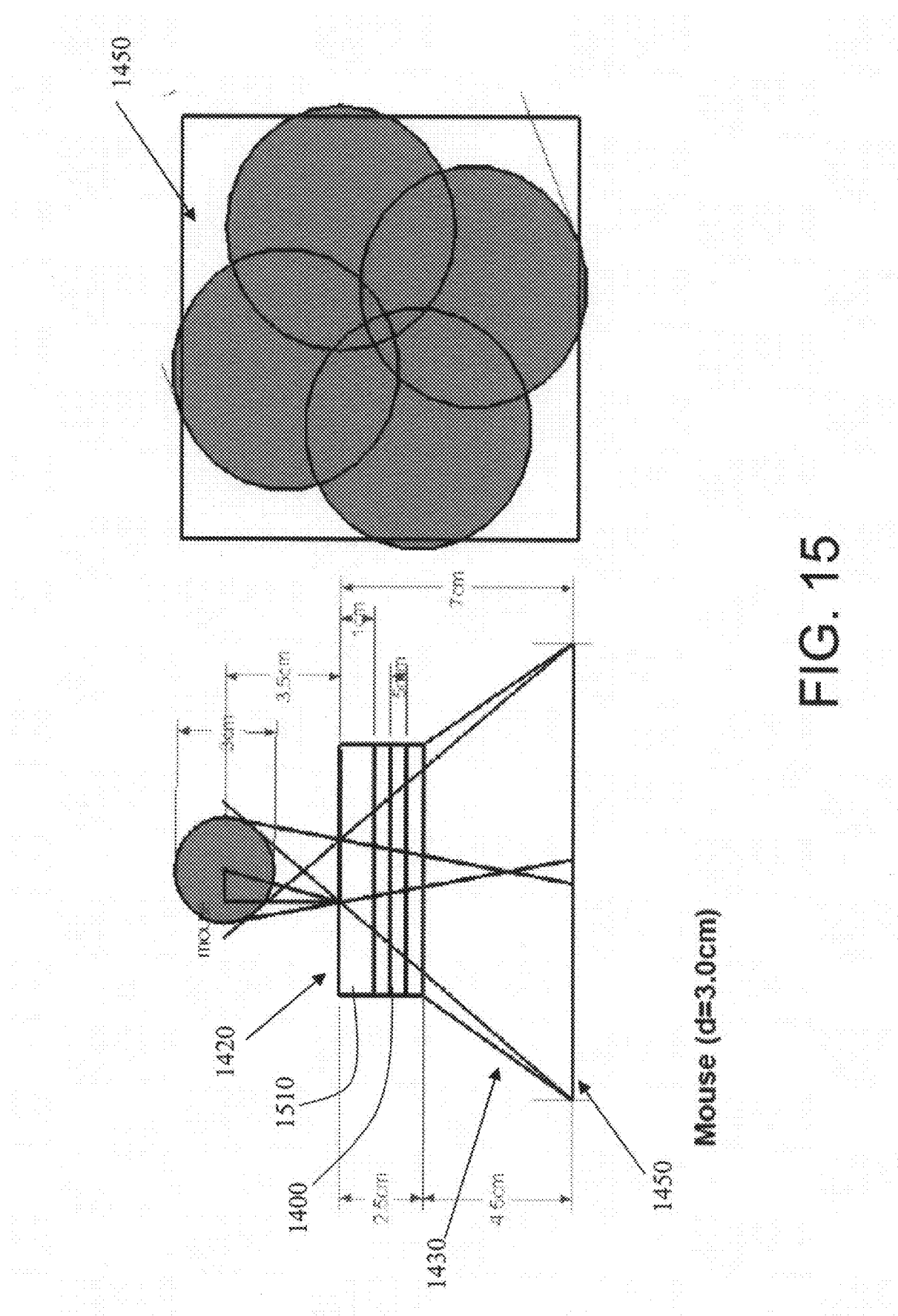
Figure 16:
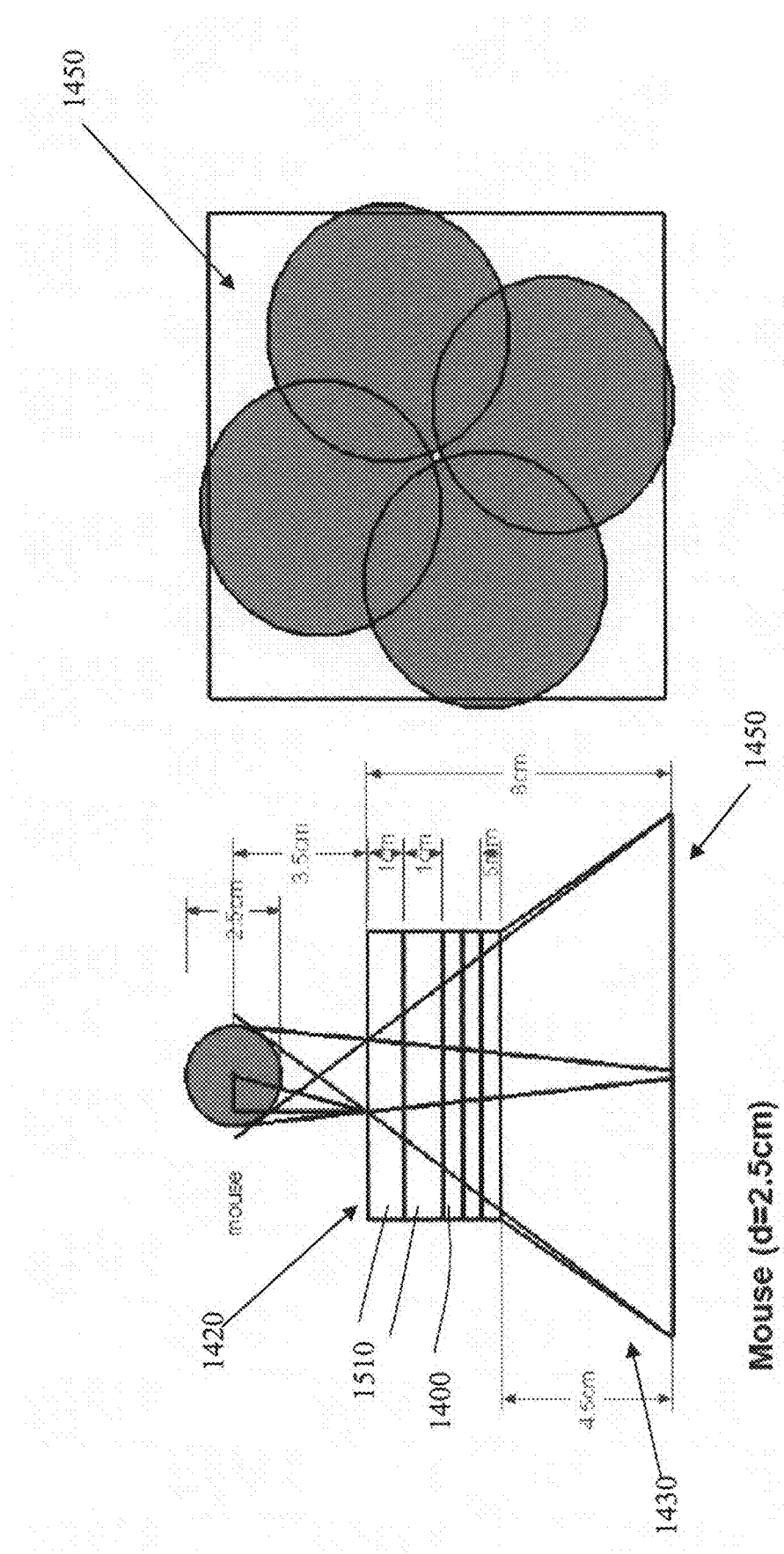

By contrast and referring now to FIGS. 14, 15, and 16, for single photon nuclear imaging a mouse, a multi-pinhole collimator according to one embodiment of the present invention includes a collimator plate 1420 and a support base 1130 for suspending the collimator plate 1420 between the mouse and a detector 1450. Here, in FIG. 14, for single photon nuclear imaging a mouse having a diameter of 3.5 cm, three spacers 1400, each having a height of 0.5 cm, are provided between the collimator plate 1420 and the support base 1430 to provide a collimator length of about 5.5 cm so that a plurality of imaging areas as shown in FIG. 14 are projected on a detector plane (or surface) of the detector 1450. In FIG. 15, for single photon nuclear imaging a mouse having a diameter of 3.0 cm, besides the three spacers 1400, an additional spacer 1510 having a height of 1 cm is provided between the collimator plate 1420 and the support base 1430 to provide a collimator length of about 7 cm so that a plurality of imaging areas as shown in FIG. 15 are projected on the detector plane of the detector 1450. In FIG. 16, for single photon nuclear imaging a mouse having a diameter of 2.5 cm, besides the three spacers 1400, two additional spacers 1510, each having a height of 1 cm, are provided between the collimator plate 1420 and the support base 1430 to provide a collimator length of about 8 cm so that a plurality of imaging areas as shown in FIG. 16 are projected on the detector plane of the detector 1450.

As such, in one embodiment of the present invention, as shown in FIGS. 11 to 16, a single photon nuclear imaging system is provided with various collimator lengths ranging from 4.5 cm to 8 cm to single photon nuclear image various objects (e.g., mouse and/or rat) having diameters ranging from 2.5 cm to 5.5 cm.

Figure 19:
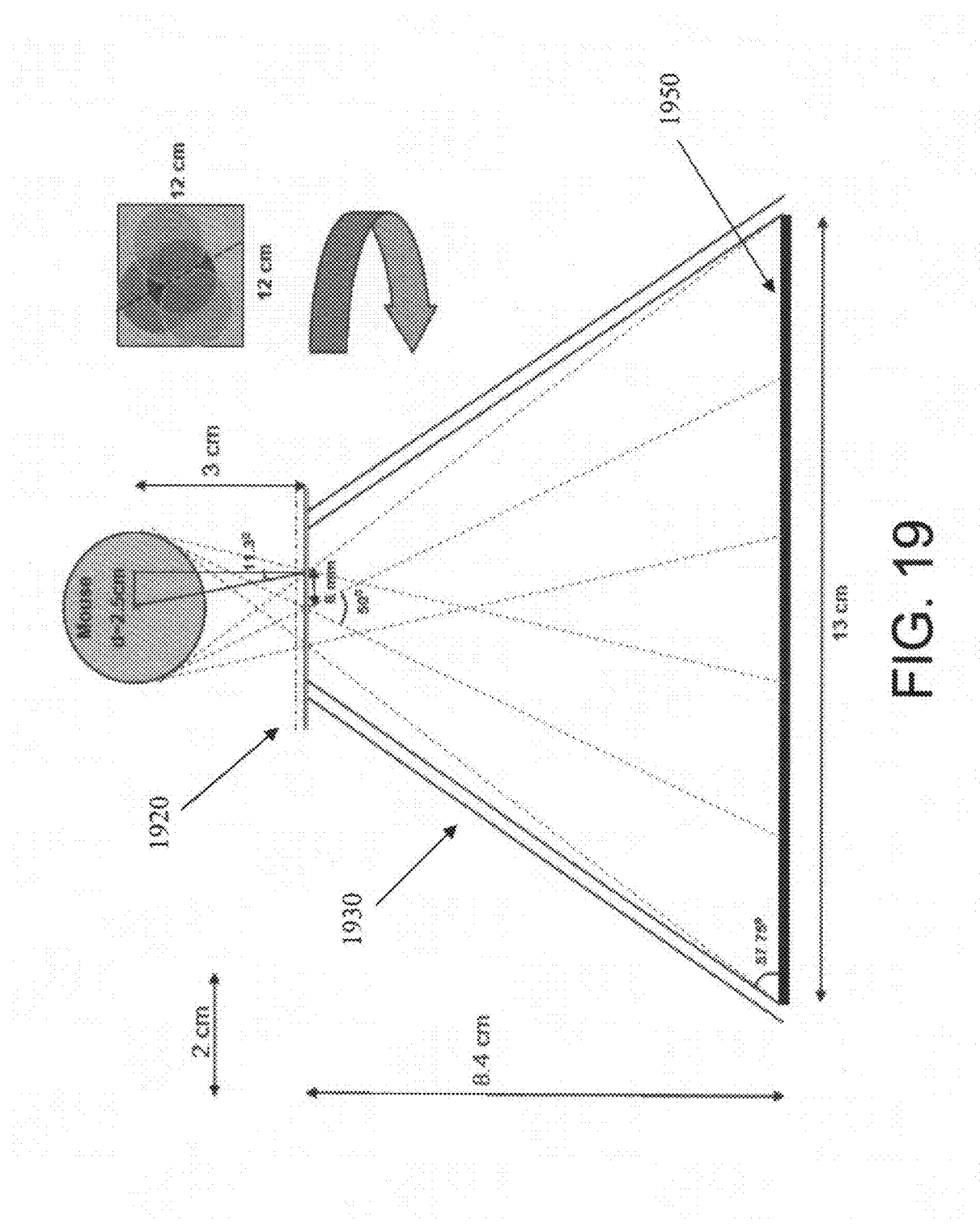
FIG. 19 is a schematic of a single photon nuclear imaging system with a support base in accordance with an embodiment of the present invention.
Figure 20:
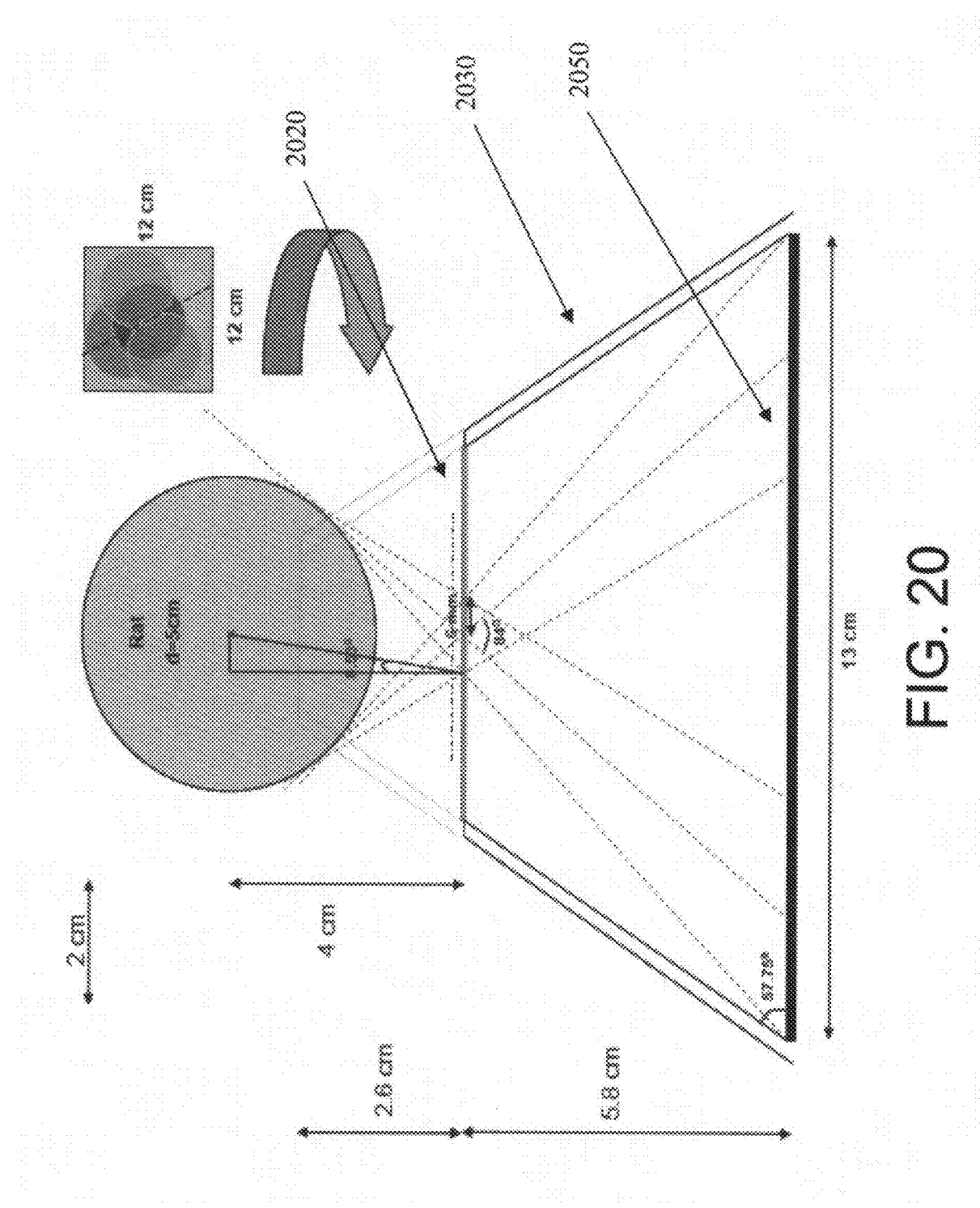
FIG. 20 is a schematic of a single photon nuclear imaging system with a support base in accordance with another embodiment of the present invention.

Referring to FIG. 19, in one embodiment of the present invention, a single photon nuclear imaging system includes a first collimator plate 1920 and a first support base 1930 having a first height (e.g., 8.4 cm) for suspending the first collimator plate 1920 between a first object under study (e.g., a mouse having a diameter of 2.5 cm) and a detector (e.g., detector 1950). In addition, as shown in FIG. 20, the single photon nuclear imaging system according to one embodiment of the present invention includes a second collimator plate 2020 and a second support base 2030 having a second height (e.g., 5.8 cm) for suspending the second collimator plate 2020 between a second object under study (e.g., a rat having a diameter of 5 cm) and a detector (e.g., detector 2050).

In one embodiment, the first height of the first support base 1930 and the second height of the second support base 2030 are respectively adapted to provide the first collimator length and the second collimator length such that the first collimator length is longer than the second collimator length.

In one embodiment of the present invention, multiple pixellated detector heads are provided to a single imaging system. Here, the embodiment can obtain improved intrinsic resolution and thereby use the entire system of rotating detectors to effectively have a single head with better intrinsic resolution than a single head is actually capable of obtaining.

In more detail, one embodiment of the present invention changes the position of a collimator with respect to its corresponding detector (or vice versa) for each of the multiple detector heads to enhance the resolution of the detector. U.S. Pat. No. 6,838,672 for HIGH RESOLUTION, MULTIPLE DETECTOR TOMOGRAPHIC RADIONUCLIDE IMAGING BASED UPON SEPARATED RADIATION DETECTION ELEMENTS, by Douglas J. Wagenaar et al., which is incorporated by reference herein in its entirety, describes a nuclear imaging system having multiple detector heads and how changing the position of collimators with respect to their corresponding detectors (or vice versa) can enhance resolution. One embodiment of the present invention extends this concept for enhancing resolution to a multi-pinhole and multi-head nuclear imaging system. That is, an embodiment of the present invention accounts for intrinsic resolution in order to find an optimum number of pinholes and geometrical configuration of the pinholes relative to an object under study and a detector; and, in an enhancement of this embodiment, the multi-pinhole and multi-head nuclear imaging system in an enhanced embodiment of the present invention is provided with collimators that are strategically placed with respect to their corresponding detectors (or vice versa) to further enhance overall resolution.

Figure 21:
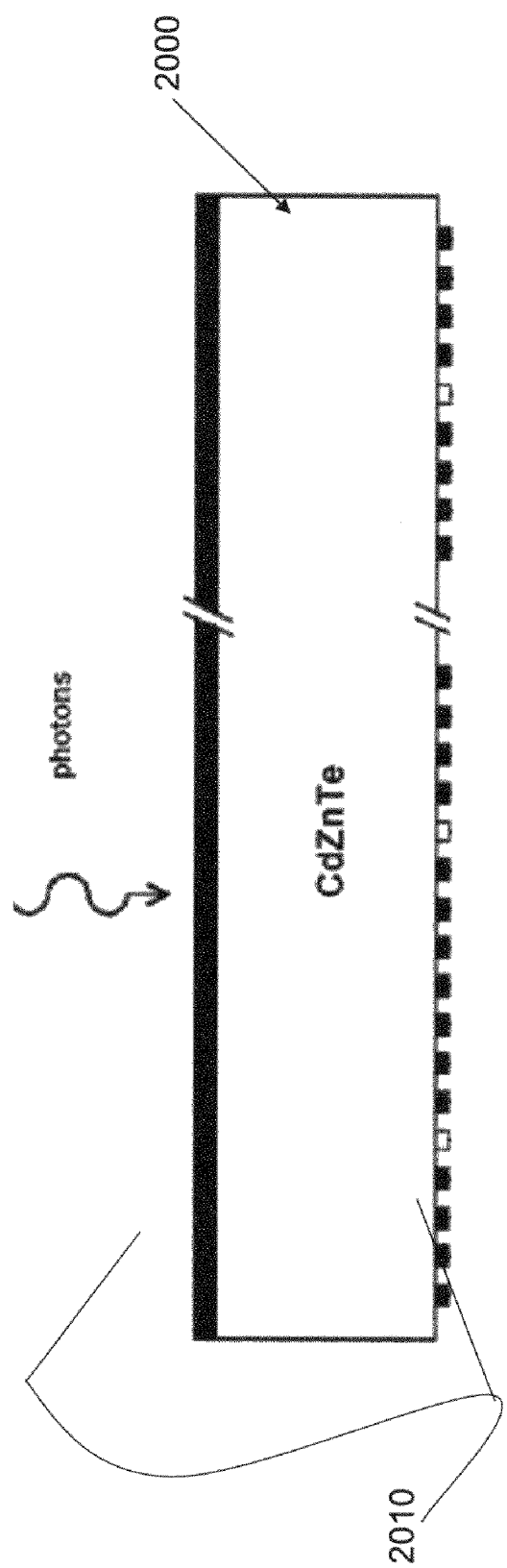
FIG. 21 illustrates a semiconductor detector in accordance with an embodiment of the present invention.

Also, referring to FIG. 21, a semiconductor detector according to an embodiment of the present invention includes a semiconductor substrate (or crystal) 2000 for producing charge carriers (electrons or holes) through interaction with gamma photons and electrodes (e.g., anodes or cathodes) 2010 for collecting the charge carriers. In FIG. 21, the substrate 2000 is made mainly of CZT. However, the present invention is not thereby limited, and a substrate of a semiconductor radiation detector can be made mainly of another compound semiconductor such as silicon (Si), germanium (Ge), cadmium telluride (CdTe), mercuric iodide ($HgI_2$), thallium bromide (TlBr), gallium arsenide (GaAs), and cadmium manganese telluride (CdMnTe).

The principle of operation of a semiconductor detector is the following: if a photon penetrates the detector it produces electron-hole pairs along its path, the number being proportional to the energy of the photon. An externally applied electric field separates the pairs before they recombine; electrons drift toward the anode, and holes to the cathode; the charge is collected by the anode and electrodes (charge collection) 2010. The collected charge produces a current pulse on the electrode 2010, whose integral equals the total charge generated by the incident particle; i.e., is a measure of the deposited energy. The readout goes through a charge-sensitive preamplifier, followed by a shaping amplifier.

One embodiment of the present invention includes pixellated semiconductor imaging modules made of CZT. However, the semiconductor imaging module does not necessarily have to be CZT, and it can be another compound semiconductor such as silicon (Si), germanium (Ge), cadmium telluride (CdTe), mercuric iodide ($HgI_2$), thallium bromide (TlBr), gallium arsenide (GaAs), and cadmium manganese telluride (CdMnTe). In one embodiment, these modules are square and planar and can be tiled to form a line (i.e., a ladder) or a rectangular mosaic of modules. The semiconductor does not generally interrupt the operation of the MRI components, and the strong magnetic field does not generally disturb the functionality of the semiconductor detector. Having both modalities capable of simultaneous or adjacent and sequential imaging can thus be realized.

In one embodiment of the present invention, a single nuclear imaging system includes a detector for detecting gamma photons and a multi-pinhole collimator having a plurality of patterned pinholes. Here, the detector includes a plurality of pixellated detectors. The multi-pinhole collimator includes a plurality of multi-pinhole collimators respectively corresponding to the plurality of pixellated detectors, wherein, for a particular target projection sampling of the object under study, each of the plurality of pixellated detectors with its corresponding one of the plurality of multi-pinhole collimators provides a different sampling contribution, and wherein the different sampling contributions of the plurality of pixellated detectors are summed to provide a substantially complete sampling of the object under study at the particular target projection.

In one embodiment, each of the plurality of pixellated detectors includes an array of detector pixels that is offset from pixel arrays of others of the plurality of pixellated detectors such that, for the particular target projection sampling of the object under study, the plurality of pixellated detectors with the plurality of multi-pinhole collimators respectively provide the different sampling contributions that are summed to provide the substantially complete sampling of the object under study at the particular target projection.

In one embodiment, each of the plurality of pixellated detectors includes a square array of detector pixels that is offset from square pixel arrays of others of the plurality of pixellated detectors such that, for the particular target projection sampling of the object under study, the plurality of pixellated detectors with the plurality of multi-pinhole collimators respectively provide the different sampling contributions that are summed to provide the substantially complete sampling of the object under study at the particular target projection.

In one embodiment, each of the plurality of pixellated detectors includes a hexagonal array of detector pixels that is offset from hexagonal pixel arrays of others of the plurality of pixellated detectors such that, for the particular target projection sampling of the object under study, the plurality of pixellated detectors with the plurality of multi-pinhole collimators respectively provide the different sampling contributions that are summed to provide substantially complete sampling of the object under study at the particular target projection.

In one embodiment, each of the multi-pinhole collimators includes a pattern of pinholes that is offset from pinhole patterns of others of the plurality of the multi-pinhole collimators such that, for the particular target projection sampling of the object under study, the plurality of pixellated detectors with the plurality of multi-pinhole collimators respectively provide the different sampling contributions that are summed to provide the substantially complete sampling of the object under study at the particular target projection.

In one embodiment, the plurality of pixellated detectors are respectively coupled to the plurality of multi-pinhole collimators to form at least two separate detector heads movable around the axis-of-rotation of the object under study.

In one embodiment, the at least two separate detector heads are offset from each other at the particular target projection such that, for the particular target projection sampling of the object under study, the plurality of pixellated detectors with the plurality of multi-pinhole collimators respectively provide the different sampling contributions that are summed to provide the substantially complete sampling of the object under study at the particular target projection.

In one embodiment, the plurality of pixellated detectors are respectively coupled to the plurality of multi-pinhole collimators to form at least three separate detector heads movable around the axis-of-rotation of the object under study.

In one embodiment, the at least three separate detector heads are offset from each other at the particular target projection such that, for the particular target projection sampling of the object under study, the plurality of pixellated detectors with the plurality of multi-pinhole collimators respectively provide the different sampling contributions that are summed to provide the substantially complete sampling of the object under study at the particular target projection.

In one embodiment, the plurality of pixellated detectors are respectively coupled to the plurality of multi-pinhole collimators to form at least four separate detector heads movable around the axis-of-rotation of the object under study.

In one embodiment, the at least four separate detector heads are offset from each other at the particular target projection such that, for the particular target projection sampling of the object under study, the plurality of pixellated detectors with the plurality of multi-pinhole collimators respectively provide the different sampling contributions that are summed to provide the substantially complete sampling of the object under study at the particular target projection.

In one embodiment of the present invention, a single nuclear imaging system includes a detector for detecting gamma photons and a multi-pinhole collimator having a plurality of patterned pinholes. Here, the detector includes a plurality of homogenous area detectors. The multi-pinhole collimator includes a plurality of multi-pinhole collimators respectively corresponding to the plurality of homogenous area detectors, wherein, for a particular target projection sampling of the object under study, each of the plurality of homogenous area detectors with its corresponding one of the plurality of multi-pinhole collimators provides a different sampling contribution, and wherein the different sampling contributions of the plurality of homogenous area detectors are summed to provide a substantially complete sampling of the object under study at the particular target projection.

Figure 22:
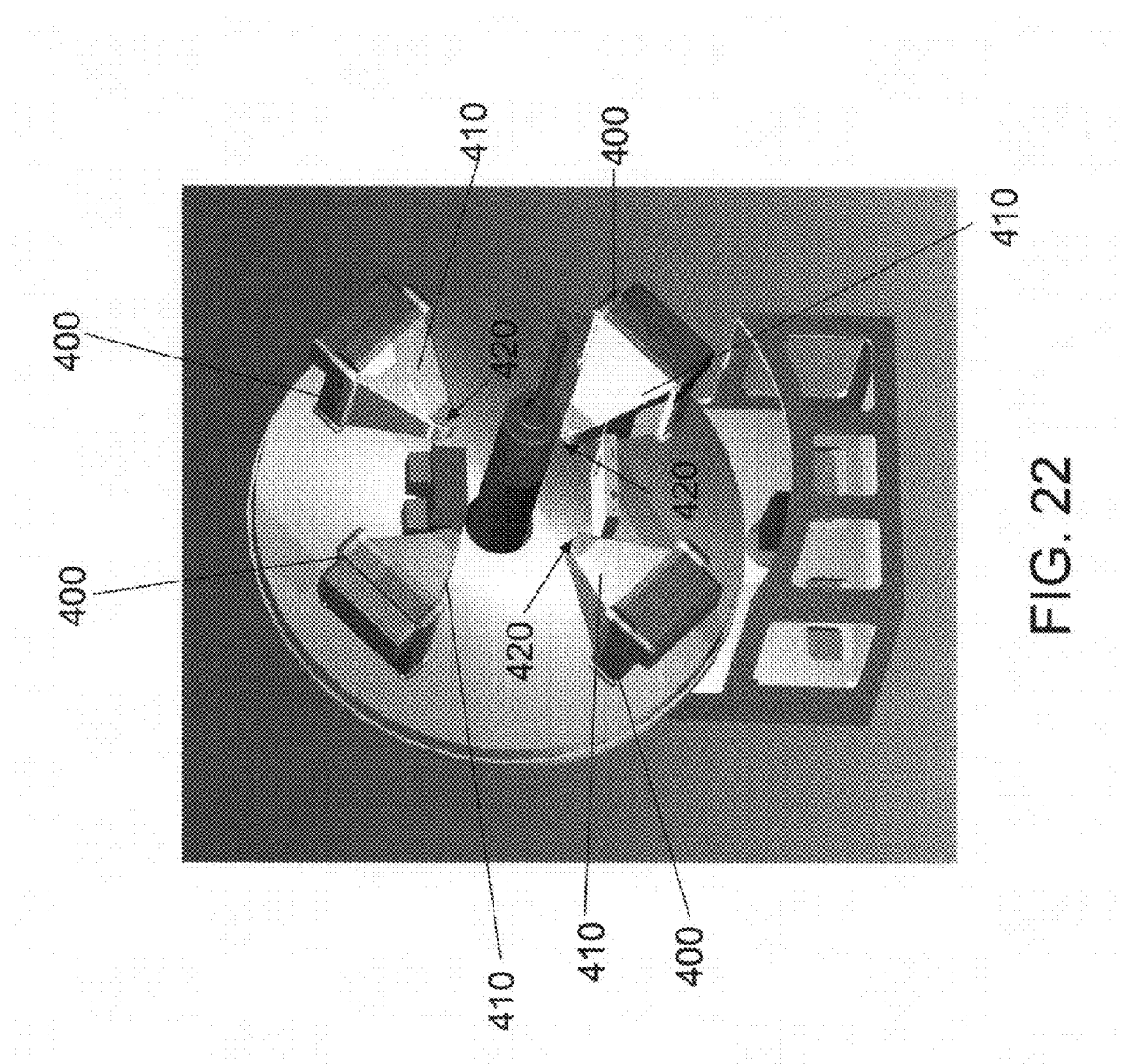
FIG. 22 is a perspective view of a single photon nuclear imaging system pursuant to an embodiment of the present invention.

FIG. 22 depicts a single photon nuclear imaging system pursuant to an embodiment of the present invention. As shown in FIG. 22, the imagining system includes a four head detector (or detector heads) 400 with four pinhole collimators between the detector 400 and the object (e.g., a small animal) being imaged. Here, each of the four pinhole collimators includes one or more pinholes 420 and a pyramid-shaped support base 410 made of lead that suspends the pinholes 420 near the object being imaged. That is, the detector heads 400 are shielded from radiation by the pyramid-shaped support bases 410 of lead that suspends the pinholes 420 near the object being imaged to single photon nuclear image the object being imaged with the detector heads 400.

Referring back to FIG. 1, an embodiment of the invention provides a system and method for SPECT image quality improvement. The embodiment includes methods, instrumentations, and associated algorithms and software for both high-resolution and high detection efficiency imaging that leads to lower image noise and artifact-free synthetic aperture SPECT images. Also, the embodiment provides design parameters, hardware settings, and data acquisition methods for optimal imaging of objects with different sizes.

As shown, the embodiment of FIG. 1 improves SPECT image quality by providing a collimator design optimization and a reconstruction method optimization. In one embodiment, the reconstruction method is optimized by providing for modeling accuracy and efficiency and for geometric misalignment estimation and correction. Here, the present embodiment uses a theoretical framework to provide a reconstruction software 140 so that modeling accuracy and efficiency can result and/or a calibration method 150 so that geometric misalignment estimation and correction can be made. In more detail, relatively more complicated iterative 3D image reconstruction techniques need to be used with nonstandard pinhole data acquisition geometries versus a standard pinhole SPECT imaging geometries involving the use of a pinhole collimator with a single pinhole aperture, while tomographic projection data are acquired on a planar circular orbit with a flat 2D detector. Examples of the nonstandard pinhole data acquisition geometries include the use of double or triple detectors, multi-pinhole collimator, helical scanning orbits, etc. That is, to implement image reconstruction techniques, there should be accurate geometric descriptions of the projection operators for these nonstandard pinhole data acquisition geometries, which can be very complex when considering geometric misalignments caused by mechanical imperfections. It is also crucial to estimate and then correct for geometric misalignments (a.k.a. geometric calibrations) in pinhole or cone-beam tomographic imaging geometries in order to minimize degradations and/or artifacts in the reconstructed images. To facilitate the translation of geometric calibration methods and improve the efficiency of implementing image reconstruction algorithms capable of correcting for geometric misalignments, embodiments of the present inventions unify the geometric descriptions of projection operators in homogeneous coordinates for standard and nonstandard pinhole SPECT imaging geometries.

Figure 23:
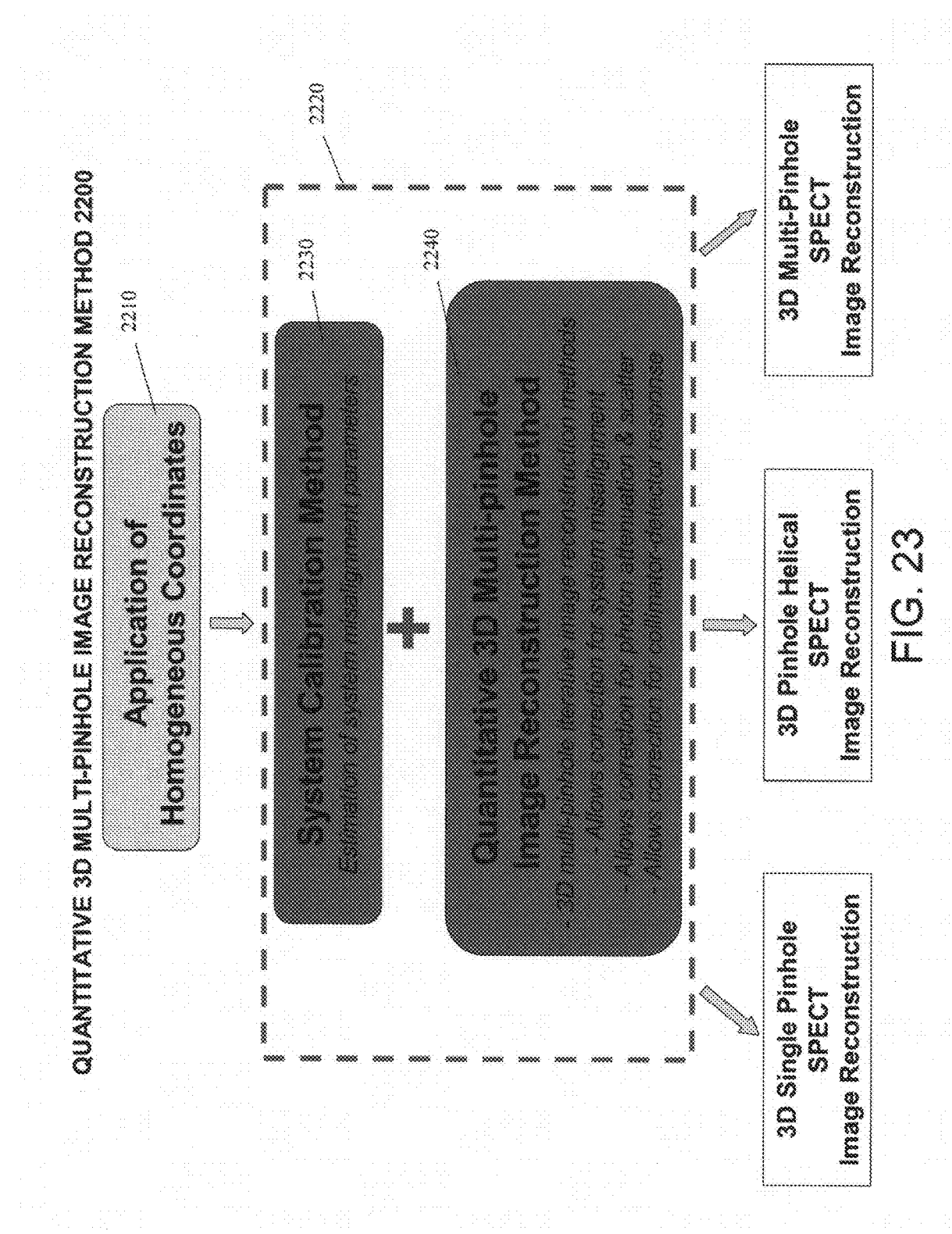
FIG. 23 illustrates a quantitative 3D multi-pinhole image reconstruction method in accordance with an embodiment of the present invention.

Referring to FIG. 23, a quantitative 3D multi-pinhole image reconstruction method 2200 in accordance with an embodiment of the present invention is shown. In step 2210 of this embodiment, homogenous coordinates are applied to unify the geometric descriptions of projection operators for standard and nonstandard pinhole SPECT imaging geometries. In step 2200, a system calibration method 2230 is applied to provide an estimation of system misalignment parameters. Also, in step 2200, a quantitative 3D multi-pinhole image reconstruction method 2240 is applied. The quantitative 3D multi-pinhole image reconstruction method 2240 provides 3D multi-pinhole iterative image reconstruction methods. In addition, the quantitative 3D multi-pinhole image reconstruction method 2240 allows correction for system misalignment, allows correction for photon attenuation and scatter, and/or allows correction for collimator-detector response.

In the context of the present embodiment, homogeneous coordinates refer to a quad of real numbers (x,y,z,t) with a non-zero t. A point (x,y,z,t) in homogeneous coordinates can be made to correspond to the point, (x/t, y/t, z/t) in Cartesian coordinates. The simple addition of the new coordinate (but not a dimension) t in homogeneous coordinates frees the present method of the present invention from the limitations of the Cartesian coordinates (in which, for example, translations can not be expressed by 3 by 3 matrices as rotations can) and allows one to unify all rigid-body transformations as simple 4 by 4 matrix multiplications. For example, the method can denote both rotation and translation in one matrix multiplication step as:

$$\begin{bmatrix} x' \\ y' \\ z' \\ t' \end{bmatrix} = \begin{bmatrix} & & & x_T \\ & R & & y_T \\ & & & z_T \\ 0 & 0 & 0 & 1 \end{bmatrix} \begin{bmatrix} x \\ y \\ z \\ 1 \end{bmatrix}, \quad (1)$$

where R denotes the same 3 by 3 rotation matrix in Cartesian space, but $(x_T, y_T, z_T)$ describes the translations in x, y, and z directions, respectively.

In embodiments of the present invention, which will be described in more detail below, homogeneous coordinates are used to allow unify geometric parameter definitions and compact matrix forms to describe the projection operators for various pinhole imaging geometries, and to establish the capability of obtaining high quality and artifact-free reconstruction images from both standard and several nonstandard pinhole SPECT imaging techniques designed for molecular imaging research.

Derivation of Projection Operators

In one embodiment of the present invention, when describing a projection operator in the Cartesian coordinates, one can use two sets of coordinates: $(x''_p, y''_p, z''_p)$ defining a point in the 3D object space, $(x_d, y_d)$ defining a point in the 2D detector space—where all the projection images are acquired. The description of an ideal geometric projection (a point in the object space projects to a point in the detector space) process results in two equations as:

$$x_d = P_x(x''_p, y''_p, z''_p), \quad (2)$$

$$y_d = P_y(x''_p, y''_p, z''_p). \quad (3)$$

In homogeneous coordinates, without loss of generality, one can write the same point in object space as $(x''_p, y''_p, z''_p, 1)$. Next, one can denote a point in the homogeneous detector space as $(x_D, y_D, z_D, n_D)$, where the new dimension $z_D$ is defined to be perpendicular to the detector plane such that all projection data are being acquired at $z_D=0$. At $z_D=0$, one can have simple conversions to the 2D Cartesian detector space: $x_d = x_D/n_D$ and $y_d = y_D/n_D$. Here, the goal is to derive a transformation described by $\Im$ such that $$[x_D\, y_D\, z_D\, n_D]^T = \Im \times [x''_p\, y''_p\, z''_p\, 1], \quad (4)$$

from which one can obtain equations 2 and 3 above.

For purposes of convenience, the following descriptions is limited to SPECT systems that have stationary axes-of-rotation (AOR) and provide accurate angular intervals between adjacent projection views. However, the present invention is not thereby limited Pinhole SPECT with a Single Planar Circular Orbit For a standard pinhole SPECT geometry with a single planar circular orbit and a flat detector, there exist three geometric references: a point (the center of the pinhole aperture), a line (the AOR), and a finite plane (the detector). Considering the existence of geometric misalignments in a pinhole SPECT system and the importance of taking them into account for accurate image reconstructions, seven geometric parameters are needed to describe the spatial relationships of the three geometric references and to generate $\Im$ in equation 4.

Figure 24:
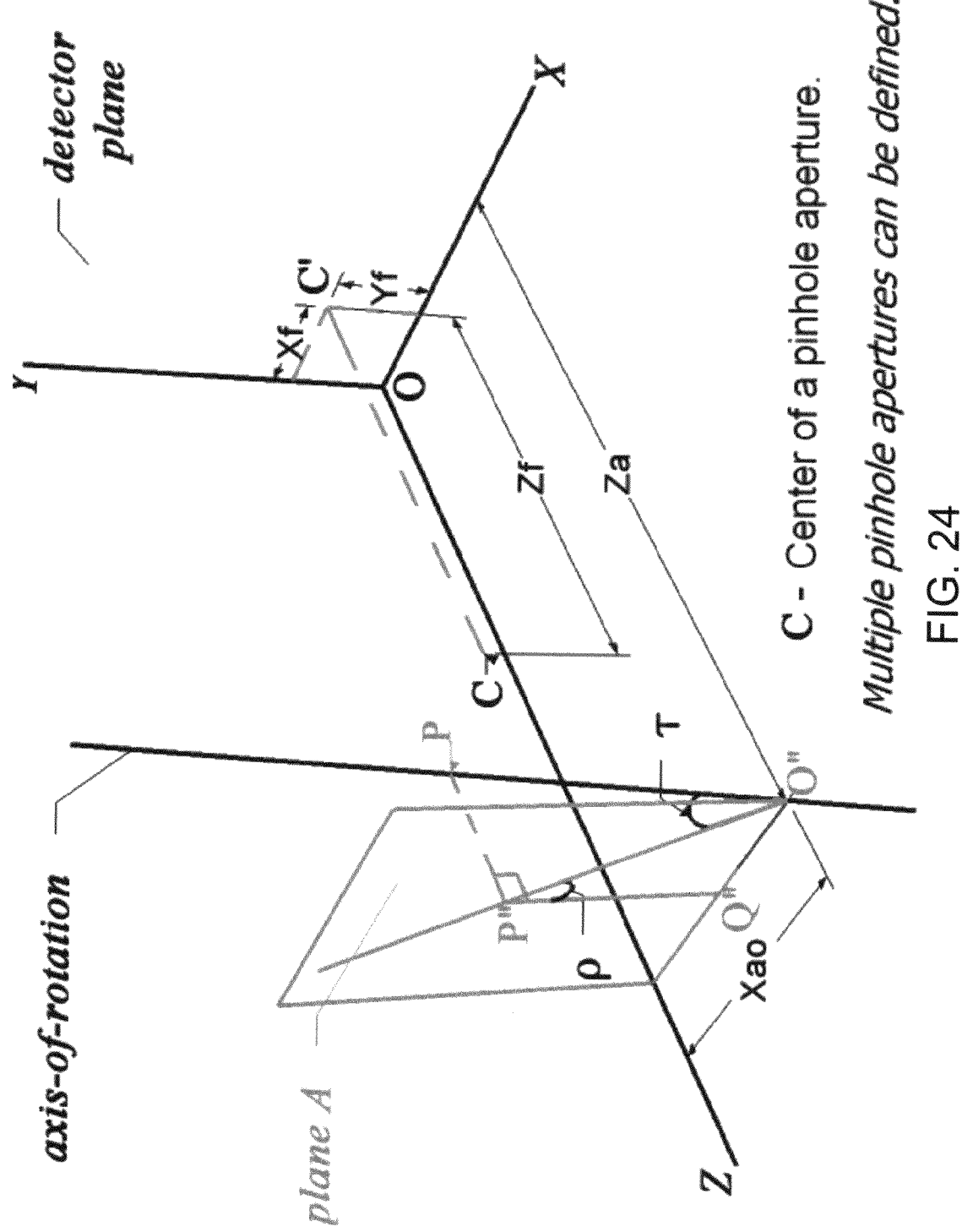
FIG. 24 is a schematic of a pinhole imaging geometry with various geometric parameters defined pursuant to aspects of the present invention.

Referring to FIG. 24, to define these seven geometric parameters, one can set up a XYZ coordinate system, which is attached to the detector with the X-axis parallel to the row and the Y-axis parallel to the columns of the projection data. The Z-axis is perpendicular to the detector plane and passing the center, O, of the 2D projection image.

In this detector-based system, three parameters $(x_F, y_F, z_F)$ are needed to define the center of the single pinhole aperture and four parameters $(x_{AO}, z_A, \tau, \rho)$ are needed to describe the AOR. Specifically, $x_{AO}$ and $z_A$ define the point, O", where the AOR intersects the X-Z plane, and the angular parameters $\tau$ and $\rho$ define the orientation of the AOR as the following. The plane A as shown in FIG. 24 is parallel to the X-Y plane and contains the point O". The line O"P" is the projection of the AOR onto plane A. The out-of-plane tilt angle $\tau$ is the angle between the AOR and the line O"P", and the in-plane skew angle $\rho$ is the angle between the line P"Q" (parallel to the Y-axis) and the line O"P". Both angular parameters are defined based on counter clockwise conventions. Parameter $z_F$ is the distance from the center of the pinhole aperture to the detector, and commonly referred to as the focal length.

Similar derivation of equation 4 in cone-beam CT with a single planar circular orbit can be performed, which can be directly applied to the mathematically equivalent pinhole geometry. For purposes of completeness, this derivation in the context of pinhole SPECT imaging is briefly described below.

Referencing the XYZ coordinate system, for the detector plane, one can define a X"Y"Z" coordinate system describing the object space and having its Y" axis lying on the AOR. The origin O" of the X"Y"Z" system is shown in FIG. 24 (the point at which the Y" axis intersects the X-Z plane of the detector system). The rotation of the imaging system around the AOR is defined by the projection angle, $\alpha$ (counter clockwise definition), such that when $\alpha=0$, the X"-axis will be parallel to the X-Y plane of the detector system.

At an arbitrary projection angle $\alpha$, several rotation steps can be taken to align the object and the detector coordinate systems. First, with the Y"-axis fixed, the X"-Z" plane of the object system is rotated clockwise by an angle $\alpha$, such that the X"-axis is parallel to the detector X-Y plane. Next, with the new X"-axis fixed, the Y"-Z" plane is rotated by an angle $\tau$, such that the Y"-axis is also parallel to the detector X-Y plane, resulting in that the new Z"-axis is parallel to the Z-axis of the detector system. With the new Z"-axis fixed, the X"-Y" plane is rotated by an angle $\rho$, so that both X" and Y" axes will be parallel to the X and Y axes, respectively. The above steps to align the object space with the detector space can be written as a matrix $R^h$ in homogeneous coordinates.

To summarize, $$R^h = \begin{bmatrix} & & & 0 \\ & R & & 0 \\ & & & 0 \\ 0 & 0 & 0 & 1 \end{bmatrix}, \quad (5)$$

where $$R = R_\rho \times R_\tau \times R_\alpha \quad (6)$$

$$= \begin{bmatrix} \cos\rho & -\sin\rho & 0 \\ \sin\rho & \cos\rho & 0 \\ 0 & 0 & 1 \end{bmatrix} \begin{bmatrix} 1 & 0 & 0 \\ 0 & \cos\tau & \sin\tau \\ 0 & -\sin\tau & \cos\tau \end{bmatrix} \begin{bmatrix} \cos\alpha & 0 & \sin\alpha \\ 0 & 1 & 0 \\ -\sin\alpha & 0 & \cos\alpha \end{bmatrix}$$

At this point, the object and the detector coordinate systems only have translational differences defined by $x_{AO}$ and $z_A$. Using homogeneous coordinates, these translations can be expressed by $$T^h = \begin{bmatrix} 1 & 0 & 0 & x_{A0} \\ 0 & 1 & 0 & 0 \\ 0 & 0 & 1 & z_A \\ 0 & 0 & 0 & 1 \end{bmatrix}. \quad (7)$$

The projection process is finalized by describing the magnification of a pinhole geometry at $z=0$ using $A^h$, where the center of the single pinhole aperture is defined by $z_F$, $x_F$, and $y_F$ in the detector system as:

$$A^h = \begin{bmatrix} 1 & 0 & -x_F/z_F & 0 \\ 0 & 1 & -y_F/z_F & 0 \\ 0 & 0 & 0 & 0 \\ 0 & 0 & -1/z_F & 1 \end{bmatrix}. \quad (8)$$

The overall projection process $\Im$ defined in equation 5 can be summarized as:

$$[x_D y_D z_D n_D]^T = A^h \times M^h \times [x''_p y''_p z''_p 1]^T \quad (9)$$

where $M^h = T^h \times R^h$, and $(x_D, y_D, z_D, n_D)$ and $(x''_p, y''_p, z''_p, 1)$ represent the homogeneous coordinate notations of the Cartesian XYZ and X"Y"Z" coordinate systems, respectively.

The resulting $A^h$, $T^h$, and $R^h$ contain seven system geometric parameters that can be defined as: $x_F$, $y_F$, $z_F$, $x_{AO}$, $z_A$, $\tau$, and $\rho$. It should be noted that one should not define electronic shifts and $(x_F, y_F)$ simultaneously due to their degeneracy when involving other parameters in this geometry. Also, the present invention should not be thereby limited. Alternatively, for example, other geometric definitions, such as the angular parameters, could be used for replacing $(x_F, y_F)$ or electronic shifts. Parameters $(x_F, y_F)$ are used in this description for the convenience of carrying out the subsequent derivations.

Multi-Pinhole SPECT with a Single Circular Orbit

One embodiment of the present invention extends the above derivations in pinhole SPECT with a single planar circular orbit to a multi-pinhole geometry, in which multiple pinhole projections are acquired on a single flat detector. Note that in this type of multi-pinhole geometry, different pinhole apertures are sharing the same object and detector spaces, such that one only need to add one set of $(x_F, y_F, z_F)$ for each additional pinhole aperture. As shown in FIG. 24, the center of the nth pinhole aperture can be simply defined with a new set of $(x_{Fn}, y_{Fn}, z_{Fn})$. Every pinhole aperture will contribute to the projection process through equation 9, but with a different $A_n^h$ ($R^h$ and $T^h$ are independent of pinhole aperture). This can be written as:

$$[x_D y_D z_D n_D]^T = A_n^h \times M^h \times [x''_p y''_p z''_p 1]^T. \quad (10)$$

Figure 25:
FIG. 25 depicts a 5-pinhole collimator mounted on a camera. A close-up view of the pinhole apertures is shown on the right.

The final projection image will be the sum of all contributions from the multiple pinholes represented by $n=1, 2, \ldots, N$, where N is the number of pinhole apertures and the transformation specific for each pinhole is $A_n^h$. An example of $N=5$ is shown in FIG. 25.

Single Pinhole SPECT with a Helical Orbit

In a single pinhole SPECT with a helical orbit acquisition geometry, the object translates longitudinally during SPECT acquisitions. This translation of the object in the X"Y"Z" coordinate system between two adjacent angular positions is not necessarily parallel to the AOR due to possible mechanical misalignments, and can be denoted as:

$$S^h = \begin{bmatrix} & & & x''_h \\ & 0 & & y''_h \\ & & & z''_h \\ 0 & 0 & 0 & 1 \end{bmatrix}, \quad (11)$$

such that the projection process becomes:

$$[x_D y_D z_D n_D]^T = A^h \times M^h \times (S^h)^i \times [x''_p y''_p z''_p 1] \quad (12)$$

where i is the number of times the shift has occurred at the current acquisition angle $\alpha$.

Single Pinhole SPECT using Dual Camera-Detector

In single pinhole SPECT using dual camera-detectors, a reasonable assumption is that both camera-detectors rotate around a common AOR during the data acquisition process. To describe the imaging geometry of the additional detector as shown in the above derivations in pinhole SPECT with a single planar circular orbit, two new coordinate systems are needed: $_2X_2Y_2Z$ for the projection space defined by the new detector and $_2X''_2Y''_2Z''$ for the object space, where the $_2Y''$-axis lies along the AOR as shown in FIG. 25. In more detail, FIG. 25 shows a 5-pinhole collimator mounted on the camera. The close-up view of the pinhole apertures are shown in the picture on the right.

Figure 26:
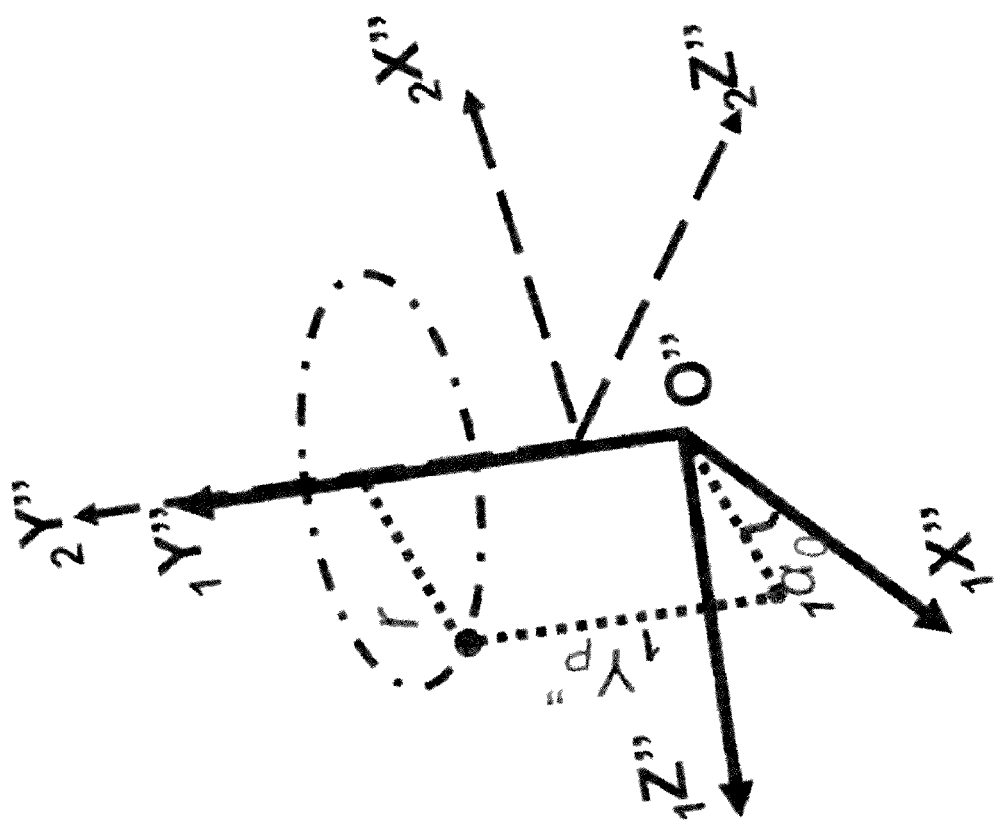
FIG. 26 illustrates additional object coordinates $_2X"_2Y"_2Z"$ defined due to the introduction of the second detector in pinhole SPECT with dual detectors. These new coordinates are related to the first object space $_1X"_1Y"_1Z"$ by a simple rotation and a translation along the axis-of-rotation.

For an arbitrary point $(x''_p, y''_p, z''_p, 1)$ in the $_1X''_1Y''_1Z''$ coordinate system (i.e., X"Y"" described above), $x''_p$ and $z''_p$ can be replaced with r and $\alpha_0$ in polar coordinates as:

$$(x''_p, y''_p, z''_p) = (r \cos\alpha_0, y''_p, r \sin\alpha_0), \quad (13)$$

where r is the distance between the point and the AOR, and $\alpha_0$ is the polar angle of this distance vector as shown in FIG. 26. That is, in FIG. 26 additional object coordinates $_2X''_2Y''_2Z''$ are defined due to the introduction of the second detector in pinhole SPECT with dual detectors. These new coordinates are related to the first object space $_1X''_1Y''_1Z''$ by a simple rotation and a translation along the axis-of-rotation.

Similarly, in the $_2X''_2Y''_2Z''$ system, r, $_2\alpha_0$, and $_2y''_p$ can be used to describe the same point. Denoting the mismatch of $_2X''_2Y''_2Z''$ and X"Y"Z" coordinate systems using an angular difference $\Delta\alpha_0 = _2\alpha_0 - \alpha_0$ and a vertical difference $\Delta y''_p = _2y''_p - y''_p$, the two coordinate systems are related by a matrix:

$$B^h = \begin{bmatrix} \cos(\Delta\alpha_0) & 0 & -\sin(\Delta\alpha_0) & 0 \\ 0 & 1 & 0 & \Delta y''_p \\ \sin(\Delta\alpha_0) & 0 & \cos(\Delta\alpha_0) & 0 \\ 0 & 0 & 0 & 1 \end{bmatrix}, \quad (14)$$

and the projection process for the second detector with respect to the object defined in X"Y"Z" (instead of $_2$X"$_2$Y"$_2$Z") system can be expressed as:

$$[_2x_D \,_2y_D \,_2z_D \,_2n_D]^T =\,_2A^h \times\,_2M^h \times B^h \times [x''_p \, y''_p \, z''_p \, 1]^T. \quad (15)$$

Note that $_2A^h$ and $_2R^h$ in the above equation are given by the geometric parameters of the second detector system as discussed above in pinhole SPECT with a single planar circular orbit.

This process does not require interpolations of the acquired projection data from either detector due to the independent use of two detector spaces while the two object spaces are related by a simple translation (along the AOR) and rotation (with respect to the AOR).

Geometric Calibrations

The goal of geometric calibrations for a standard pinhole geometry is to estimate the seven unknown parameters in matrices $A^h$, $T^h$, and $R^h$, so that the geometric misalignments can be taken into account during the reconstruction process to avoid image artifacts or resolution degradations. Specifically the unknown parameters are $x_F$, $y_F$, $z_F$, $x_{AO}$, $z_A$, $\tau$, and $\rho$. Achieving sufficiently accurate direct measurements of the seven geometric parameters can be very challenging for high-resolution cone-beam CT or pinhole SPECT studies. Direct measurements of the system matrix can be time consuming and are generally used for stationary systems. A more flexible and practical approach is to determine the geometric parameters characterizing the misalignment through analyzing the tomographic projections of a simple calibration phantom acquired using the misaligned imaging system. In one embodiment of the present invention, a simple calibration phantom composed of three point objects with known distances from each other is used to characterize such an imaging geometry. Using parameters defined in homogeneous coordinates, it can be shown how this can be adapted and extended for non-standard pinhole geometries as described below.

Geometric Calibrations in a Standard Pinhole Geometry

The simplest calibration phantom is a point source. That is, by starting with explicitly expressing equations 2 and 3 using the results from equations 5 through 9. At any acquisition angle $\alpha$, making use of equation 13, one can have:

$$x_d(\alpha) = \frac{1}{r\cos\tau\sin(\alpha-\alpha_0) + y''_p\sin\tau + z_F -} \quad (16)$$
$$z_A\{rz_F[\cos\rho\cos(\alpha-\alpha_0) + \sin\tau\sin\rho\sin(\alpha-\alpha_0)] +$$
$$rx_F\cos\tau\sin(\alpha-\alpha_0) +$$
$$y''_p(x_F\sin\tau - z_F\cos\tau\sin\rho) + z_Fz_{AO} - x_Fz_A\}$$

$$y_d(\alpha) = \frac{1}{r\cos\tau\sin(\alpha-\alpha_0) + y''_p\sin\tau + z_F -} \quad (17)$$
$$z_A\{rz_F[\sin\rho\cos(\alpha-\alpha_0) - \sin\tau\cos\rho\sin(\alpha-\alpha_0)] +$$
$$ry_F\cos\tau\sin(\alpha-\alpha_0) +$$
$$y''_p(z_F\cos\tau\cos\rho + y_F\sin\tau) - y_Fz_A\}$$

In the above equations, there are a total of ten unknown parameters (seven geometric parameters and three parameters of the unknown point source location). It can be shown that, even if values of $(x_d, y_d)(\alpha)$ are provided for all $\alpha \in [0, 2\pi)$ by acquiring tomographic projections of the point source in a standard pinhole geometry, only two, $\rho$ and $\alpha_0$, out of ten unknown parameters can be uniquely determined. There are an infinite number of solutions for the other 8 parameters. However, one can find that all those solutions are correlated with the true geometric parameters, and the correlations can be explicitly generalized using two scaling factors. These results are provided in the following descriptions, while the detailed derivations thereof is provided in the attached the Appendix of U.S. Provisional Application No. 60/859,585, filed Nov. 17, 2006, the entire content of which is incorporated herein by reference.

Assume $\alpha_0$, $\rho$, $x_F$, $y_F$, $z_F$, $z_A$, $x_{AO}$, $\tau$, $r$, and $y''_p$ are the true parameters that generate a set of tomographic projections $(x_d(\alpha), y_d(\alpha))$ from a single point source through equation 16 and 17, and define k>0, l>0, and $l\cos\tau \leq 1$, for any such values of k and l, the generalized solutions of the 8 parameters (recall $\alpha_0$ and $\rho$ are unique) denoted by $\bar{x}_F$, $\bar{y}_F$, $\bar{z}_F$, $\bar{z}_A$, $\bar{x}_{AO}$, $\bar{\tau}$, $\bar{r}$, and $\bar{y}''_p$ are given by:

$$\bar{x}_{AO} = kx_{AO} - (k-1)(x_F + y_F\tan\rho), \quad (18)$$

$$\bar{\tau} = \pm\arccos(l\cos\tau), \quad (19)$$

$$\bar{z}_F = lz_F, \quad (20)$$

$$\bar{x}_F = x_F - z_F\sin\rho(\sin\bar{\tau}/\cos\tau - \tan\tau), \quad (21)$$

$$\bar{y}_F = y_F + z_F\cos\rho(\sin\bar{\tau}/\cos\tau - \tan\tau), \quad (22)$$

$$\bar{r} = kr, \quad (23)$$

$$\bar{y}''_p = ky''_p\frac{1-\sin\bar{\tau}\sin\tau}{l\cos^2\tau} + kz_A\frac{\sin\bar{\tau}-\sin\tau}{l\cos^2\tau} - \quad (24)$$
$$(k-1)\left(z_F\frac{\sin\bar{\tau}-\sin\tau}{l\cos^2\tau} + y_F\frac{1}{l\cos\tau\cos\rho}\right),$$

$$\bar{z}_A = kz_A\frac{1-\sin\bar{\tau}\sin\tau}{l\cos^2\tau} + ky''_p\frac{\sin\bar{\tau}-\sin\tau}{l\cos^2\tau} - \quad (25)$$
$$(k-1)\left(z_F\frac{1-\sin\bar{\tau}\sin\tau}{l\cos^2\tau} + y_F\frac{\sin\bar{\tau}}{l\cos\tau\cos\rho}\right).$$

The set of true parameters are only given from the above equations by satisfying both k=1 and $\bar{\tau}=\tau$. Condition $\bar{\tau}=\tau$ guarantees l=1, but the converse statement is not true for nonzero $\tau$. Since the goal of geometric calibration is to obtain the true unique geometric parameters of the system, and a single-point-source phantom is not sufficient for doing so the next step is to add additional point sources.

To do so, embodiments of the present invention first make the following observations on equation 18 through 25. Among the 8 parameters, $\bar{x}_F$, $\bar{y}_F$, $\bar{z}_F$, $\bar{z}_A$, $\bar{x}_{AO}$, and $\bar{\tau}$ are system parameters that will be the same for any point source. So adding additional point sources in the calibration process will not add additional scaling factors l. In contrast, different scaling factors k may be resulted. If the embodiments denote $k_i$, $\bar{r}_i$, and as the corresponding parameters for the ith point object, for any two point object i=1 and 2, using equation 18, one can have $$\bar{x}_{AO} = k_1x_{AO} - (k_1-1)(x_F + y_F\tan\rho) \quad (26)$$
$$= k_2x_{AO} - (k_2-1)(x_F + y_F\tan\rho).$$

The above equation can be rearranged as:

$$(k_1 - k_2)(x_{AO} - x_F - y_F \tan \rho) = 0. \tag{27}$$

So, when the system to-be-calibrated satisfies $$m \equiv x_{AO} - x_F - y_F \tan \rho \neq 0, k_1 = k_2 = k. \tag{28}$$

Under the condition specified by equation 28, one can make use of equation 25 to write:

$$kz_A \frac{1 - \sin\tau\sin\tilde{\tau}}{l\cos^2\tau} + ky''_{P1} \frac{\sin\tilde{\tau} - \sin\tau}{l\cos^2\tau} - \tag{29}$$
$$(k-1)\left(z_F \frac{1 - \sin\tau\sin\tilde{\tau}}{l\cos^2\tau} + y_F \frac{\sin\tilde{\tau}}{l\cos\tau\cos\rho}\right) = kz_A \frac{1 - \sin\tau\sin\tilde{\tau}}{l\cos^2\tau} +$$
$$ky''_{P2} \frac{\sin\tilde{\tau} - \sin\tau}{l\cos^2\tau} - (k-1)\left(z_F \frac{1 - \sin\tau\sin\tilde{\tau}}{l\cos^2\tau} + y_F \frac{\sin\tilde{\tau}}{l\cos\tau\cos\rho}\right)$$

By simplifying the above equation, one can get:

$$k(y''_{P1} - y''_{P2}) \frac{\sin\tilde{\tau} - \sin\tau}{l\cos^2\tau} = 0 \tag{30}$$

This means, if two point sources are located on different axial positions along the AOR (resulting in $y''_{P1} - y''_{P2} \neq 0$) and both off AOR (to ensure $k \neq 0$), one can have $\sin\tau - \sin\tilde{\tau} = 0$. Based on the physical definition of the tilt angle, this ensures $\tilde{\tau} = \tau$, thus $l = 1$. From equations 19 through 22, the non-uniqueness in parameters $\bar{x}_F, \bar{y}_F, \bar{z}_F$ and $\bar{\tau}$ is therefore eliminated. However, $\bar{z}_A, \bar{x}_{AO}, \bar{r}_i$, and $\bar{y}''_{pi}$ are still non-unique. Fortunately, their non-uniqueness is now governed by only one scaling factor k. This scaling factor k now can be constrained to 1 using a simple distance a priori.

Again, the above discussions were made under the condition $m \neq 0$ as described by equation 28. Unfortunately, the condition $m = 0$ will occur when the line perpendicular to the detector surface passing the focal point intersects the AOR. In designing a standard pinhole imaging geometry, $m = 0$ is usually desired since it provides symmetry and maximizes the non-truncated field-of-view during a tomographic scan. Due to the manufacturing process, m may not be perfectly equal to 0. However, the deviation from $m = 0$ can be very small, so that numerically, $k_1 = k_2 = k$ can be very unstable, such that equations 29 and 30 can no longer stably yield $\tilde{\tau} = \tau$. This, in turn, can lead to inconsistent results between different geometric calibration studies on the same system when only two point objects with a distance a priori were used. To overcome such a problem, one has to either use three point sources with known distances to each other or make reasonable assumptions for certain parameters, such as, assuming $\bar{\tau} = \tau_0$.

Geometric Calibrations in a Multipinhole Geometry

As discussed above, two point objects with a distance a priori can be sufficient to calibrate a pinhole geometry only if m has a "significant" nonzero value, which might not be satisfied in most single pinhole SPECT geometries. However, this requirement can be easily met by many of the pinhole apertures in a multi-pinhole SPECT geometry, where they are purposely placed "off-center". More interestingly, as the application will show in the following description, the distance a priori becomes unnecessary to fully characterize a multi-pinhole geometry when two point sources are used.

As stated above for a multi-pinhole geometry with N pinhole apertures, a set of $(x_{Fn}, y_{Fn}, z_{Fn})$ will be used to define different apertures in the detector XYZ coordinates, where $n = 1, 2, 3, \ldots, N$. If one takes one of the pinhole apertures that satisfy $m \neq 0$ with numerical stability, and, without loss of generality, denotes this aperture as $n = 1$. Based on the discussion in the previous subsections, one can eliminate the non-uniqueness in $\bar{x}_{F1}, \bar{y}_{F1}, \bar{z}_{F1}$, and $\bar{\tau}$ (subsequently all other $\bar{x}_{Fn}, \bar{y}_{Fn}, \bar{z}_{Fn}$) and reduce the non-uniqueness in $\bar{z}_A, \bar{x}_{AO}, \bar{r}_i$, and $\bar{y}''_{pi}$ to a single scaling factor k by only using two point sources with very relaxed positioning requirements (at different axial positions with respect to the AOR and both off the AOR).

Next, if one takes any of the remaining apertures, such as $n = 2$, using equation 18, one has:

$$\bar{x}_{AO} = kx_{AO} - (k-1)(x_{F1} + y_{F1}\tan\rho) \tag{31}$$
$$= kx_{AO} - (k-1)(x_{F2} + y_{F2}\tan\rho).$$

Rearranging the terms in the above equation, the following results:

$$(k-1)[(x_{F1} - x_{F2}) + (y_{F1} - y_{F2})\tan\rho] = 0. \tag{32}$$

Therefore, $k = 1$ and unique solutions for all parameters can result when $$(x_{F1} - x_{F2}) + (y_{F1} - y_{F2})\tan\rho \neq 0. \tag{33}$$

It is straightforward to select two apertures in a multi-pinhole geometry that satisfy equation 33 with numerical stability, as such two apertures do not exist only if the z-projections of all the pinhole apertures fall onto a single straight line parallel to line O"P" shown in FIG. 24. Therefore, it would be sufficient to fully calibrate a multi-pinhole geometry using only two point objects without ever requiring the knowledge of the distance between them.

Geometric Calibrations for Helical Pinhole SPECT

In this geometry, three additional parameters $(x''_h, y''_h, z''_h)$ are needed to quantify the step size and direction of the bed movement as shown in equation 11. It is reasonable to assume that one can have sufficiently accurate control (e.g., through stepping motors) over the travel distance denoted by:

$$r''_h = \sqrt{(x''_h)^2 + (y''_h)^2 + (z''_h)^2}, \tag{34}$$

so the goal of a calibration process is simply to obtain the directional information denoted by $(x''_h/r''_h, y''_h/r''_h, z''_h/r''_h)$ A simple (but not necessarily the most efficient) method to accomplish this is to perform two standard single pinhole geometric calibrations at two different bed positions, both with a planar circular orbit. To facilitate the subsequent data analysis, two requirements should be satisfied: one is to ensure no truncation of the calibration phantom, which is attached to and moving with the scanning bed, would occur at either bed position; the other is to have the detector start from the same gantry position for both calibration scans. After performing such geometric calibrations, the position of the calibration phantom with respect to the detector will become known for each scan. Assuming the position of a point source in the calibration phantom is $(x''_p, y''_p, z''_p)$ at the first bed position, and $({}_2x''_p, {}_2y''_p, {}_2z''_p)$ at the second bed position, the directional information of the bed movement between the two scans can be obtained as the following:

$$x''_h / r''_h = \frac{{}_2x''_p - x''_p}{\sqrt{({}_2x''_p - x''_p)^2 + ({}_2y''_p - y''_p)^2 + ({}_2z''_p - z''_p)^2}}, \tag{35}$$

-continued $$y''_h / r''_h = \frac{2y''_p - y''_p}{\sqrt{(2x''_p - x''_p)^2 + (2y''_p - y''_p)^2 + (2z''_p - z''_p)^2}},$$

$$z''_h / r''_h = \frac{2z''_p - z''_p}{\sqrt{(2x''_p - x''_p)^2 + (2y''_p - y''_p)^2 + (2z''_p - z''_p)^2}}.$$

Geometric Calibrations for Pinhole SPECT using Two Detectors

Two additional parameters, $\Delta\alpha_0$ and $\Delta y''_p$, are needed to describe this geometry as shown in equations 28 and 29. To obtain these parameters, one can simply perform the standard single pinhole geometric calibration for each detector. Assume the resulting locations for one of the point sources in the calibration phantom are (r cos $\alpha_0$, y"$_p$, r sin $\alpha_0$) from the first detector and (r cos($_2\alpha_0$), $_2$y"$_p$, r sin($_2\alpha_0$)) from the second detector, $\Delta\alpha_0 =_2\alpha_0 - \alpha_0$ and $\Delta y''_p =_2 y''_p - y''_p$ can result.

Image Reconstruction

To validate the results obtained above, 3D OS-EM iterative reconstruction methods are implemented for both standard and nonstandard pinhole SPECT. The projector/back-projector pairs were implemented using a voxel-driven approach. To be specific, for the single pinhole SPECT geometry, after discretizing the object space into cubic voxels, for each voxel, the verification started from the voxel center (x"$_p$,y"$_p$, z"$_p$) to calculate the analytical pinhole projection (x$_d$,y$_d$) for different pinhole SPECT geometry based on equations 16 and 17, which were obtained from the matrix form in equation 9. The forward projector is accomplished by distributing the voxel value into a finite region centered at (x$_d$,y$_d$) on the discretized 2D projection space. The number of detector bins receiving this distribution is determined by the object voxel size, the detector bin size, and the magnification of the pinhole geometry. The percentage of this distribution in each of these detector bins is determined by the distance from the bin to the analytical projection center (x$_d$,y$_d$). The back-projection process was implemented as the exact transpose operation of the forward projection process.

Once implemented, the similarities among equations 9, 10, 12, and 15 allowed implementations for the nonstandard pinhole SPECT geometries very efficiently. For example, one only needs to perform a translation on the voxel center (x"$_p$, y"$_p$,z"$_p$) based on equations 11 and 12 to accomplish the implementation for the pinhole SPECT with a helical orbit. For multi-pinhole SPECT, it was accomplished by using different values of (x$_F$, y$_F$, z$_F$) in the same single pinhole projector/backprojector implementation for each additional pinhole and summing over the contributions of all pinholes. For dual-detector configurations, the voxel center (x"$_p$,y"$_p$,z"$_p$) was rotated and translated based on equations 14 and 15 before projecting onto or backprojection from the second detector. In summary, embodiments of the present invention can achieve an adaptable implementation of pinhole SPECT image reconstructions for various pinhole SPECT geometries.

Geometric Calibration Methods

A very simple and unbiased (i.e., without the use of known distances) geometric calibration method can also be used for calibrating MPH SPECT. The MPH SPECT geometry can be calibrated by the following three steps: (1) phantom setup; (2) data acquisition; and (3) data analysis.

Figure 27:
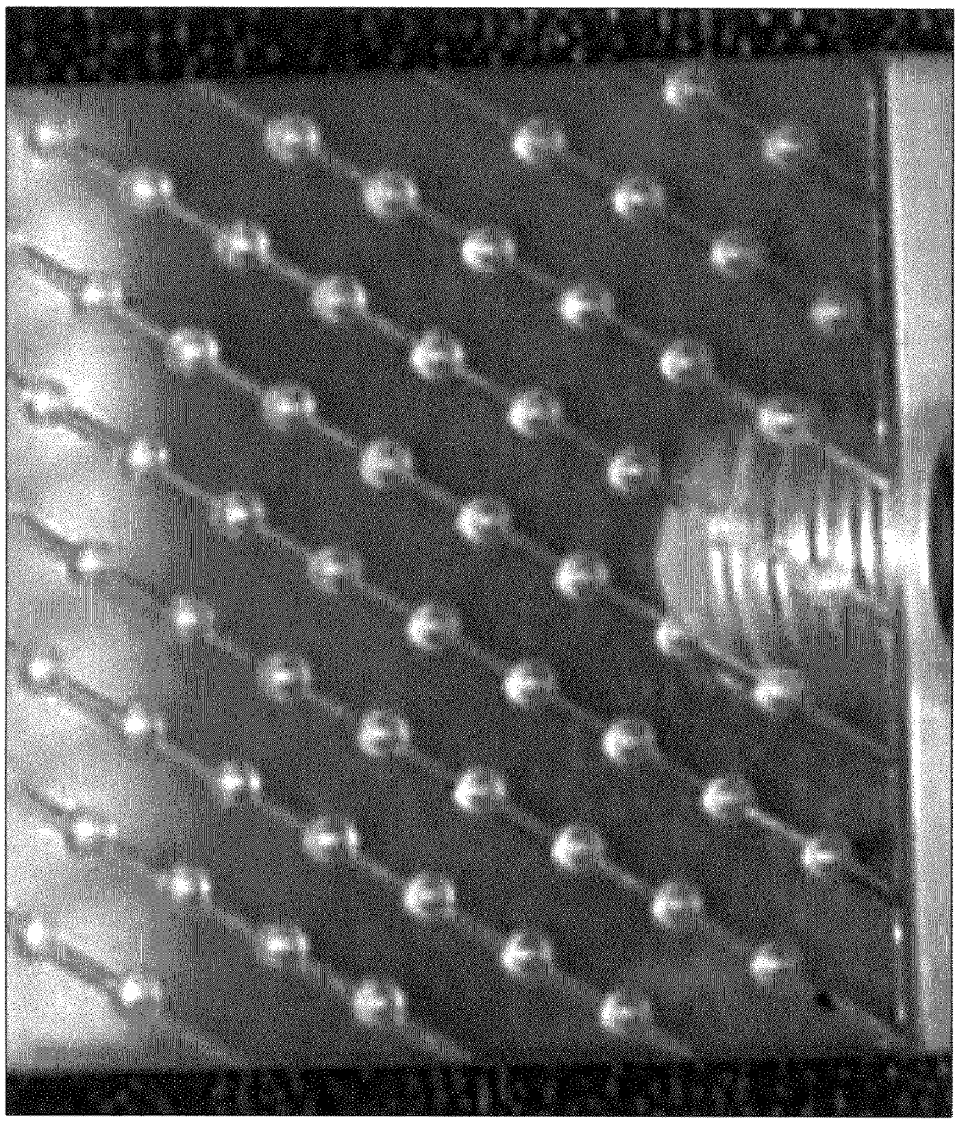
FIG. 27 depicts a plastic point source holder made to assist the positioning of point sources during geometric calibration in pinhole SPECT studies.

For step (1), the phantom required is two point sources (~<1 mm in size), which can be taped on a cardboard. Referring to FIG. 27, a plastic holder was made to assist positioning (and, in non multi-pinhole SPECT cases, obtaining distance information). That is, in FIG. 27, a plastic point source holder is made to assist the positioning of point sources during geometric calibration in pinhole SPECT studies.

To improve the stability and accuracy of the data analysis step, axially, the two point sources were positioned as far apart as possible along the axis-of-rotation (AOR), but without truncating either source during tomographic acquisitions. Trans-axially, the two point sources were also positioned as far away from the AOR as possible, again, without introducing any truncation. They can be positioned either on the same side or opposite side of the AOR.

For step (2), tomographic data of the above phantom were acquired. The camera setup (such as radius of rotation, and etc.) emulated the one that was used by actual animal and/or phantom studies as closely as possible. This is especially important if mechanical consistency of the system is unknown. The data were acquired using 64 projection views over 360 degree and for 20 sec/view.

For step (3), the method first fits the point projection with a 2D Gaussian function, and uses the fitted Gaussian center as the position of each point source projection. For a 4-pinhole system, there will be 8 point source projections in every angular view for the two-point source phantom. These estimated results are then recorded as ($x_{est,k}^{n,i}$, $y_{est,k}^{n,i}$), where k=1,2 indexing the two point sources, n=1, 2, ..., N indexing the N pinhole apertures, and i=1, 2, ..., I indexing a total number of I angular views. For a MPH system with N pinhole apertures, the to-be-calibrated geometric parameters are as following: aperture-independent parameters $\bar{z}_A$, $\bar{x}_{AO}$, $\bar{\tau}$, and $\rho$, aperture-specific parameters $\bar{x}_{Fi}$, $\bar{y}_{Fi}$, and $\bar{z}_{Fi}$ (i=1, 2, ..., N), and finally the parameters describing the unknown positions of the two point sources $\alpha_{0,k}$, $\bar{r}_k$, and $\bar{y}_{p,k}$, where k=1,2. Based on the derivation above in multi-pinhole SPECT with a single circular orbit, these parameters (total number of unknown parameters=4+3×N+3×2=10+3×N) are uniquely determined in theory. Based on a set of initial estimates of the above parameters, one can denote the calculated point source locations as: ($x_{cal,k}^{n,i}$, $y_{cal,k}^{n,i}$), which can be obtained through equations 16 and 17. Thus, estimation of the unknown parameters is a nonlinear minimization process, and the function to be minimized is:

$$f = \sum_{n,i,k} [(x_{est,k}^{n,i} - x_{cal,k}^{n,i})^2 + (y_{est,k}^{n,i} - y_{cal,k}^{n,i})^2].$$

The minimization was performed using the Powell algorithm available in the software package IDL (Research System Inc., Boulder, Colo.), with error tolerance set to $10^{-8}$. The initial estimates were all set to zero, except $\bar{z}_A$ and all $\bar{z}_{Fi}$, which were given approximations obtained by the operator's visual estimation.

Experimental Results

Figure 28:
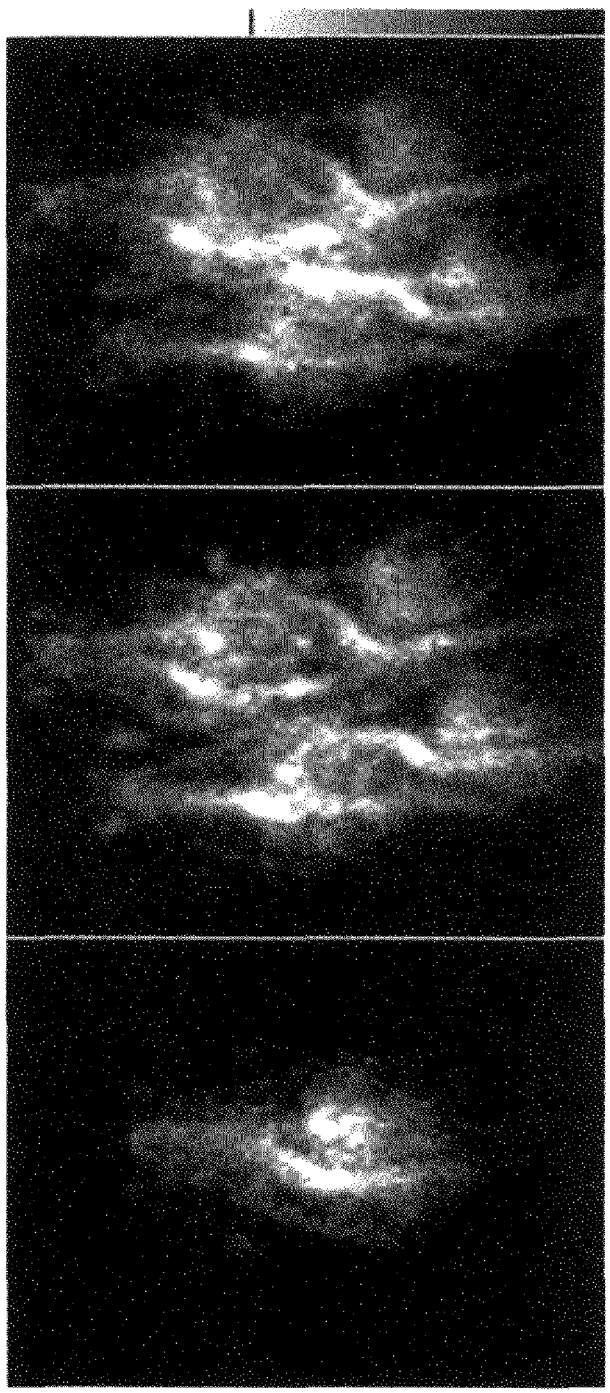
FIG. 28 shows sample projection images from single pinhole, 4-pinhole, and 5-pinhole (from left to right) SPECT studies of a mouse.

Experimental studies were performed to validate the development and implementation of image reconstruction algorithms and geometric calibration methods using the homogeneous coordinates approach described above. The first set of studies were performed using a special X-SPECT® SPECT/CT small animal imaging system (Gamma Medica Inc., Northridge, Calif.). For single-pinhole and multi-pinhole SPECT studies, a mouse was injected with ~1.8 mCi Tc-99m MDP and imaged tomographically using a five-pinhole collimator, a four-pinhole collimator, and a single pinhole collimator, sequentially. The multi-pinhole collimators were shown in FIG. 25, and the aperture sizes are all 1.0 mm. For each SPECT study, 28 views over 360 degree of rotation angle were acquired, with a symmetric 20% energy window around the 140 keV peak of Tc-99m. For the five-pinhole SPECT study, projection data for 60 seconds at each angular view were acquired, with the recorded count rate for the first angular view at 1.8k/s. For the subsequent four-pinhole SPECT studies, projection data for 82 seconds at each angular view for compensating the decayed activity were acquired, and a count rate of 1.1 k/s at the beginning of the four-pinhole study was recorded. For the single pinhole SPECT study, these numbers became 113 seconds/view and 0.2 k/s initial count rate. Matrix size for the projection images was 82×82 with a pixel size of 1.56 mm. Examples of acquired projections are shown in FIG. 28. In more detail, FIG. 28 shows sample projection images from single pinhole, 4-pinhole, and 5-pinhole (from left to right) SPECT studies of a mouse.

Figure 29:
FIG. 29 shows sagittal views of the maximum-intensity reprojections obtained from the reconstructed images in single pinhole, 4-pinhole, and 5-pinhole (from left to right) SPECT studies of the same mouse shown in FIG. 28.

Geometric calibrations were also performed following the methods described above for geometric calibrations in a multipinhole gemerty. Among all parameters, the resulting $\bar{z}_{F1}$ was 77.9 mm. Parameter $\bar{z}_A$ was 109.7 mm for both multi-pinhole SPECT studies, and 103.5 mm for the single pinhole study. Based on these estimated parameters, image reconstructions were performed with the OS-EM algorithm described above in the image reconstruction section of the description. Four subsets were used, while 20 iterations were used for multi-pinhole studies and 10 iterations were used in the single pinhole study. The reconstructed images were posted-filtered with Butterworth filters (cutoff 0.2 cycle/voxel and order 8). Sample reconstructed sagittal slices were shown in FIG. 29. In more detail, FIG. 29 shows sagittal views of the maximum-intensity reprojections obtained from the reconstructed images in single pinhole, 4-pinhole, and 5-pinhole SPECT (from left to right) mouse studies of the same mouse shown in FIG. 28.

Figure 30:
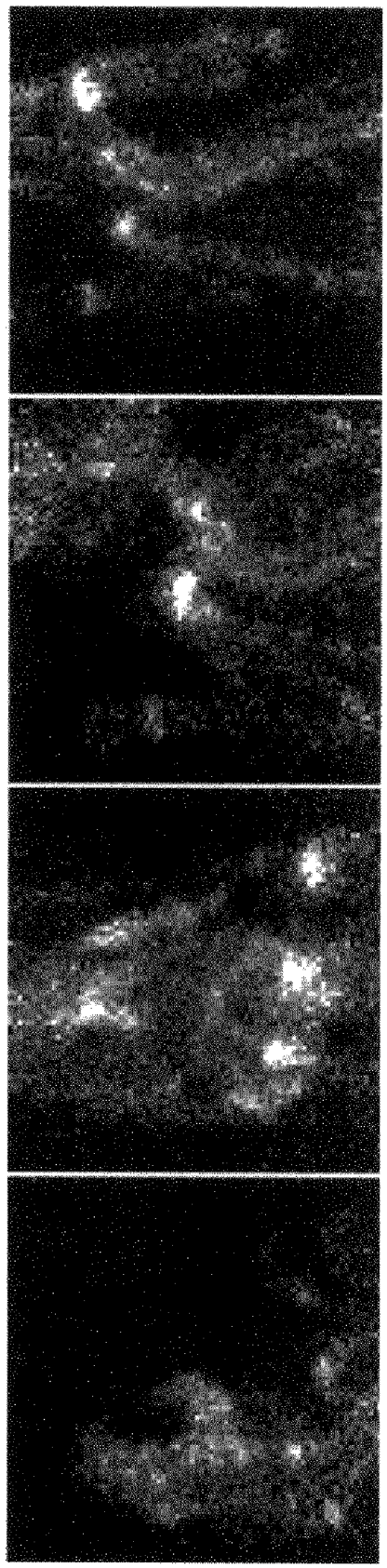
FIG. 30 shows sample projection images of a helical SPECT study with a normal mouse injected with $^{99m}$Tc-MDP using the Gamma Medica Inc. X-SPECT® SPECT/CT small animal imaging system.
Figure 31:
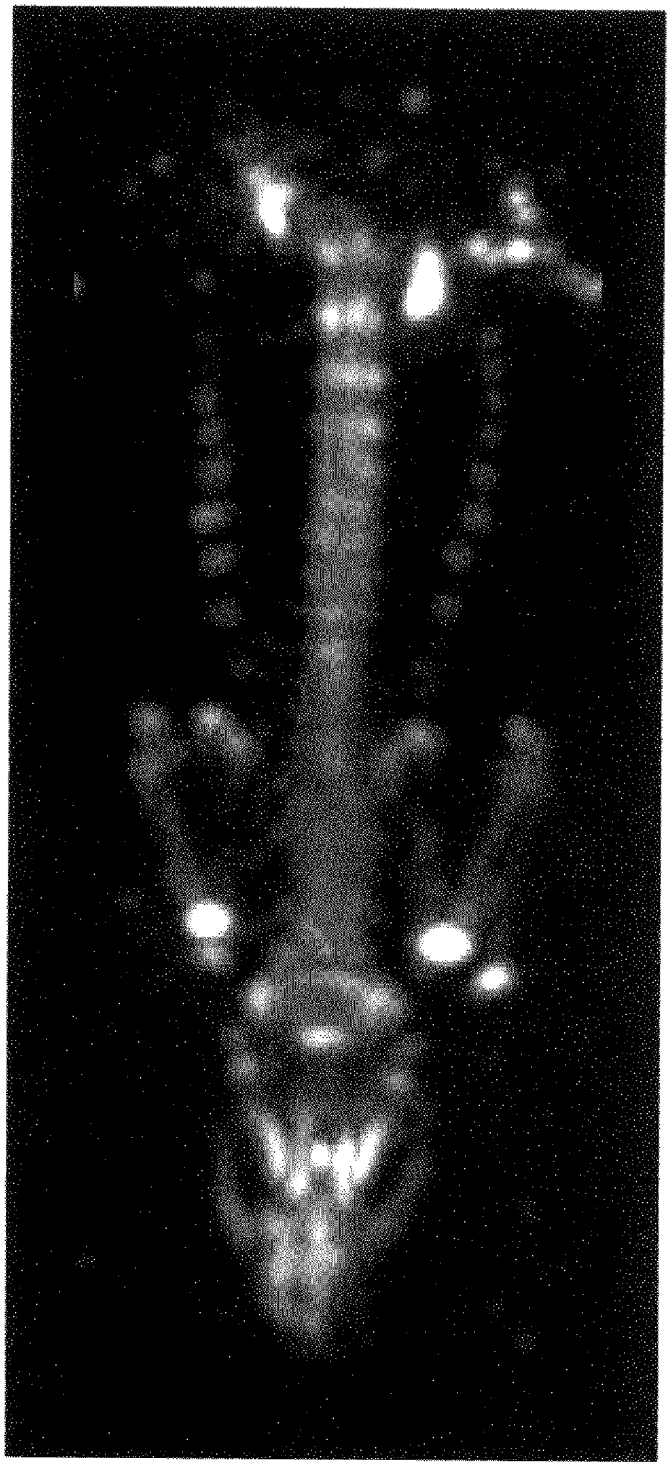
FIG. 31 shows an anterior view of the maximum-intensity reprojection obtained from the reconstructed images in the helical SPECT study (sample projection data shown in FIG. 29), showing the whole mouse above the bladder.

Helical SPECT studies were also performed using the special X-SPECT® SPECT/CT small animal imaging system. A normal rat was injected with 12.8 mCi Tc99m-MDP and imaged using a pinhole collimator (with a 1.0 mm aperture) and a helical scanning orbit. The adjacent angular views are 4 degrees apart in radial direction and 0.7 mm apart in axial direction. A total of 150 angular views were obtained, without introducing the high bladder uptake into the FOV. Matrix size for the projection images are 79×79 with a pixel size of 1.56 mm. Data acquisition time for each projection view was 45 seconds. FIG. 30 shows samples of the acquired projection images, and FIG. 31 shows the anterior view of the 3D volume rendering obtained from the helical pinhole SPECT reconstructed images using these projections. In more detail, FIG. 30 shows sample projection images of a helical SPECT study with a normal mouse injected with 99mTc-MDP using the Gamma Medica Inc. X-SPECT® SPECT/CT small animal imaging system, and FIG. 31 shows the anterior view of the maximum-intensity-reprojection obtained from the reconstructed images in the helical SPECT study (sample projection data shown in FIG. 30), showing the whole mouse above the bladder.

Figure 32:
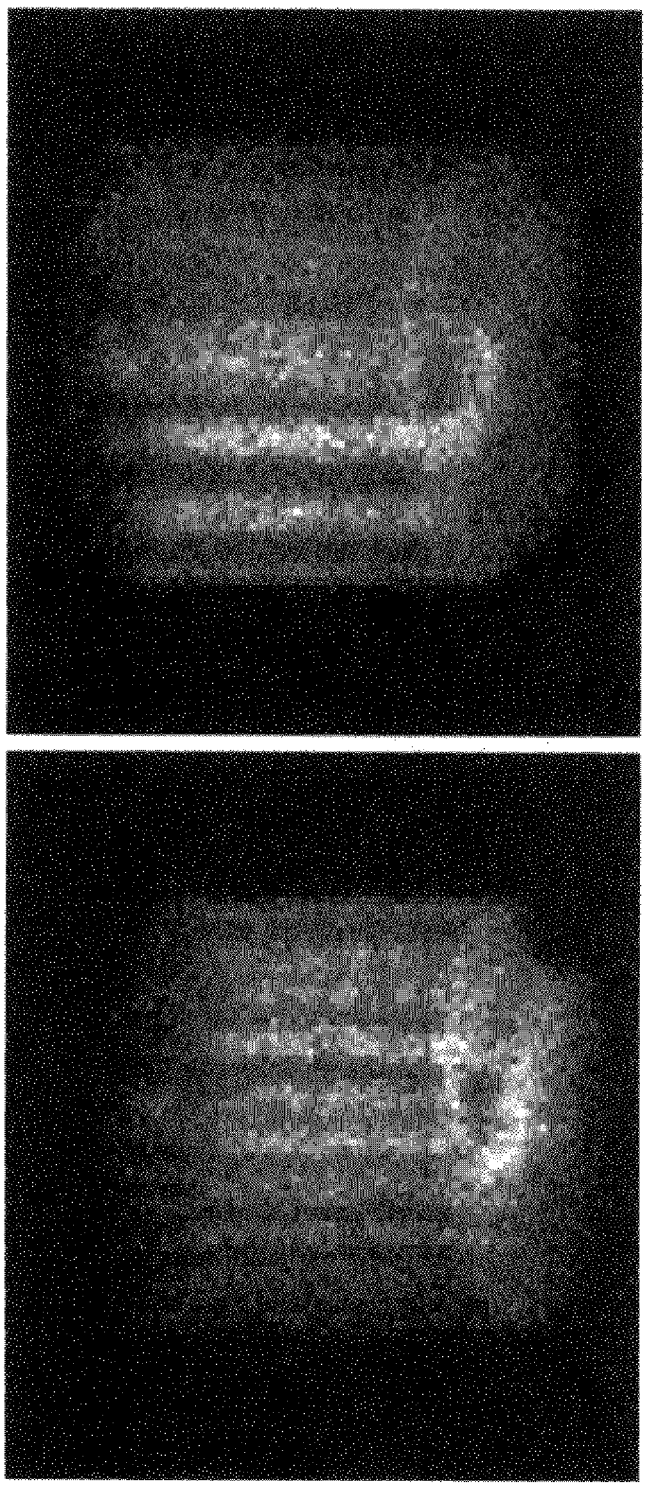
FIG. 32 shows sample projection images acquired using a dual-head SPECT system from camera head H1 (left) and from camera head H2 (right) at the same time.
Figure 33:
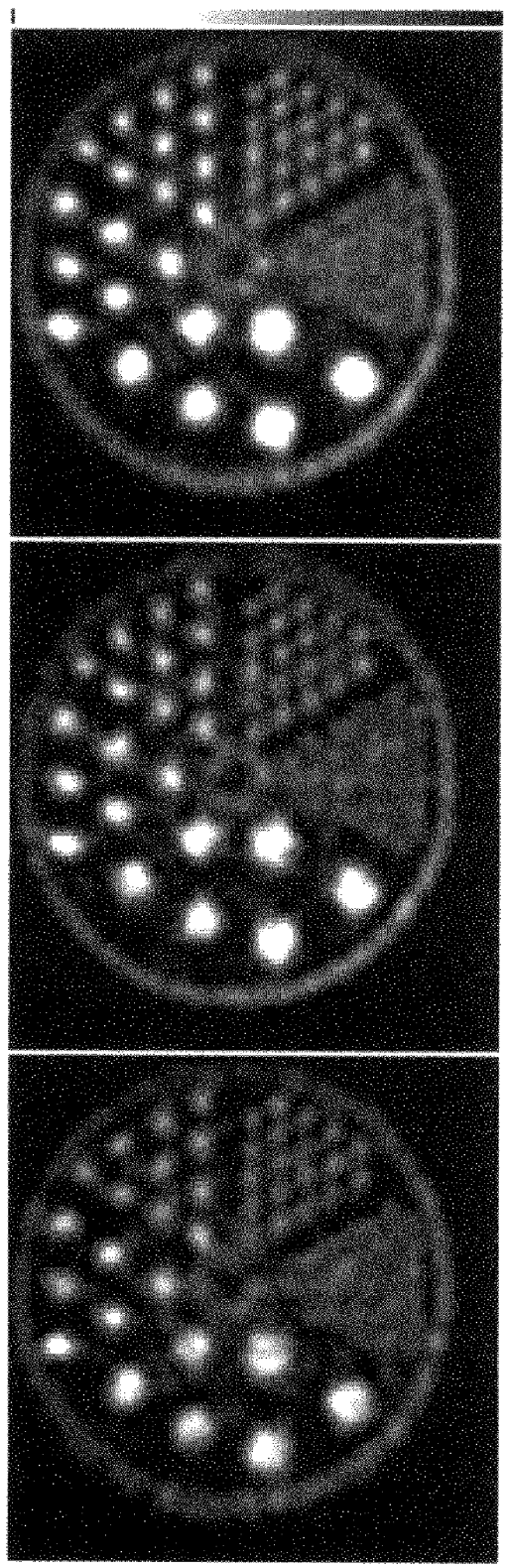
FIG. 33 shows reconstructed transaxial image slices of the Data Spectrum hot-rod microSPECT phantom using projection data acquired from camera head Hi only (left), projection data acquired from camera head H2 only (middle), and projection data from both camera heads H1 and H2 (right). Sample projection data shown in FIG. 31.

Dual-head pinhole SPECT studies were performed using a clinical dual-head SPECT system, with both camera heads fitted a pinhole collimator and a 1.0 mm aperture. A hot-rod microSPECT phantom (Data Spectrum Inc., Hillsborough, N.C.) with the smallest rod diameter of 1.2 mm was filled with about 4 mCi Tc-99m. The projection data of the phantom were then acquired for 50 sec/view and 180 projection views over 360 degrees for both heads. They were binned into 128×128 pixels on each detector with a pixel size of 4.42 mm. Geometric calibration performed based on the above described geometric calibrations in a multi-pinhole geometry showed that $\bar{z}_F$ s for detectors 1 and 2 were 23.2 and 23.4 cm, respectively, and $\bar{z}_A$ S were 28.0 and 27.9 cm, respectively. The rotational and translational differences (as defined in the above described single pinhole SPECT using dual camera-detector) were 179.7 degrees and 0.53 cm. Sample projection and reconstruction images are shown in FIG. 32 and FIG. 33, respectively. In more detail, FIG. 32 shows sample projection images acquired using a dual-head SPECT system from camera head H1 (left) and from camera head H2 (right) at the same time, and FIG. 33 shows reconstructed transaxial image slices of the Data Spectrum hot-rod microSPECT phantom using projection data acquired from camera head H1 only (left), projection data acquired from camera head H2 only (middle), and projection data from both camera heads H1 and H2 (right). Sample projection data shown in FIG. 32.

As such, the use of unified projection operators in homogeneous coordinates added a great amount of flexibility and extensibility in pinhole SPECT image reconstruction and geometric calibration. This approach can be easily extended to more complex imaging geometries, such as multi-pinhole SPECT with a helical scanning orbit, or pinhole SPECT using three or more detectors. Further, embodiments of the present invention provide a simple method to the geometric calibration problem in multi-pinhole SPECT, and the efficacy of the method has been demonstrated in FIG. 29 above.

In more detail, using unified projection operators in homogeneous coordinates to describe various pinhole SPECT imaging geometries, and using iterative OS-EM reconstruction methods for projection data acquired from these geometries, embodiments of the present invention contribute to not only ease of software implementation, but also to greater flexibility in adapting the process to new or modified data acquisition geometries, therefore, greatly reducing the time needed for developing and implementing iterative image reconstruction algorithms for pinhole SPECT. The unified projectors in homogeneous coordinates are also proved to be useful for studying geometric calibration in pinhole SPECT, evident by facilitating the discovery of the simple solution to geometric calibration problem in multi-pinhole SPECT.

It should be appreciated from the above that the various structures and functions described herein may be incorporated into a variety of apparatuses (e.g., an imaging device, a monitoring device, etc.) and implemented in a variety of ways. Different embodiments of the imaging and/or monitoring devices may include a variety of hardware and software processing components. In some embodiments, hardware components such as processors, controllers, state machines and/or logic may be used to implement the described components or circuits. In some embodiments, code such as software or firmware executing on one or more processing devices may be used to implement one or more of the described operations or components.

In view of the foregoing, some embodiments of the invention described herein generally relate to a system and method for SPECT image quality improvement. The embodiments include methods, instrumentations, and associated algorithms and software for both high-resolution and high detection efficiency imaging that lead to lower image noise and artifact-free synthetic aperture SPECT images. Also, the embodiments provide design parameters, hardware settings, and data acquisition methods for optimal imaging of objects with different sizes. The embodiments improve SPECT image quality by providing a collimator design optimization and a reconstruction method optimization.

In one embodiment, the design of the collimator design is optimized by providing for high photo detection efficiency and spatial resolution and for high sampling completeness and minimal degradation. That is, the present embodiment uses an analysis method to provide a collimator design that has a variable collimator (or focal) length, focused apertures, and/or a aperture arrangement pattern so that high photo detection efficiency and spatial resolution and/or high sampling completeness and minimal degradation can result.

In one embodiment, the reconstruction method is optimized by providing for modeling accuracy and efficiency and for geometric misalignment estimation and correction. Here, the embodiment uses a theoretical framework to provide a reconstruction software so that modeling accuracy and efficiency can result and/or a calibration method so that geometric misalignment estimation and correction can be made.

Figure 34:
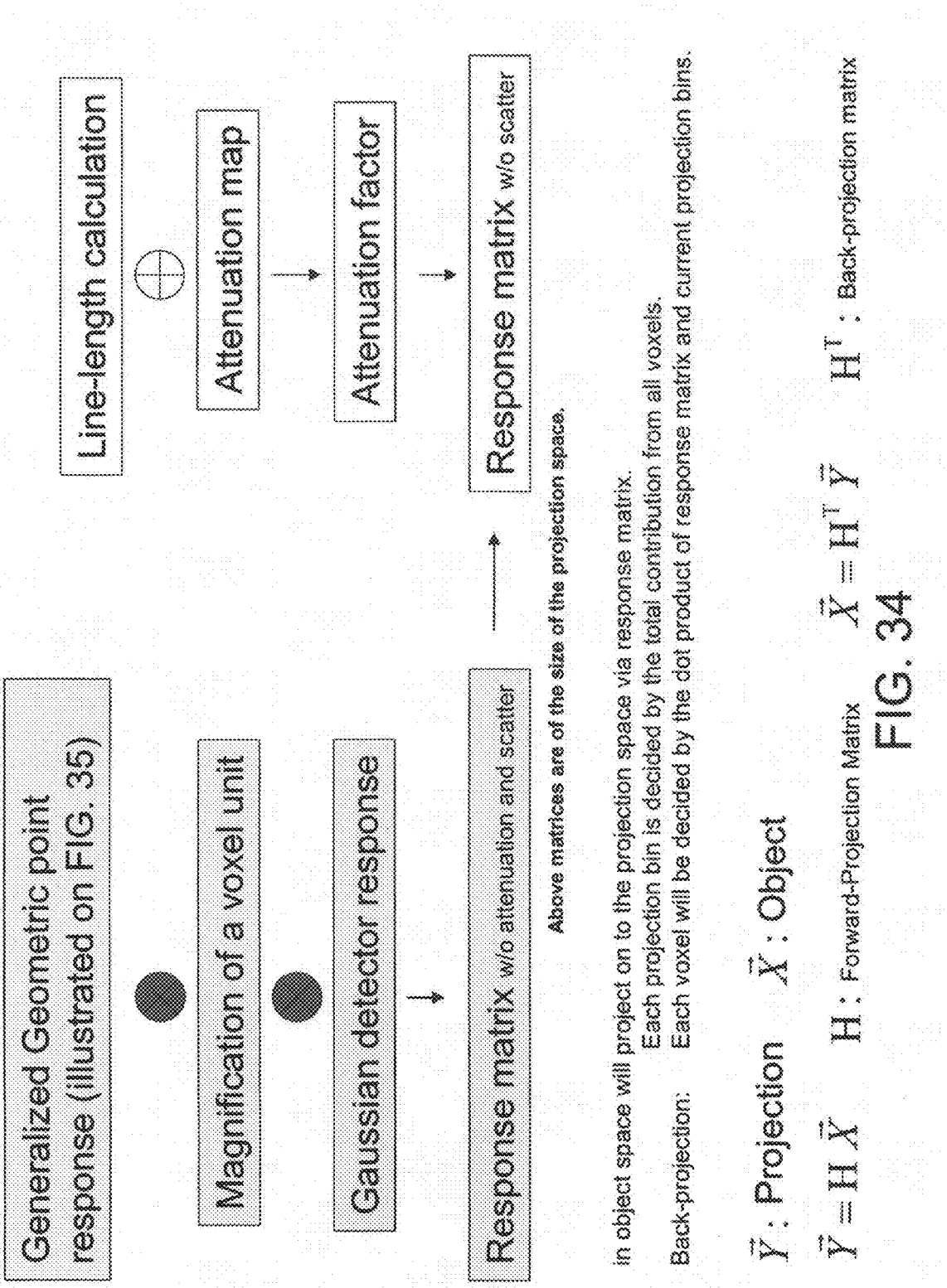
FIG. 34 is a reconstruction projector/back-projector implementation flow chart pursuant to an embodiment of the present invention.

FIG. 34 is a reconstruction projector/back-projector implementation flow chart pursuant to an embodiment of the present invention. Here, in forward-projection, each voxel in object space is projected on to the projection space via a response matrix, and each projection bin is decided by the total contribution from all voxels. In back-projection, each voxel is decided by the dot product of response matrix and current projection bins.

Figure 35:
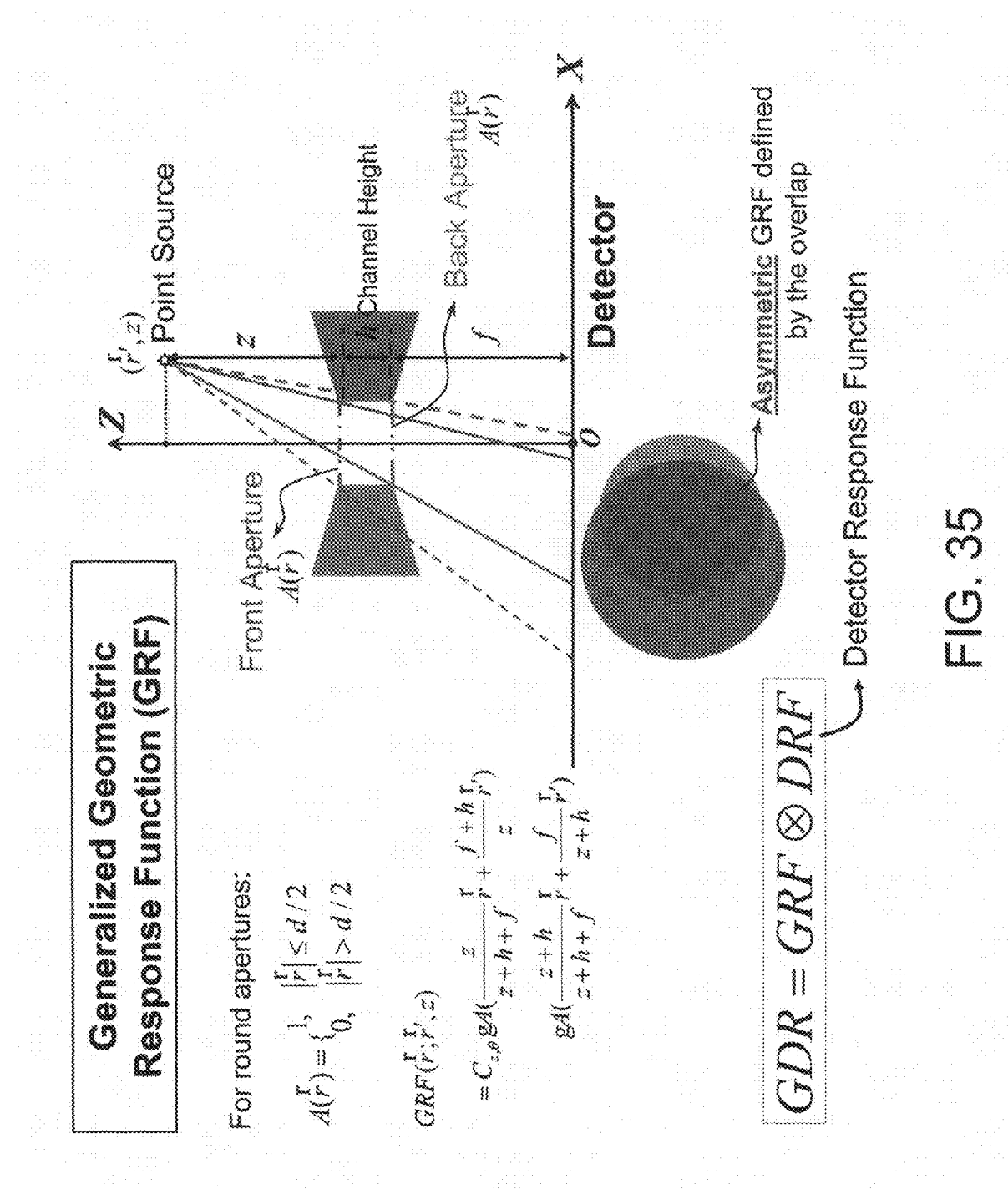
FIG. 35 illustrates a generalized geometric response function (GRF) scheme of FIG. 34 pursuant to an embodiment of the present invention.

FIG. 35 illustrates a generalized geometric response function (GRF) scheme of FIG. 34 pursuant to an embodiment of the present invention. Referring now to both FIGS. 34 and 35, an embodiment of the present invention provides a scheme to generalize GRF for both knife and channeled aperture designs. Here, the geometric-detector response lookup table can be obtained by convolving this generalized result with a detector response function.

It should be appreciated from the above that the various structures and functions described herein may be incorporated into a variety of apparatuses (e.g., an imaging device, a monitoring device, etc.) and implemented in a variety of ways. Different embodiments of the imaging and/or monitoring devices may include a variety of hardware and software processing components. In some embodiments, hardware components such as processors, controllers, state machines and/or logic may be used to implement the described components or circuits. In some embodiments, code such as software or firmware executing on one or more processing devices may be used to implement one or more of the described operations or components.

In view of the foregoing, some embodiments of the invention described herein generally relate to methods, instrumentations, and associated algorithms and software for both high-resolution and high detection efficiency that lead to lower image noise and artifact-free synthetic aperture SPECT images for objects including small animals of different sizes. Also, some embodiments of the present invention provide design parameters, hardware settings, and data acquisition methods for optimal imaging of objects with different sizes.

While the invention has been described in connection with certain exemplary embodiments, it is to be understood by those skilled in the art that the invention is not limited to the disclosed embodiments, but, on the contrary, is intended to cover various modifications included within the spirit and scope of the appended claims and equivalents thereof.

What is claimed is:

1. A single photon nuclear imaging system, the system comprising:
    a detector for detecting gamma photons; and
    a multi-pinhole collimator having at least four pinholes for single photon nuclear imaging an object under study with the detector,
    wherein all of the pinholes of the multi-pinhole collimator are displaced from each other by a substantially equal distance along a first direction perpendicular to an axis-of-rotation of the object under study,
    wherein the multi-pinhole collimator comprises:
        a collimator plate having the plurality of patterned pinholes; and
        a support base for suspending the plurality of patterned pinholes of the collimator plate between the object under study and the detector, and
    wherein four of the pinholes of the multi-pinhole collimator are symmetrical pinholes, the four symmetrical pinholes being patterned such that an angle in a range from about 15° to about 30° is formed between a first reference line and a second reference line, the first and second reference lines diverging from a center point of the collimator plate, wherein the first reference line intersects the center point and two of the four symmetrical pinholes, wherein the second reference line intersects the center point and does not intersect the four symmetrical pinholes, wherein the second reference line is perpendicular to a first edge of the collimator plate and parallel to a second edge of the collimator plate, and wherein the four symmetrical pinholes are all configured to focus a volume-of-interest of the object under study across a plurality of transaxial planes of the volume-of-interest along the axis-of-rotation of the object under study.

2. The system of claim 1, wherein the pinholes are not displaced from each other by a substantially equal distance along a second direction parallel to the axis-of-rotation of the object under study.

3. The system of claim 1, wherein a fifth pinhole of the multi-pinhole collimator is at the center point of the collimator plate.

4. The system of claim 1, wherein the angle formed between the first reference line and the second reference line has a range from about 20° to about 25°.

5. The system of claim 1, wherein the angle formed between the first reference line and the second reference line is about 22.5°.

6. The system of claim 1, wherein the multi-pinhole collimator is movable around the axis-of-rotation of the object under study.

7. The system of claim 1, wherein the four symmetric pinholes are configured to focus the volume-of-interest of the object under study in each of the transaxial planes of the volume-of-interest.

8. The system of claim 7, wherein the multi-pinhole collimator comprises:
    a collimator plate having all of the pinholes of the multi-pinhole collimator; and
    a support base for suspending all of the pinholes of the multi-pinhole collimator of the collimator plate between the object under study and the detector.

9. The system of claim 8, wherein:
    a first pinhole of the pinholes of the multi-pinhole collimator corresponds to a position spaced away from a first side of a center of the volume-of-interest; and
    a second pinhole of the pinholes of the multi-pinhole collimator corresponds to a position spaced away from a second side of the center of the volume-of-interest.

10. The system of claim 9, wherein a third pinhole of the pinholes of the multi-pinhole collimator is between the first pinhole and the second pinhole and corresponding to the center of the volume-of-interest.

11. The system of claim 10, wherein an angle less than 90° is formed between an axis of the first pinhole and the collimator plate, wherein an angle greater than 90° is formed between an axis of the second pinhole and the collimator plate, and wherein an angle at about 90° is formed between an axis of the third pinhole and the collimator plate.

12. The system of claim 9, wherein an angle less than 90° is formed between an axis of the first pinhole and the collimator plate, and wherein an angle greater than 90° is formed between an axis of the second pinhole and the collimator plate.

13. The system of claim 9, wherein an angle at about 76° is formed between an axis of the first pinhole and the collimator plate, and wherein an angle at about 104° is formed between an axis of the second pinhole and the collimator plate.

14. The system of claim 9, wherein an angle at about 75.6° is formed between an axis of the first pinhole and the collimator plate, and wherein an angle at about 104.4° is formed between an axis of the second pinhole and the collimator plate.

15. The system of claim 9, wherein the first pinhole has a region facing the object under study and defined by a first cut into the collimator plate and a second cut into the collimator plate.

16. The system of claim 15, wherein an angle at about 64° is formed between the first cut and the second cut.

17. The system of claim 15, wherein an angle at about 73° is formed between the first cut and the second cut.

18. The system of claim 1, wherein the multi-pinhole collimator and the detector are configured to have a plurality of collimator lengths, the plurality of collimator lengths including a first pinhole collimator length for single photon nuclear imaging a first object of a first size with the detector and a second pinhole collimator length for single photon nuclear imaging a second object of a second size with the detector.

19. The system of claim 18, wherein the second size is larger than the first size, and wherein the first collimator length is longer than the second collimator length.

20. The system of claim 19, wherein the multi-pinhole collimator and the first pinhole collimator length are configured to guide a portion of the gamma photons passing through the multi-pinhole collimator onto a surface of the detector to form a plurality of first imaging areas on the surface of the detector, and wherein the multi-pinhole collimator and the second pinhole collimator length are configured to guide a portion of the gamma photons onto the surface of the detector to form a plurality of second imaging areas on the surface of the detector.

21. The system of claim 20, wherein the plurality of second imaging areas on the surface of the detector are substantially equal in size with the plurality of first imaging areas on the surface of the detector.

22. The system of claim 20, wherein the plurality of first imaging areas on the surface of the detector are guided by the first pinhole collimator length to have a first overlap with each other, and wherein the plurality of second imaging areas on the surface of the detector are guided by the second pinhole collimator length to have a second overlap with each other.

23. The system of claim 22, wherein the first overlap has a size substantially equal to that of the second overlap.

24. The system of claim 19, wherein the multi-pinhole collimator comprises:
a collimator plate; and
a support base for suspending the collimator plate between the object under study and the detector.

25. The system of claim 24, wherein the multi-pinhole collimator further comprises at least one spacer between the collimator plate and the support base.

26. The system of claim 25, wherein the at least one spacer comprises at least one first spacer and at least one second spacer, the at least one first spacer and the at least one second spacer being respectively adapted to provide the first collimator length and the second collimator length such that the first collimator length is longer than the second collimator length.

27. The system of claim 19, wherein the multi-pinhole collimator comprises:
a first collimator plate;
a first support base having a first height for suspending the first collimator plate between the first object under study and the detector;
a second collimator plate; and
a second support base having a second height for suspending the second collimator plate between the second object under study and the detector.

28. The system of claim 27, wherein the first height of the first support base and the second height of the second support base are respectively adapted to provide the first collimator length and the second collimator length such that the first collimator length is longer than the second collimator length.

29. The system of claim 28, wherein the at least four separate detector heads are offset from each other at the particular target projection such that, for the particular target projection sampling of the object under study, the plurality of pixellated detectors with the plurality of multi-pinhole collimators respectively provide the different sampling contributions that are summed to provide the substantially complete sampling of the object under study at the particular target projection.

30. The system of claim 1, wherein the detector comprises a plurality of pixellated detectors, wherein the multi-pinhole collimator comprises a plurality of multi-pinhole collimators respectively corresponding to the plurality of pixellated detectors, wherein, for a particular target projection sampling of the object under study, each of the plurality of pixellated detectors with its corresponding one of the plurality of multi-pinhole collimators provides a different sampling contribution, and wherein the different sampling contributions of the plurality of pixellated detectors are summed to provide a substantially complete sampling of the object under study at the particular target projection.

31. The system of claim 30, wherein each of the plurality of pixellated detectors comprises an array of detector pixels that is offset from pixel arrays of others of the plurality of pixellated detectors such that, for the particular target projection sampling of the object under study, the plurality of pixellated detectors with the plurality of multi-pinhole collimators respectively provide the different sampling contributions that are summed to provide the substantially complete sampling of the object under study at the particular target projection.

32. The system of claim 30, wherein each of the plurality of pixellated detectors comprises a square array of detector pixels that is offset from square pixel arrays of others of the plurality of pixellated detectors such that, for the particular target projection sampling of the object under study, the plurality of pixellated detectors with the plurality of multi-pinhole collimators respectively provide the different sampling contributions that are summed to provide the substantially complete sampling of the object under study at the particular target projection.

33. The system of claim 30, wherein each of the plurality of pixellated detectors comprises a hexagonal array of detector pixels that is offset from hexagonal pixel arrays of others of the plurality of pixellated detectors such that, for the particular target projection sampling of the object under study, the plurality of pixellated detectors with the plurality of multipinhole collimators respectively provide the different sampling contributions that are summed to provide the substantially complete sampling of the object under study at the particular target projection.

34. The system of claim 30, wherein each of the multi-pinhole collimators comprises a pattern of pinholes that is offset from pinhole patterns of others of the plurality of the multi-pinhole collimators such that, for the particular target projection sampling of the object under study, the plurality of pixellated detectors with the plurality of multi-pinhole collimators respectively provide the different sampling contributions that are summed to provide the substantially complete sampling of the object under study at the particular target projection.

35. The system of claim 30, wherein the plurality of pixellated detectors are respectively coupled to the plurality of multi-pinhole collimators to form at least two separate detector heads movable around the axis-of-rotation of the object under study.

36. The system of claim 35, wherein the at least two separate detector heads are offset from each other at the particular target projection such that, for the particular target projection sampling of the object under study, the plurality of pixellated detectors with the plurality of multi-pinhole collimators respectively provide the different sampling contributions that are summed to provide the substantially complete sampling of the object under study at the particular target projection.

37. The system of claim 30, wherein the plurality of pixellated detectors are respectively coupled to the plurality of multi-pinhole collimators to form at least three separate detector heads movable around the axis-of-rotation of the object under study.

38. The system of claim 37, wherein the at least three separate detector heads are offset from each other at the particular target projection such that, for the particular target projection sampling of the object under study, the plurality of pixellated detectors with the plurality of multi-pinhole collimators respectively provide the different sampling contributions that are summed to provide the substantially complete sampling of the object under study at the particular target projection.

39. The system of claim 30, wherein the plurality of pixellated detectors are respectively coupled to the plurality of multi-pinhole collimators to form at least four separate detector heads movable around the axis-of-rotation of the object under study.

40. The system of claim 1, wherein the detector comprises a plurality of homogenous area detectors, wherein the multi-pinhole collimator comprises a plurality of multi-pinhole collimators respectively corresponding to the plurality of homogenous area detectors, wherein, for a particular target projection sampling of the object under study, each of the plurality of homogenous area detectors with its corresponding one of the plurality of multi-pinhole collimators provides a different sampling contribution, and wherein the different sampling contributions of the plurality of homogenous area detectors are summed to provide a substantially complete sampling of the object under study at the particular target projection.

41. The system of claim 1, wherein the multi-pinhole collimator and the detector are configured to have a plurality of collimator lengths, the plurality of collimator lengths including a first pinhole collimator length for single photon nuclear imaging a first object of a first size with the detector and a second pinhole collimator length for single photon nuclear imaging a second object of a second size with the detector, wherein the detector comprises a plurality of pixellated detectors, wherein the multi-pinhole collimator comprises a plurality of multi-pinhole collimators respectively corresponding to the plurality of pixellated detectors, wherein, for a particular target projection sampling of the object under study, each of the plurality of pixellated detectors with its corresponding one of the plurality of multi-pinhole collimators provides a different sampling contribution, and wherein the different sampling contributions of the plurality of pixellated detectors are summed to provide a substantially complete sampling of the object under study at the particular target projection.

42. The system of claim 1, wherein the multi-pinhole collimator and the detector are configured to have a plurality of collimator lengths, the plurality of collimator lengths including a first pinhole collimator length for single photon nuclear imaging a first object of a first size with the detector and a second pinhole collimator length for single photon nuclear imaging a second object of a second size with the detector, and wherein the plurality of patterned pinholes are focused to a volume-of-interest of the object under study.

43. The system of claim 1, wherein the detector comprises a plurality of pixellated detectors, wherein the multi-pinhole collimator comprises a plurality of multi-pinhole collimators respectively corresponding to the plurality of pixellated detectors, wherein, for a particular target projection sampling of the object under study, each of the plurality of pixellated detectors with its corresponding one of the plurality of multi-pinhole collimators provides a different sampling contribution, and wherein the different sampling contributions of the plurality of pixellated detectors are summed to provide a substantially complete sampling of the object under study at the particular target projection, and wherein the plurality of patterned pinholes are focused to a volume-of-interest of the object under study.

44. The system of claim 1, wherein the multi-pinhole collimator and the detector are configured to have a plurality of collimator lengths, the plurality of collimator lengths including a first pinhole collimator length for single photon nuclear imaging a first object of a first size with the detector and a second pinhole collimator length for single photon nuclear imaging a second object of a second size with the detector, wherein the detector comprises a plurality of homogenous area detectors, wherein the multi-pinhole collimator comprises a plurality of multi-pinhole collimators respectively corresponding to the plurality of homogenous area detectors, wherein, for a particular target projection sampling of the object under study, each of the plurality of homogenous area detectors with its corresponding one of the plurality of multi-pinhole collimators provides a different sampling contribution, and wherein the different sampling contributions of the plurality of homogenous area detectors are summed to provide a substantially complete sampling of the object under study at the particular target projection.

45. The system of claim 1, wherein the detector comprises a plurality of homogenous area detectors, wherein the multi-pinhole collimator comprises a plurality of multi-pinhole collimators respectively corresponding to the plurality of homogenous area detectors, wherein, for a particular target projection sampling of the object under study, each of the plurality of homogenous area detectors with its corresponding one of the plurality of multi-pinhole collimators provides a different sampling contribution, and wherein the different sampling contributions of the plurality of homogenous area detectors are summed to provide a substantially complete sampling of the object under study at the particular target projection.

46. The system of claim 1, wherein the multi-pinhole collimator and the detector are configured to have a plurality of collimator lengths, the plurality of collimator lengths including a first pinhole collimator length for single photon nuclear imaging a first object of a first size with the detector and a second pinhole collimator length for single photon nuclear imaging a second object of a second size with the detector, wherein the detector comprises a plurality of homogenous area detectors, wherein the multi-pinhole collimator comprises a plurality of multi-pinhole collimators respectively corresponding to the plurality of homogenous area detectors, wherein, for a particular target projection sampling of the object under study, each of the plurality of homogenous area detectors with its corresponding one of the plurality of multi-pinhole collimators provides a different sampling contribution, and wherein the different sampling contributions of the plurality of homogenous area detectors are summed to provide a substantially complete sampling of the object under study at the particular target projection.

47. The system of claim 1, wherein the detector comprises a material selected from the group consisting of silicon (Si), germanium (Ge), cadmium telluride (CdTe), mercuric iodide ($HgI_2$), thallium bromide (TlBr), gallium arsenide (GaAs), cadmium zinc telluride (CdZnTe), and cadmium manganese telluride (CdMnTe).

48. The system of claim 1, wherein the detector is a cadmium zinc telluride (CZT) detector.

49. The system of claim 1, wherein the detector comprises:
at least one semiconductor substrate for producing charge carriers through interaction with gamma photons; and
a plurality of electrodes for collecting the charge carriers.

50. A single photon nuclear imaging system, the system comprising:
a detector for detecting gamma photons; and
a multi-pinhole collimator having at least four pinholes for single photon nuclear imaging an object under study with the detector,
wherein all of the pinholes of the multi-pinhole collimator are displaced from each other by a substantially equal distance along a first direction perpendicular to an axis-of-rotation of the object under study,
wherein all of the pinholes of the multi-pinhole collimator are configured to focus a volume-of-interest of the object under study across a plurality of transaxial planes of the volume-of-interest along the axis-of-rotation of the object under study, and
wherein pinhole axes of all of the pinholes of the multi-pinhole collimator are tilted toward a center of the volume-of-interest.

51. The system of claim 50, wherein the multi-pinhole collimator comprises:
a collimator plate having the plurality of patterned pinholes; and
a support base for suspending the plurality of patterned pinholes of the collimator plate between the object under study and the detector.

52. The system of claim 51, wherein four of the pinholes of the multi-pinhole collimator are symmetrical pinholes, the four symmetrical pinholes being patterned such that an angle in a range from about 15° to about 30° is formed between a first reference line and a second reference line, the first and second reference lines diverging from a center point of the collimator plate, wherein the first reference line intersects the center point and two of the four symmetrical pinholes, wherein the second reference line intersects the center point and does not intersect the four symmetrical pinholes, and wherein the second reference line is perpendicular to a first edge of the collimator plate and parallel to a second edge of the collimator plate.

53. A single photon nuclear imaging system, the system comprising:
a detector for detecting gamma photons; and
a multi-pinhole collimator having a plurality of patterned pinholes for single photon nuclear imaging an object under study with the detector,
wherein the plurality of patterned pinholes are displaced from each other by a substantially equal distance along a first direction perpendicular to an axis-of-rotation of the object under study, and
wherein the multi-pinhole collimator and the detector are configured to have a plurality of collimator lengths, the plurality of collimator lengths including a first pinhole collimator length for single photon nuclear imaging a first object of a first size with the detector and a second pinhole collimator length for single photon nuclear imaging a second object of a second size with the detector, wherein the detector comprises a plurality of pixellated detectors, wherein the multi-pinhole collimator comprises a plurality of multi-pinhole collimators respectively corresponding to the plurality of pixellated detectors, wherein, for a particular target projection sampling of the object under study, each of the plurality of pixellated detectors with its corresponding one of the plurality of multi-pinhole collimators provides a different sampling contribution, wherein the different sampling contributions of the plurality of pixellated detectors are summed to provide a substantially complete sampling of the object under study at the particular target projection, and wherein the plurality of patterned pinholes are focused to a volume-of-interest of the object under study.

* * * * *